(12) United States Patent
Kim et al.

(10) Patent No.: US 11,470,632 B2
(45) Date of Patent: Oct. 11, 2022

(54) METHOD AND DEVICE FOR TRANSMITTING OR RECEIVING SCHEDULING REQUEST IN MOBILE COMMUNICATION SYSTEM

(71) Applicant: Samsung Electronics Co., Ltd., Suwon-si (KR)

(72) Inventors: Soenghun Kim, Suwon-si (KR); Sangbum Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/222,360

(22) Filed: Dec. 17, 2018

(65) Prior Publication Data

US 2019/0124677 A1 Apr. 25, 2019

Related U.S. Application Data

(63) Continuation of application No. 15/566,907, filed as application No. PCT/KR2016/005121 on May 13, 2016, now abandoned.
(Continued)

(51) Int. Cl.
*H04W 28/02* (2009.01)
*H04W 72/12* (2009.01)
(Continued)

(52) U.S. Cl.
CPC ... *H04W 72/1278* (2013.01); *H04W 28/0278* (2013.01); *H04W 72/1205* (2013.01);
(Continued)

(58) Field of Classification Search
None
See application file for complete search history.

(56) References Cited

U.S. PATENT DOCUMENTS 9,357,546 B1 * 5/2016 Marupaduga ............ H04L 1/00
2010/0080185 A1 4/2010 Guo
(Continued)

FOREIGN PATENT DOCUMENTS

CN 103098408 A 5/2013
CN 103533662 A 1/2014
(Continued)

OTHER PUBLICATIONS

Ericsson, "BSR and LCP procedures for split bearers", 3GPP TSG-RAN WG2 #85, Tdoc R2-140656, Feb. 2014 (Year: 2014).*
(Continued)

*Primary Examiner* — Jenkey Van
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention provides a method for transmitting a scheduling request (SR) in a wireless communication system. A SR transmission method for a terminal according to the present invention includes, receiving first information and second information for SR configuration, transmitting the SR if a SR timer based on the first information and the second information is expired, and wherein the first information comprises SR configuration information for a primary cell and a secondary cell, and wherein the second information is an integer value for configuring the SR timer.

12 Claims, 56 Drawing Sheets

Related U.S. Application Data

(60) Provisional application No. 62/162,468, filed on May 15, 2015.

(51) Int. Cl.

| | | |
|---|---|---|
| *H04W 56/00* | (2009.01) | |
| *H04W 74/00* | (2009.01) | |
| *H04W 4/70* | (2018.01) | |
| *H04W 72/04* | (2009.01) | |

(52) U.S. Cl.
CPC .......... *H04W 4/70* (2018.02); *H04W 56/0005* (2013.01); *H04W 72/0406* (2013.01); *H04W 74/006* (2013.01)

(56) References Cited

U.S. PATENT DOCUMENTS

| | | | |
|---|---|---|---|
| 2012/0207040 A1* | 8/2012 | Comsa | H04W 72/1215 370/252 |
| 2013/0094410 A1 | 4/2013 | Yang et al. | |
| 2013/0100908 A1* | 4/2013 | Xu | H04W 28/12 370/328 |
| 2013/0250828 A1 | 9/2013 | Chou et al. | |
| 2014/0226984 A1 | 8/2014 | Roberts et al. | |
| 2015/0131630 A1 | 5/2015 | Dinan | |
| 2015/0215945 A1* | 7/2015 | Hsu | H04L 47/21 370/254 |
| 2015/0334737 A1* | 11/2015 | Susitaival | H04W 72/1284 370/329 |
| 2016/0027443 A1* | 1/2016 | Terrell, II | G10L 15/01 704/235 |
| 2016/0029387 A1 | 1/2016 | Uemura et al. | |
| 2016/0066284 A1 | 3/2016 | Kwon et al. | |
| 2016/0143078 A1 | 5/2016 | Jeong | |
| 2016/0150440 A1* | 5/2016 | Lee | H04W 72/1284 455/422.1 |
| 2016/0205688 A1* | 7/2016 | Rudolf | H04L 5/14 370/329 |
| 2016/0255537 A1* | 9/2016 | Uchino | H04W 28/0278 370/329 |
| 2016/0295442 A1* | 10/2016 | Virtej | H04W 72/1284 |
| 2016/0337895 A1* | 11/2016 | Lee | H04W 28/0205 |
| 2016/0337909 A1* | 11/2016 | Cai | H04W 36/0033 |
| 2017/0149546 A1* | 5/2017 | Zhang | H04L 5/0053 |
| 2017/0202007 A1 | 7/2017 | Miao et al. | |
| 2018/0027443 A1* | 1/2018 | Lee | H04W 80/02 370/329 |
| 2018/0035453 A1* | 2/2018 | Yamada | H04W 72/1289 |
| 2018/0049231 A1 | 2/2018 | Yamada et al. | |
| 2018/0063832 A1 | 3/2018 | Yamada et al. | |
| 2018/0077749 A1 | 3/2018 | Yamada et al. | |
| 2018/0139646 A1* | 5/2018 | Basu Mallick | H04W 28/0278 |
| 2019/0069313 A1* | 2/2019 | Kim | H04W 28/0278 |
| 2019/0223040 A1* | 7/2019 | Lee | H04W 28/0278 |

FOREIGN PATENT DOCUMENTS

| | | |
|---|---|---|
| CN | 104170493 A | 11/2014 |
| CN | 104601309 A | 5/2015 |
| EP | 2169871 A1 | 3/2010 |
| EP | 2 854 444 A1 | 4/2015 |
| WO | 2014/141965 A1 | 9/2014 |
| WO | 2014/163320 A1 | 10/2014 |
| WO | 2015-013193 A1 | 1/2015 |
| WO | 2015/016550 A1 | 2/2015 |
| WO | 2015-016646 A1 | 2/2015 |

OTHER PUBLICATIONS

Ericsson, "Uplink scheduling and BSRs with dual connectivity", 3GPP TSG-RAN WG2 Meeting #83bis, R2-133412, Oct. 2013 (Year : 2013).*
NTT Docomo, Inc., "Threshold based splitting for UL bearer split", R2-141713, Apr. 4, 2014 (Year: 2014).*
NSN(Rapporteur), "Discussion on Uplink Bearer Split", R2-141102, 3GPP TSG-RAN WG2 Meeting #85bis, Apr. 2014 (Year: 2014).*
Panasonic, "BSR Reporting Options for Dual Connectivity", R2-133935, 3GPP TSG RAN WG2 #84, Nov. 2013 (Year: 2013).*
European Office Action dated Feb. 8, 2019, issued in the European Application No. 16 796 728.0.
Intel Corporation; PHR for Dual Connectivity; 3GPP TSG-RAN2 Meeting #85; R2-140283; Feb. 10-14, 2014; Prague, Czech Republic.
Chines Office Action dated Jul. 22, 2020, issued in a counterpart Chinese Application No. 201680027894.0.
Extended European Search Report dated Mar. 31, 2021, issued in a counterpart European Application No. 21152351.9-1215.
Huawei et al: "User Plane Enhancement for Uplink Bearer Split", 3GPP TSG-RAN WG2 Meeting #89bis; R2-151180, Apr. 19, 2015, Bratislava, Slovakia.

* cited by examiner

FIG. 18

| C7 | C6 | C5 | C4 | C3 | C2 | C1 | R |
|----|----|----|----|----|----|----|---|
| P | V | PH (Type 2, PCell) | | | | | |
| R | R | PCMAX,c 1 | | | | | |
| P | V | PH (Type 1, PCell) | | | | | |
| R | R | PCMAX,c 2 | | | | | |
| P | V | PH (Type 1, SCell 1) | | | | | |
| R | R | PCMAX,c 3 | | | | | |

...

| P | V | PH (Type 1, SCell n) |
|---|---|----------------------|
| R | R | PCMAX,c m |

FIG. 19

| C7 | C6 | C5 | C4 | C3 | C2 | C1 | R |
|---|---|---|---|---|---|---|---|
| P | V | \multicolumn{6}{l}{PH (Type 2, PCell)} |
| R | R | \multicolumn{6}{l}{PCMAX,c 1} |
| P | V | \multicolumn{6}{l}{PH (Type 2, PSCell)   (1900)} |
| R | R | \multicolumn{6}{l}{PCMAX,c 2} |
| P | V | \multicolumn{6}{l}{PH (Type 1, PCell)} |
| R | R | \multicolumn{6}{l}{PCMAX,c 3} |
| P | V | \multicolumn{6}{l}{PH (Type 1, Serving Cell 1)} |
| R | R | \multicolumn{6}{l}{PCMAX,c 4} |

...

| P | V | PH (Type 1, Serving Cell n) |
|---|---|---|
| R | R | PCMAX,c m |

FIG. 56
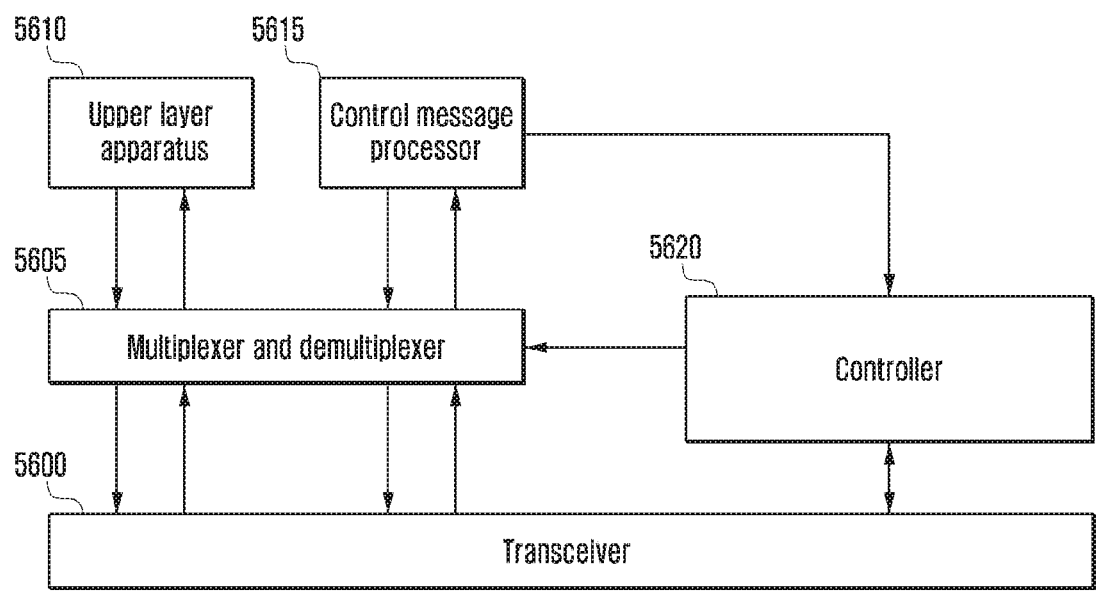

METHOD AND DEVICE FOR TRANSMITTING OR RECEIVING SCHEDULING REQUEST IN MOBILE COMMUNICATION SYSTEM

CROSS-REFERENCE TO RELATED APPLICATION(S)

This application is a continuation application of prior application Ser. No. 15/566,907, filed on Oct. 16, 2017, which was the U.S. National Stage application under 35 U.S.C. § 371 of an International application number PCT/KR2016/005121, filed on May 13, 2016, which is based on and claimed priority of a U.S. Provisional application Ser. No. 62/162,468, filed on May 15, 2015, the disclosure of which is incorporated by reference herein in its entirety.

TECHNICAL FIELD

The present invention relates to a method and an apparatus for transmitting a scheduling request in a mobile communication system, and more particularly, to a method and an apparatus for configuring and transmitting a scheduling request in a secondary cell.

BACKGROUND ART

To meet a demand for radio data traffic that is on an increasing trend after commercialization of a 4G communication system, efforts to develop an improved 5G communication system or a pre-5G communication system have been conducted. For this reason, the 5G communication system or the pre-5G communication system is called a communication system beyond 4G network or a system since the post LTE. To achieve a high data transmission rate, the 5G communication system is considered to be implemented in a super high frequency (mmWave) band (for example, like 60 GHz band). To reduce a path loss of a radio wave and increase a transfer distance of the radio wave in the super high frequency band, in the 5G communication system, technologies of beam-forming, a massive MIMO, a full dimensional MIMO FD-MIMO, an array antenna, analog beam-forming, and a large scale antenna have been discussed. Further, to improve the network of the system, in the 5G communication system, technologies of an improved small cell, an advanced small cell, a cloud radio access network (cloud RAN), an ultra-dense network, device-to-device communication (D2D), wireless backhaul, a moving network, cooperative communication, coordinated multi-points (CoMP), interference cancellation, or the like have been developed. In addition to this, in the 5G system, hybrid FSK and QAM modulation (FQAM) and sliding window superposition coding (SWSC) which are an advanced coding modulation (ACM) scheme and a filter bank multi carrier (FBMC), a non orthogonal multiple access (NOMA), and a sparse code multiple access (SCMA) which are an advanced access technology, or the like have been developed.

Meanwhile, the Internet is evolved to an Internet of Things (IoT) network that transmits and receives information, such as things, between distributed components and processes the information, in a human-centered connection network through which human generates and consumes information. The Internet of Everything (IoE) technology in which the big data processing technology, etc., by connection with a cloud server, etc., is combined with the IoT technology has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, a health care, smart appliances, and advanced healthcare service by fusing and combining the existing information technology (IT) with various industries.

Therefore, various tries to apply the 5G communication system to the IoT network have been conducted. For example, the 5G communication technologies such as the technologies of the sensor network, the machine to machine (M2M), the machine type communication (MTC), or the like are implemented by techniques such as the beam-forming, the MIMO, the array antenna, or the like. As the big data processing technology described above, the application of the cloud radio access network (cloud RAN) may also be an example of the fusing of the 5G technology with the IoT technology.

DISCLOSURE OF INVENTION

Technical Problem

By the way, when uplink control information is transmitted onto a physical uplink control channel (PUCCH) in a secondary cell as well as a primary cell, there is a need to configure the scheduling request onto the secondary cell. Therefore, there is a need to configure and transmitting the scheduling request transmitted onto the secondary cell.

Solution to Problem

To solve the above problem, the present invention relates to a method for allowing a terminal to transmit a scheduling request (SR) including: receiving first information and second information for SR configuration; and when an SR timer based on the first information and the second information expires, transmitting the SR, in which the first information includes SR configuration information for a primary cell and a secondary cell and the second information is an integer value for configuring the SR timer.

Further, the present invention relates to a method for receiving, by a base station, a scheduling request (SR) including: transmitting first information and second information for SR configuration; and receiving the SR based on the first information and the second information, in which the first information includes SR configuration information for a primary cell and a secondary cell and the second information is an integer value for configuring the SR timer.

In addition, the present invention relates to a terminal for transmitting a scheduling request (SR) including: a transceiver transmitting and receiving a signal to and from a base station; and a controller performing a control to receive first information and second information for SR configuration and when an SR timer based on the first information and the second information expires, transmit the SR, in which the first information includes SR configuration information for a primary cell and a secondary cell and the second information is an integer value for configuring the SR timer.

Further, the present invention relates to a base station for receiving a scheduling request (SR) including: a transceiver transmitting and receiving a signal to and from a terminal; and a controller performing a control to receive the SR based on the first information and the second information, in which the first information includes SR configuration information for a primary cell and a secondary cell and the second information is an integer value for configuring the SR timer.

Advantageous Effects of Invention

According to the method for transmitting a scheduling request of a terminal in accordance with the embodiment of the present invention, it is possible to transmit the scheduling request depending on the SR timer even on the secondary cell.

BRIEF DESCRIPTION OF DRAWINGS

FIG. 18 is a diagram illustrating an extended PHR format.

FIG. 19 is a diagram illustrating a dual connectivity PHR format.

FIG. 56 is a block diagram illustrating an internal structure of the terminal according to the present embodiment.

BEST MODE

First Embodiment

Figure 1:
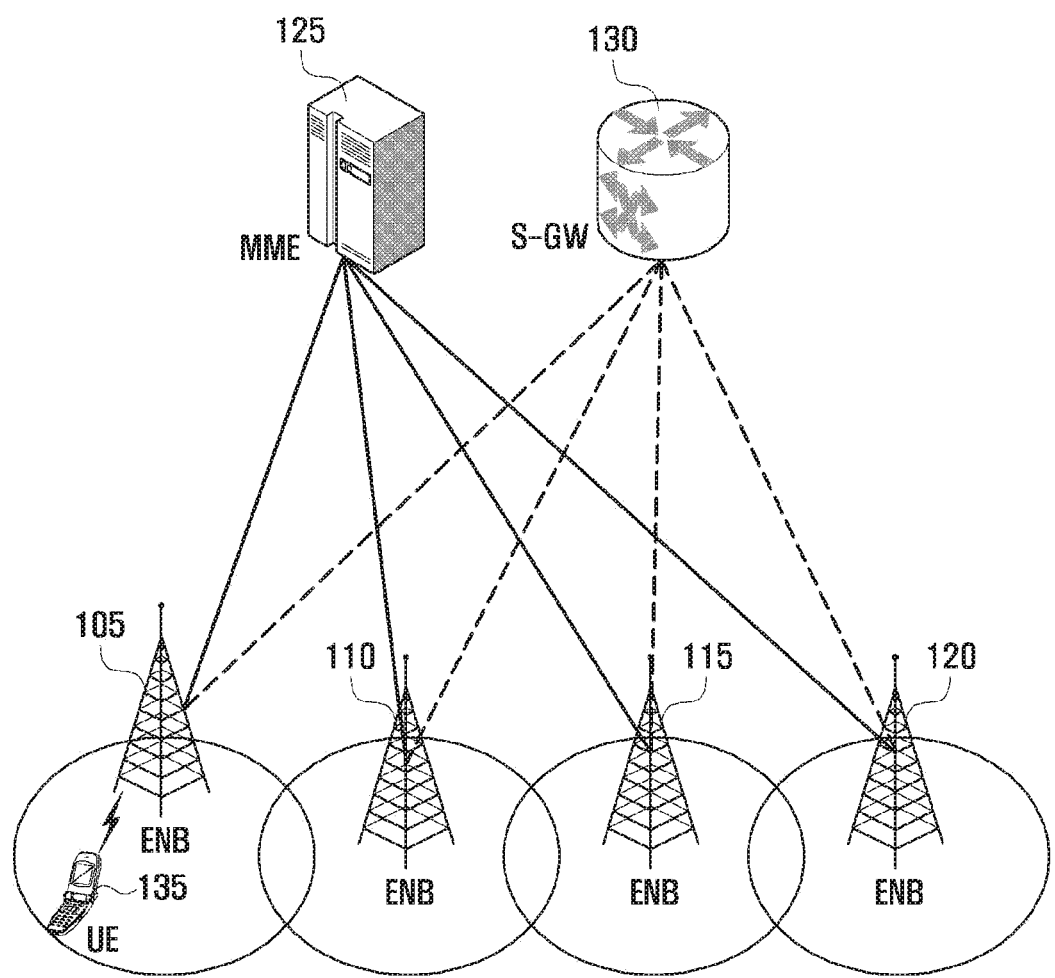
FIG. 1 is a diagram illustrating a structure of the LTE system to which the present embodiment is applied.

Generally, a mobile communication system has been developed to provide communication while securing mobility of a user. The mobile communication system may provide a voice communication service and a high-speed data communication service by virtue of the rapid progress of technologies.

In recent years, as one of the next-generation mobile communication systems, standardization for a long term evolution (LTE) system in 3rd generation partnership project (3GPP) is in progress. The LTE system is a technology of implementing high-speed packet based communications having a transmission rate a maximum of 100 Mbps higher than a data transmission rate now being provided and the standardization for the LTE system is almost complete currently.

Recently, discussions about an advanced LTE communication system (LTE-advanced (LTE-A)) which increases a transmission rate by combining various new technologies with the LTE communication system have started in earnest. A representative of the technologies to be newly introduced may include carrier aggregation (used together with carrier wave aggregation, carrier wave collection, etc.). Conventionally, a terminal uses only one forward carrier and one reverse carrier to transmit and receive data. Differently from this, however, the carrier aggregation allows one terminal to use a plurality of forward carriers and a plurality of reverse carriers to transmit and receive data.

In the current LTE-A, only intra-ENB carrier aggregation is defined. This results in reducing applicability of the carrier aggregation. In particular, in a scenario of overlappingly operating a plurality of pico cells and one macro cell, a problem in that a macro cell and a pico cell are not integrated may be caused.

To solve the problem, the 3GPP Release 12 has conducted a study named 'Small cell enhancement'. The study is mainly focusing on the inter-ENB carrier aggregation for integrating serving cells belonging to another base station to allow one terminal to secure a high data transmission rate or a dual connectivity technology between heterogeneous base stations (hereinafter, the inter-ENB carrier aggregation or the dual connectivity between the heterogeneous base stations are collectively called dual connectivity). Further, other fields like mobility support have been actively discussed, but as the existing carrier aggregation technology supported only within the base station may be applied between a macro base station and a pico cell or small cell base station, the dual connectivity technology is expected to have a big effect on future communication technologies.

As the use of data through a smart phone is suddenly increased in the future, the number of small cells is expected to be increased exponentially and the small cell base stations which may independently receive the terminals along with a configuration of the small cell using the existing remote radio head (RRH) are expected to take up a big part in a market. According to the dual connectivity technology, the terminal may receive other kinds of data from a macro base station as soon as it accesses the small cell to receive data.

The present embodiment can improve an uplink maximum transmission rate of a terminal by transmitting data of one bearer to two base stations.

Hereinafter, the present embodiments will be described in detail with reference to the accompanying drawings. In this case, it is noted that like reference numerals denote like elements in the accompanying drawings. Further, detailed descriptions related to well-known functions or configurations will be ruled out in order not to unnecessarily obscure the subject matter of the present invention.

Further, in describing in detail the present embodiment in the present specification, the 3GPP will define the standardized LTE as a major target. However, a main subject of the present invention may be slightly changed to be applied even to other communication systems having similar technical backgrounds without greatly departing the scope of the present invention, which may be determined by those skilled in the art to which the present invention pertains.

Hereinafter, prior to describing the present invention, an LTE system and carrier aggregation will be briefly described.

FIG. 1 is a diagram illustrating a structure of the LTE system to which the present embodiment is applied.

FIG. 1 is a diagram illustrating a structure of the LTE system to which the present embodiment is applied.

Referring to FIG. 1, a radio access network of the LTE system is configured to include next-generation base stations (evolved node B, hereinafter, ENB, Node B, or base station) 105, 110, 115, and 120, a mobility management entity (MME) 125, and a serving-gateway (S-GW) 130. User equipment (hereinafter, UE or terminal) 135 is connected to an external network through the ENBs 105, 110, 115, and 120 and the S-GW 130. In FIG. 1, the ENBs 105, 110, 115, and 120 correspond to the existing node B of a universal mobile telecommunications system (UMTS). The ENB is connected to the UE 135 through a radio channel and performs more complicated role than the existing node B.

In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel state of the UEs is required. Here, the ENBs 105, 110, 115, and 120 take charge of the collecting and scheduling. One ENB generally controls a plurality of cells. To implement a data transmission rate of 100 Mbps, the LTE system uses, as a radio access technology, orthogonal frequency division multiplexing (OFDM) in a bandwidth of 20 MHz. Further, an adaptive modulation and coding (hereinafter, called AMC) determining a modulation scheme and a channel coding rate depending on the channel status of the terminal is applied.

The S-GW 130 is an apparatus for providing a data bearer and generates or removes the data bearer according to the control of the MIME 125. The MME is an apparatus for performing a mobility management function for the terminal and various control functions and is connected to a plurality of base stations.

Figure 2:
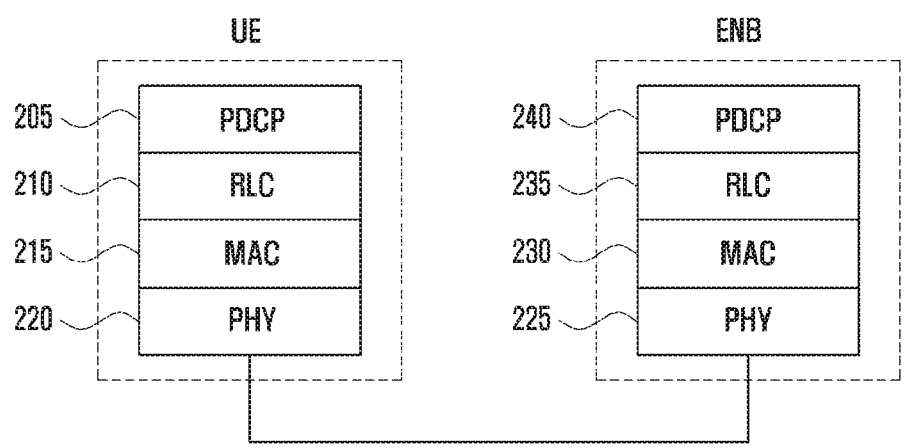
FIG. 2 is a diagram illustrating a radio protocol structure in an LTE system to which the present embodiment is applied.

FIG. 2 is a diagram illustrating a radio protocol structure in the LTE system to which the present embodiment is applied.

Referring to FIG. 2, the radio protocol of the LTE system consists of packet data convergence protocols (PDCPs) 205 and 240, radio link controls (RLCs) 210 and 235, and medium access controls (MMCs) 215 and 230 in the terminal and the ENB, respectively.

The PDCPs 205 and 240 take charge of the operation of the IP header compression/recovery, etc., and the RLCs 210 and 235 reconfigure the PDCP packet data unit (PDU) at an appropriate size to perform an automatic repeat reQuest (ARQ) operation, or the like. The MACs 215 and 230 are connected to several RLC layer apparatuses configured in one terminal and performs an operation of multiplexing RLC PDUs in an MAC PDU and demultiplexing the RLC PDUs.

Physical layers (PHYs) 220 and 225 perform an operation of channel-coding and modulating upper layer data, making them as an OFDM symbol, and transmitting them to the radio channel or an operation of demodulating the OFDM symbol received through the radio channel, channel-decoding it, and transmitting it to an upper layer.

Figure 3:
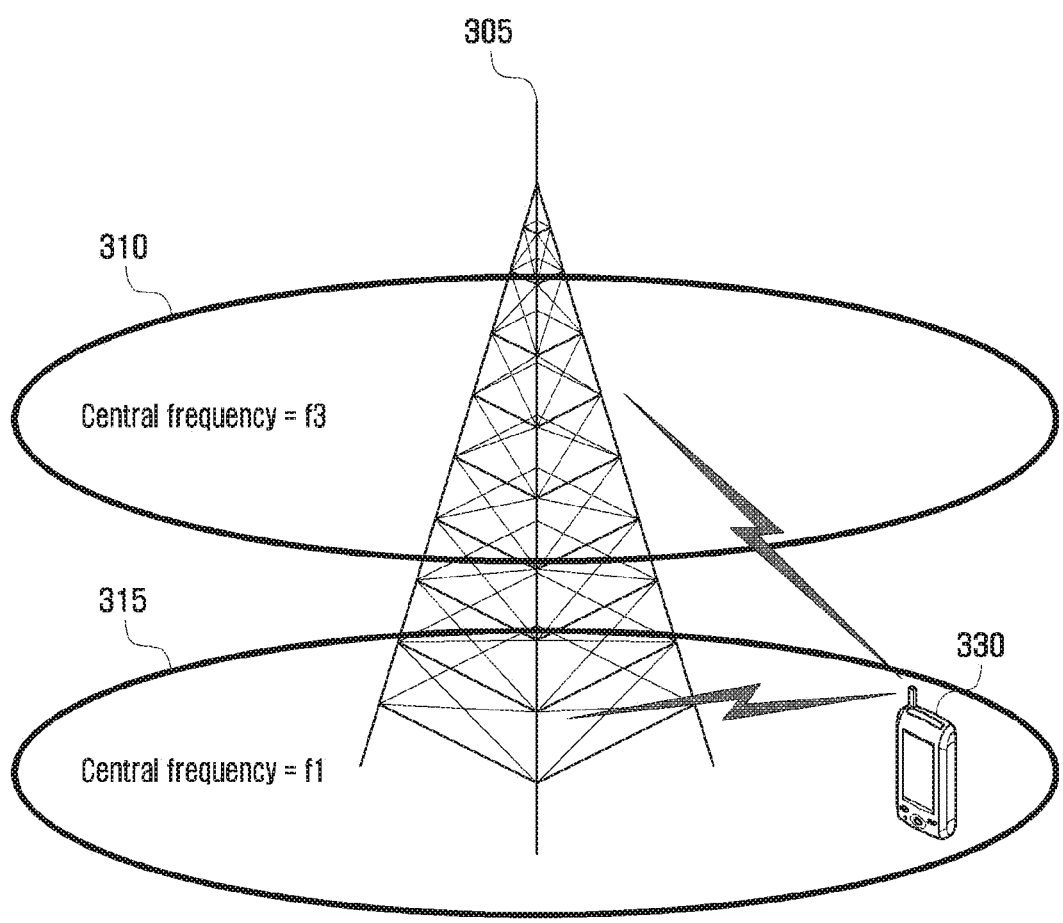
FIG. 3 is a diagram illustrating carrier aggregation within an LTE-A base station.

FIG. 3 is a diagram illustrating carrier aggregation within an LTE-A base station.

Referring to FIG. 3, one base station generally transmits and receives multi-carriers over several frequency bands. For example, when a carrier 315 of which the forward central frequency is f1 and a carrier 310 of which the forward central frequency is f3 are transmitted from the base station 305, in the related art, one terminal transmits and receives data using one of the two carriers 315 and 310.

However, the terminal having carrier aggregation ability may simultaneously transmit and receive data through several carriers. Therefore, the base station 305 may allocate more carriers to the terminal 330 having the carrier aggregation ability in some case to increase a data transmission rate of the terminal 330.

As described above, aggregating forward carriers and reverse carriers transmitted and received by one base station is called intra-ENB carrier aggregation. However, in some cases, unlike one illustrated in FIG. 3, it may be required to aggregate the forward carrier transmitted and received by one base station with the reverse carriers.

Figure 4:
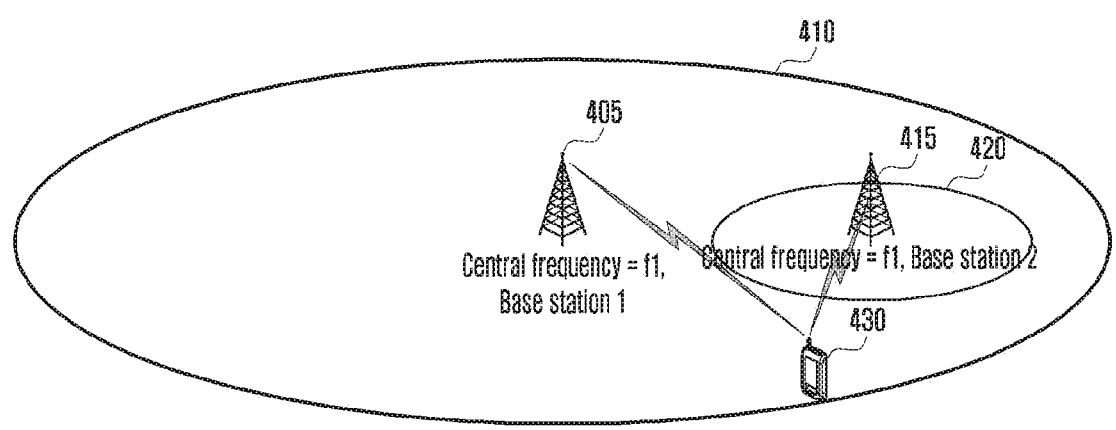
FIG. 4 is a diagram illustrating dual connectivity between base stations to which the present embodiment is applied.

FIG. 4 is a diagram illustrating dual connectivity between base stations to which the embodiment of the present invention is applied.

Referring to FIG. 4, when base station 1 (macro cell base station or MeNB) 405 transmits and receives a carrier 410 of which the central frequency is f1 and base station 2 (small cell base station or SeNB) 415 transmits and receives a carrier 420 of which the central frequency is f2, if the terminal 430 integrates the carrier 410 of which the forward central frequency is f1 and the carrier 420 of which the forward central frequency is f2, one terminal results in integrating carriers transmitted and received from at least two base stations. According to the embodiment of the present invention, the carrier aggregation is called inter-ENB carrier aggregation or dual connectivity.

Hereinafter, the terms frequently used in the present specification will be described.

As the traditional meaning, when one forward carrier transmitted from one bas station and one reverse carrier received by the base station configure one cell, the carrier aggregation may also be understood that the terminal simultaneously transmits and receives data through several cells. By doing so, the maximum transmission rate is increased in response to the integrated number of carriers.

Therefore, receiving, by the terminal, data through any forward carrier or transmitting, from the terminal, the data through any reverse carrier have the same meaning as transmitting and receiving the data through a control channel and a data channel which are provided from a cell a central frequency and a frequency band characterizing the carriers. Therefore, the carrier aggregation in the existing LTE 3GPP Release 10 standard has the same meaning as configuring a plurality of serving cells, in which the serving cell may be divided into a primary serving cell (hereinafter, PCell) and a secondary serving cell (hereinafter, SCell) according to the role of the respective serving cells. The PCell is a main serving cell taking charging of an access of the terminal to the network and mobility of the terminal and the SCell is a serving cell additionally configured at the time of the carrier aggregation to increase the uplink and downlink transmission and reception rate of the terminal and is mainly used to transmit user data.

In the dual connectivity, a set of the serving cells is newly defined as follows. The serving cells (PCell, SCell, and the like for the carrier aggregation) of the macro base station are divided into a primary cell group (PCG) (or master cell group (MCG)) and the serving cell (SCell, etc.) of the small cell base station is divided into a secondary cell group (SCG). The MCG means a set of the serving cells controlled by the macro base station (master base station, main base station, or MeNB) controlling the PCell and the SCG means a set of the serving cells controlled by the base station (secondary base station, sub-base station, or SeNB), not by the base station controlling the PCell. The base station instructs information on whether a predetermined serving cell belongs to the MCG or the SCG to the terminal while the corresponding serving cell is configured.

The main use purpose of the terms is to differentiate what cell is controlled by the base station controlling a PCell of a specific terminal and an operation scheme of the corresponding cell may be different depending on whether the cell is controlled by the base station (MeNB) controlling the PCell of the specific terminal and whether the cell is controlled by another base station (SeNB).

Figure 5:
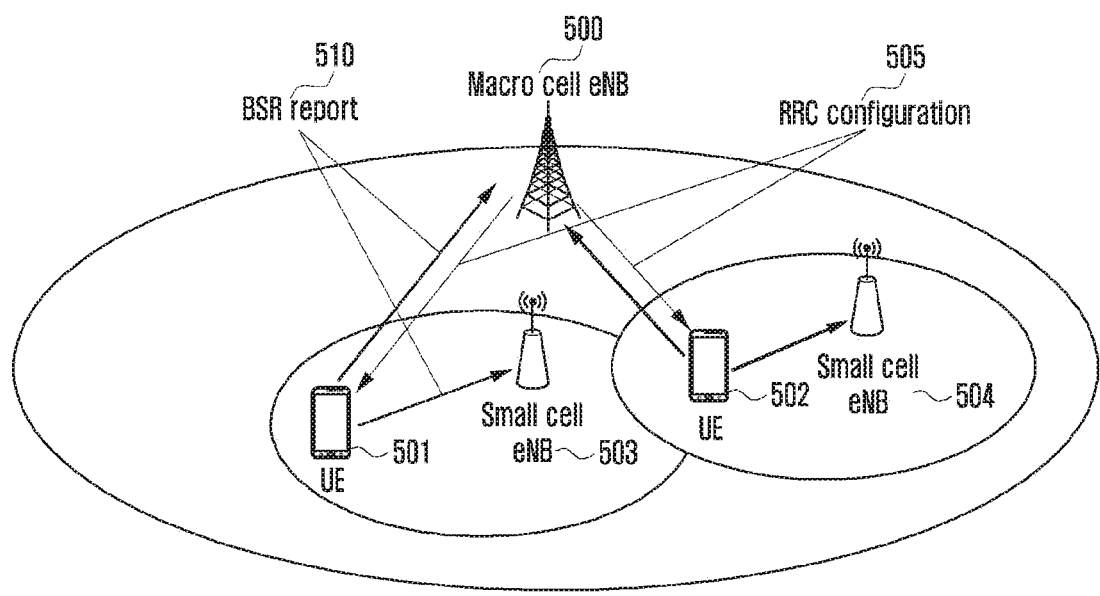
FIG. 5 is a diagram for describing an uplink bearer split operation of splitting and transmitting uplink data over MeNB and SeNb in the dual connectivity to which the embodiment of the present invention is applied.

FIG. 5 is a diagram for describing an uplink bearer split operation of splitting and transmitting uplink data over MeNB and SeNb in the dual connectivity to which the embodiment of the present invention is applied.

Referring to FIG. 5, terminals 501 and 502 transmits a serving cell group belonging to an MeNB 500 and SeNBs 503 and 504, that is, measurement information on the MCG or the SCG to the MeNB 500, such that the MeNB 500 determines whether to configure the serving cells of the SeNBs 503 and 504 for the dual connectivity in the terminals 501 and 502. In this case, for the cell included in the available range among the serving cells of the SCG, the MeNB 500 uses an RRC message to instruct the terminal to perform an access procedure for the corresponding cell (505).

In this case, the terminals 501 and 502 may simultaneously receive at least two bearers from the MeNB 500 and the SeNBs 503 and 504 in the state in which the multiple access for the cell is maintained. Further, one bearer may be simultaneously received through the MCG and the SCG to improve the transmission rate. This is called a downlink bearer split. Further, at least two uplink bearers may be transmitted by being divided into the SCG and the MCG as illustrated in FIG. 5. The technology may also be used to increase the transmission rate of the uplink bearer. In this case, as illustrated in FIG. 5, the buffer status report for the corresponding bearer may be separately reported to the MeNB 500 and the SeNBs 503 and 504 (510).

Figure 6:
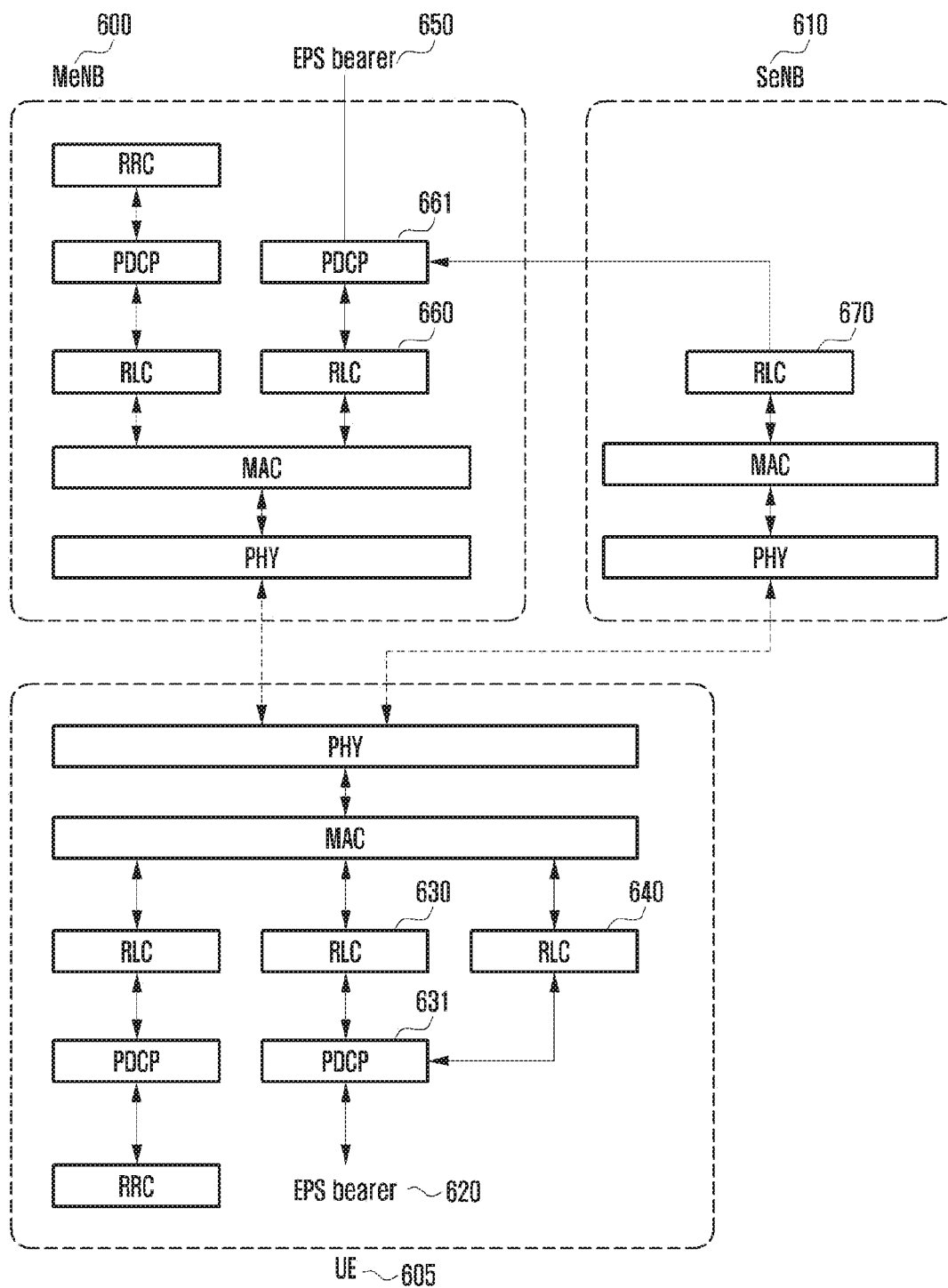
FIG. 6 is a diagram illustrating a protocol stack structure for bearer split to which the embodiment of the present invention is applied.

FIG. 6 is a diagram illustrating a protocol stack structure for bearer split to which the embodiment of the present invention is applied.

Referring to FIG. 6, the bearer split is split in the PDCP and a PDCP layer 661 of an MeNB 600 is connected to an RLC layer 660 of the MeNB 600 and an RLC layer 670 of an SeNB 610 and in the terminal 605, two RLC layers 630 and 640 under an internal PDCP layer 631 each have a structure corresponding to the MAC layer for the MCG and the SCG.

In the MeNB 600, an enhanced packet system (EPS) bearer 650 transmits the PDCP PDU to the RLC layer 660 of the MeNB 600 or the RLC layer 670 of the SeNB 610 in the PDCP layer (661) and schedules it. A scheduling method may be variously implemented depending on a radio link status of the two base stations 600 and 610 for the terminal 605 or a traffic status of the two base stations 600 and 610. Further, the terminal 605 needs to implement a function of reordering the PDCP PDUs received from the MeNB 600 and the SeNB 610 in order in the PDCP layer.

For the PDCP PDU lost depending on a reconfiguration of the PDCP in the current PDCP layer, a receiving side performs a procedure of requesting retransmission of the PDU that is not received through a PDCP status report. However, the PDCP function for the case in which the PDCP PDUs are not sequentially received by the bearer split is not defined in a current standard. Therefore, to sequentially transmit PDCP SDUs to an upper layer for the PDCP PDUs not sequentially received as described above in the PDCP layer, a specific buffer is disposed and thus the PDU that is not received may wait for a predetermined time. Alternatively, to reduce a time delay, a receiving apparatus may transmit a PDCP status report and request a retransmission of the corresponding PDCU PDU from a transmitting side.

Like the downlink bearer, even in the case of the uplink bearer in FIG. 6, the PDUs of the EPS bearer 620 are scheduled into the two RLC layers 630 and 640 in a PDCP layer 631 and the PDUs transmitted to each of the RLC layers 630 and 640 are transmitted to the MeNB 600 or the SeNB 610. In this case, a scheduler implemented in the PDCP layer dynamically splits and transmits the PDCP PDUs depending on the connection status to each of the base stations 600 and 610 or an uplink resource allocation status. Here, one PDCP PDU is not transmitted with being split (segmented) and is scheduled to two different connections for each PDCP PDU. Next, a function of approximately splitting the PDU and transmitting the split PDU to a resource depending on a radio status is performed in the RLC layers 630 and 640.

A buffer status report (BSR) is generated when data are first generated or data having upper priority are generated in such a manner that the terminal reports the uplink data status to the base station or is generated by a periodic timer. Based on the BSR, the base station may know the amount of data accumulated in the buffer of the terminal, and as a result the uplink radio resource allocation may be approximately scheduled to the terminal. When the independent bearer is transmitted to the MeNB or the SeNB in the dual connectivity, it may be performed depending on the BSR operation defined in the existing standard but when the bearer split is generated, the BSR operation is more complicated.

For example, the amount of buffer data included in the BSR by the terminal largely points out data included in the buffers of the RLC and the PDCP. In the case of the RLC, when a portion of the PDCP PDU segmented to meet the uplink resource to be transmitted to the lower MAC layer or only a portion of the specific PDCP PDU for logical channel prioritization (LCP) processing depending on a priority bit rate (PBR) of the MAC layer is included in the MAC frame, the rest portions needs to wait in the RLC buffer. Further, the process associated with the PDCP in the PDCP layer buffer, that is, RoHC (header compression), and the encrypted PDCP PDU and the PDCP SDU that is not processed may be present.

As illustrated in FIG. 6, data of the corresponding bearer for each cell group may be divided from the RLC layer but in the case of the PDCP layer, data may be transmitted to the MeNB MAC and may also be transmitted to the SeNB MAC depending on the scheduling, and therefore it is inaccurate which one of the two BSRs the data belong to. Further, the method for processing data is not defined in the current standard. Therefore, according to the embodiment of the present invention, a BSR transmission method depending on the bearer split is proposed.

Hereinafter, for explanation of description, the uplink split bearer is called a split bearer. The bearer through which data are transmitted and received only through the MCG is called an MCG bearer and the bearer through which data are transmitted and received through the SCG is called an SCG bearer.

Unless particularly described, abbreviations/terms used in the present invention follows one defined standards TS 36.211, 36.213, 36.213, 36.300, 36.321, 36.322, 36.323, and 36.331.

The biggest problem of the uplink split bearer may cause overlapping scheduling for the same data since the two base stations take charge of scheduling.

To solve the above problem, the present invention differentiates the buffer status report operation and the uplink data transmission operation of the buffer based on a predetermined threshold determined by the base station. Describing in more detail, the terminal is operated as follows depending on the data amount of the uplink split bearer (hereinafter, data amount).

TABLE 1

|  | Data amount < Threshold | Data amount ≥ Threshold |
|---|---|---|
| BSR triggering | To a single eNB | To a single ENB for type 1 triggering<br>To both ENBs for type 2 triggering |
| BSR reporting | To a single eNB | To both ENBs |
| Data transmission | To a single eNB | To both ENBs |

For example, if the data amount is equal to or less than the threshold, the terminal triggers the BSR only to the predefined base station and reports the BSR only to the base station. If the data amount is equal to or more than the threshold, the terminal triggers type 1 BSR to one base station and triggers type 2 BSR to both of the two base stations. A padding BSR, a periodic BSR, and a timer based regular BSR corresponds to type 1 BSR and a new data based regular BSR corresponds to type 2 BSR. If the data amount is larger than the threshold, the terminal reports the data to both of the two base stations and transmits the data to both of the two base stations. In other words, it may be considered that it is determined whether to apply the uplink split bearer operation based on the threshold.

Figure 7:
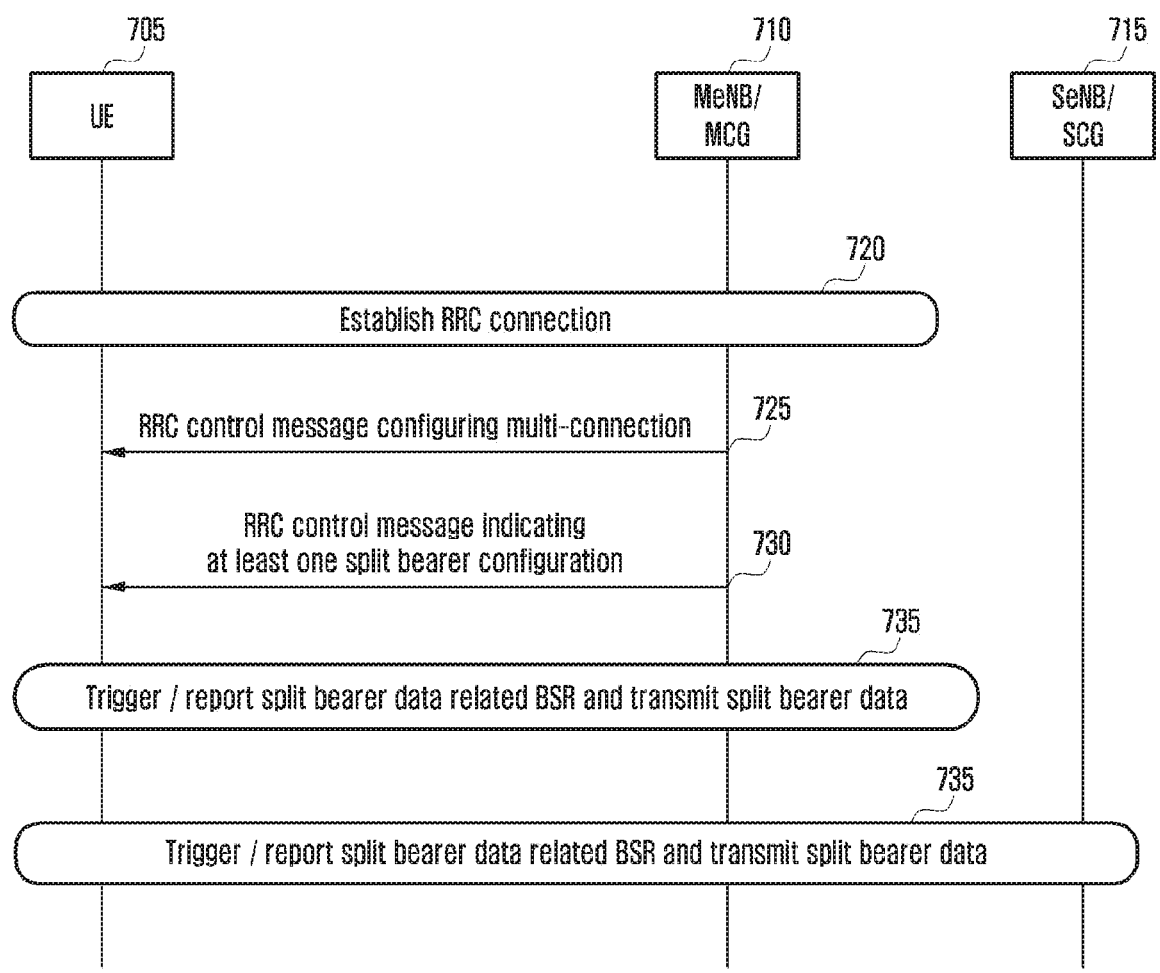
FIG. 7 is a diagram illustrating an operation of a terminal and a base station according to the present embodiment.

FIG. 7 illustrates the operation of the terminal and the base station according to the present embodiment.

In the mobile communication system configured to include a terminal 705, a main base station 710, and a sub-base station 715, the terminal establishes the RRC connection in the cell controlled by the main base station (720). The main base station may be understand as the above-mentioned MeNB and the sub-base station may be understood as the SeNB. Establishing the RRC connection means transmits a first control message to the base station through the random access process to set the connection between the base station and the signaling and after the establishment of the RRC connection, the terminal may transmit and receive user data to and from the base station.

In step 725, the base station generates the RRC control message establishing the dual connectivity and transmits it to the terminal. The following information may be received in the RRC control message.

SCG Configuration Information
SCG serving cell configuration information
Carrier frequency information of SCG serving cell (EU-TRA Absolute radio-frequency channel number, EARFCN)
Physical Cell identity (PCI) of SCG serving cell
Radio transmission resource related information of SCG serving cell, or the like
SCG MAC (MAC entity configured for SCG) configuration information
  Buffer status report configuration information
    Periodic report timer (periodicBSR-Timer) value
    BSR retransmission timer (retxBSR-Timer) value
  LCG (Logical Channel Group) configuration information
    Information indicating which LCG the SCG-bearer and the split bearer belong to
    Priority of SCG-bearer and split bearer The periodic report timer, the BSR retransmission timer, or the like are configured for each MAC entity. The periodic report timer, the BSR retransmission timer, or the like for the MCG MAC may be configured during the RRC connection establishing process.

In the step 730, the base station generates the RRC control message configuring at least one split bearer and transmits it to the terminal. The following information may be received in the RRC control message.

Split Bearer Configuration Information
Identifier of split bearer (bearer id)
PDCP configuration information of split bearer (PDCP-config)
  Threshold
  Cell group in charge when being less than threshold (hereinafter, cell group in charge, hereinafter, used together with an exclusive cell group)
MCG RLC configuration information of split bearer (RLC-config)
SCG RLC configuration information of split bearer (RLC-config)

The terminal configures the SCG, the SCG-MAC, and the split bearer according to the instruction of the RRC control message received in steps 725 and 730.

The PDCP configuration information of the split bearer may include the threshold and the cell group information in charge. The cell group information in charge is 1 bit information indicating the MCG or the SCG and when the data amount of the corresponding split bearer is lower than the threshold, indicates the cell group taking charge of the uplink transmission of the data of the bearer.

The cell group in charge may be replaced by an information element called the existing ul-DataSplitDRB-ViaSCG. If the threshold is allocated to the corresponding split bearer or the corresponding PDCP, the terminal reports the buffer status of the corresponding split bearer through the cell group instructed by the ul-DataSplitDRB-ViaSCG when the uplink data amount is equal to or less than the threshold and reports the buffer status of the corresponding split bearer using both cell groups including another cell group and transmits the data of the corresponding split bearer when the uplink data amount exceeds the threshold. If the threshold is not allocated to the corresponding split bearer or the corresponding PDCP, it is understood that an infinite as the threshold is set and the buffer status of the corresponding split bearer is always reported and the data of the corresponding split bearer are transmitted, through the cell group instructed by the ul-DataSplitDRB-ViaSCG.

The threshold may also be a value specified in a byte unit and may also be a buffer status (BS) index.

The BS index is an integer between 0 and 63 and is used as a usage indicating the BS of the BSR and is defined by a buffer size level defined in table 6.1.3.1-1 of standard TS 36.321 or an extended buffer size level defined in table 6.1.3.1-2.

Using the BS index as the threshold means that the threshold is not a single value but is a range and if the amount of transmittable PDCP data belongs to a range defined by the BS index specified as the threshold or exceeds a range defined by the BS index, it is considered that the amount of transmittable PDCP data is equal to or more than the threshold. Alternatively, if the amount of transmittable PDCP data is higher than the lowest value in the range defined by the BS index specified as the threshold, it is considered that the amount of transmittable PDCP data exceeds the threshold. For example, when the extended buffer size level 15 (147<BS<=181) is defined as the threshold, it is considered that the amount of transmittable PDCP data does not exceed the threshold if the amount of transmittable PDCP data is smaller than 147 bytes and exceeds the threshold if the amount of transmittable PDCP data exceeds the threshold. Alternatively, when the amount of transmittable PDCP data is converted into the extended buffer size level, it is considered that the amount of transmittable PDCP data exceeds the threshold if the value is equal to or higher than 15 and the amount of transmittable PDCP data does not exceed the threshold if the value is smaller than 15.

If it is determined whether the value exceeds the threshold, the base station determines what table will be used and notifies the terminal of the determined table. For example, the information instructing whether to analyze the threshold by using which of a buffer size table defined in table 6.1.3.1-1 and an extended buffer size level defined in 6.1.3.1-2 may be included in the control message configuring the split bearer or the control message configuring the SCG MAC.

In step 735, the terminal transmits the data of the split bearer. In this case, the terminal may report the buffer status of the split bearer only to the cell group in charge and transmit the data or report the buffer status of the split bearer to both base stations using both of both cell groups and transmit the data.

Figure 8:
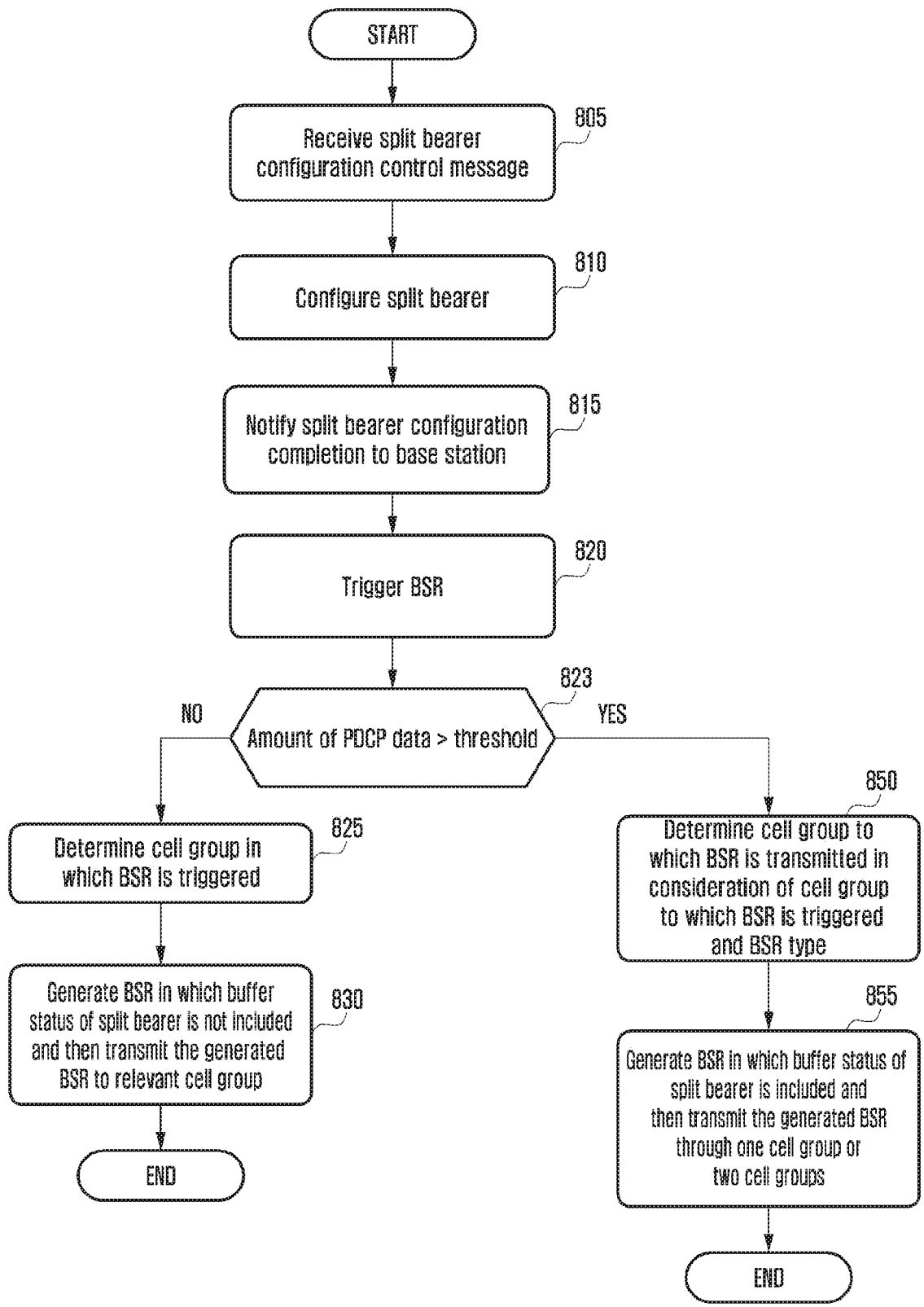
FIG. 8 is a flow chart illustrating the operation of the terminal according to the present embodiment.

FIG. 8 is a flow chart illustrating the terminal operation according to the present embodiment.

In step 805, the terminal receives the RRC control message configuring at least one split bearer from the base station. In step 810, the terminal configures the split bearer depending on the configuration information. The split bearer is configured to include an MCG RLC apparatus taking charge of transmitting and receiving the MCG data to and from one PDCP apparatus and an SCG RLC apparatus transmitting and receiving to and from one PDCP. In step 815, the terminal generates the RRC control message notifying that the split bearer configuration is completed and transmits the generated RRC control message to the base station.

In step 820, if the BSR is triggered depending on a predetermined condition, the terminal proceeds to the step 820 to check whether the data amount (or data amount of the LCG to which the split bearer belongs) of the split bearer exceeds the threshold and if exceeding, the terminal proceeds to step 850 and if not exceeding, the terminal proceeds to step 825.

The terminal proceeding to the step 825 checks to what cell group the BSR is triggered to determine that the BSR transmits the BSR to a triggered cell group. Hereinafter, triggering that the BSR is triggered to any cell group may be understood as the same meaning that the BSR is triggered to MAC entity (in the case of the MCG, MCG MAC and in the case of the SCG, SCG MAC) or to the corresponding eNB (in the case of MCG, MeNB and in the case of SCG, SeNB).

A method for determining to what cell group BSR is triggered will be described below.

Padding BSR: It is determined that if the MAC PDU in which the padding BSR is received is the MAC PDU transmitted to the MCG, the BSR is triggered to the MCG and if the MAC PDU in which the BSR is received is the MAC PDU to the SCG, the BSR is triggered to the SCG.

Periodic BSR: if the periodicBSR-Timer of the MCG MAC expires, the BSR is triggered to the MCG and if the periodicBSR-Timer of the SCG MAC expires, the BSR is triggered to the SCG.

Timer based regular BSR: if the retxBSR-Timer of the MCG MAC expires, the BSR is triggered to the MCG and if the retxBSR-Timer of the SCG MAC expires, the BSR is triggered to the SCG.

New data based regular BSR: It is triggered by new data of the split bearer, triggered to the MCG if an exclusive cell group (cell group in charge) is the MCG, and is triggered to the SCG if the exclusive cell group is the SCG.

In step 830, the terminal generates the BSR to set the buffer status (BS: refer to 6.1.3.1 of standard TS 36.321) to be an appropriate value and then transmits the BSR toward the corresponding eNB through the corresponding cell group determined according to the above-mentioned method. In this case, if the BSR is transmitted through the exclusive cell group, the BS of the LCG to which the split bearer belongs is summed (or considered) with the buffer status of the split bearer and if the BSR is not transmitted through the exclusive cell group, the BS of the LCG to which the split bearer belongs is not summed with the buffer status of the split bearer.

The terminal proceeding to the step 850 checks to what cell group the BSR is triggered and determines to what cell group the BSR is transmitted in consideration of the BSR type.

If the triggered BSR is type 1 BSR, the terminal transmits the BSR through the triggered cell group and if the triggered BSR is type 2 BSR, the terminal triggers the BSR to other cell groups as well as to the cell group to which the BSR is triggered and performs an operation required to transmit the BSR.

The padding BSR, the periodic BSR, and the timer based regular BSR corresponds to the type 1 BSR and the new data based regular BSR corresponds to the type 2 BSR.

For example, if the periodic BSR is triggered in an xCG (xCG may be the MCG or the SCG), even though the amount of transmittable data of split bearer is larger than the threshold, it is determined that the BSR is triggered only to the xCG and the terminal transmits the BSR only to the xCG.

Alternatively, if the padding BSR is triggered in an xCG, even though the amount of transmittable data of split bearer is larger than the threshold, it is determined that the BSR is triggered only to the xCG and the terminal transmits the BSR only to the xCG.

Alternatively, if the timer based regular BSR is triggered in an xCG, even though the amount of transmittable data of split bearer is larger than the threshold, it is determined that the BSR is triggered only to the xCG and the BSR is transmitted only to the xCG.

Differently from this, when new PDCP data are generated in the split bearer and thus the regular BSR is triggered, if the amount of transmittable data of the split bearer is larger than the threshold, the terminal is determined that the BSR is triggered to both of the MCG and the SCG and transmits the BSR through both of the MCG and the SCG. In this case, the terminal triggers a scheduling request (SR: refer to chapter 5.4.4 of standard TS 36.321) in the MCG MAC and the SCG MAC. For reference, the BSR and the padding BSR do not trigger the SR and the regular BSR triggers the SR.

In the step 855, the terminal generates the BSR to set the BS to be an appropriate value and then transmit the BS through the MCG and SCG. The BS of the LCG to which the split bearer belongs includes the amount of transmittable PDCP data of the split bearer.

Figure 9:
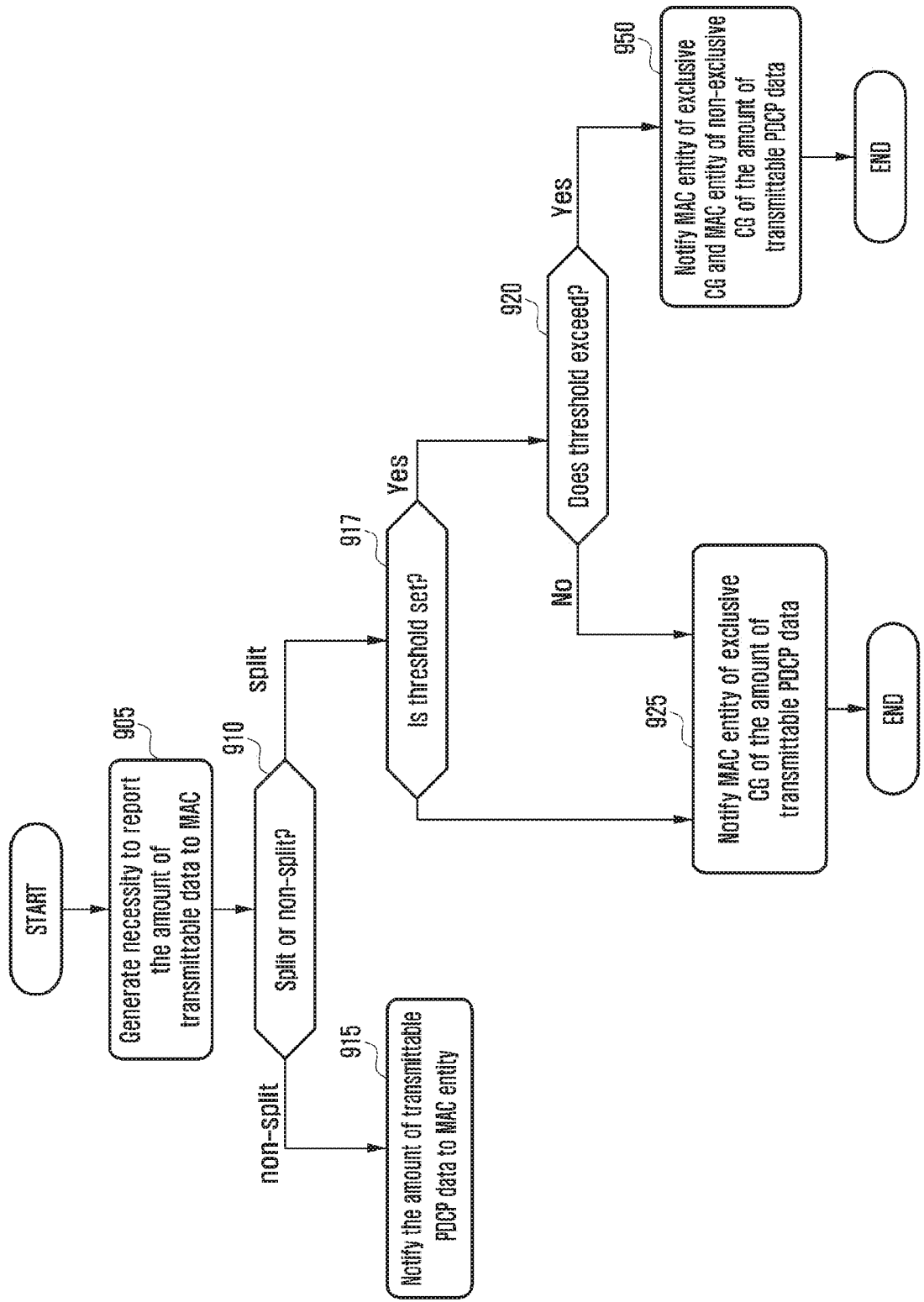
FIG. 9 is a diagram illustrating an operation of an MAC apparatus of the terminal and a PDCP apparatus of the terminal according to the present embodiment.

FIG. 9 is a diagram illustrating an operation of the MAC apparatus of the terminal and the PDCP apparatus of the terminal according to the present embodiment.

In the present embodiment, the MAC entity determines the transmittable data of the bearer connected thereto to generate the BSR. The amount of transmittable data of any bearer is a sum of the amount of transmittable data stored in the RLC apparatus and the PDCP apparatus. The amount of transmittable data stored in the PDCP apparatus of the split bearer may be recognized by both of the MCG MAC and the SCG MAC.

The present embodiment proposes a method for determining whether the PDCP apparatus indicates the amount of transmittable data to any MAC apparatus according to whether the amount of transmittable PDCP data exceeds the threshold.

If events such as generation of new data are generated periodically or according to a request of the MAC apparatus, the PDCP apparatus indicates the amount of transmittable data to the MAC apparatus. In this case, the PDCP apparatus of a non-split bearer (that is, MCG bearer and/or SCG bearer) and the PDCP apparatus of the split bearer indicate the amount of transmittable data to the MAC apparatus by different schemes.

In step 905, an event to indicate the amount of transmittable data from the PDCP apparatus to the MAC apparatus is generated. For example, the event corresponds to the case in which the MAC apparatus request the event or the event reaches the predefined indicate timing, the case in which the amount of transmittable data of the PDCP apparatus is changed, or the like.

In step 910, the PDCP apparatus determines whether the corresponding bearer is the split bearer or the non-split bearer. Alternatively, it is checked whether the exclusive cell group information (or information element ul-DataPath which may indicate the exclusive cell group) is configured in the PDCP apparatus.

In the case of the split bearer, it proceeds to step 917 and in the case of the non-split bearer, it proceeds to step 915.

In the step 915, the terminal indicates the amount of transmittable PDCP data to the MAC entity.

The amount of transmittable PDCP data is defined as follows.

For the purpose of MAC buffer status reporting, the UE shall consider PDCP Control PDUs, as well as the following as data available for transmission in the PDCP layer:
For SDUs for which no PDU has been submitted to lower layers:
the SDU itself, if the SDU has not yet been processed by PDCP, or
the PDU if the SDU has been processed by PDCP.
In addition, for radio bearers that are mapped on RLC AM, if the PDCP entity has previously performed the re-establishment procedure, the UE shall also consider the following as data available for transmission in the PDCP layer:
For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received:
the SDU, if it has not yet been processed by PDCP, or
the PDU once it has been processed by PDCP.

The terminal considers one not accepted by the lower layer as the PDCP control PDU and the PDU among the SDU as the transmittable data within the PDCP layer when the condition that it is the SDU not processed by the PDCP or the PDU processed by the PDCP is satisfied.

Further, when the bearer is mapped to the RLC AM, when the PDCP performs the reconfiguration process, and when the PDCP status report among the SDU is received, except for the SDU indicated that it is successfully transmitted by the PDCP report, the corresponding PDU at which the transfer of the corresponding PDU starts from the first SDU not confirmed by the lower layer is accepted by the lower layer prior to the PDCP reconfiguration, the terminal considers it as the transmittable data within the PDCP layer when the condition that it is the SDU not processed by the PDCP or the PDU processed by the PDCP.

In step 917, the PDCP apparatus checks whether the threshold is set and if set, it proceeds to step 920 and if not set, it proceeds to step 925.

In step 920, the terminal checks whether the amount of transmittable PDCP data exceeds the threshold and if exceeding, it proceeds to step 950 and if not exceeding, it proceeds to step 925.

In step 925, the terminal instructing that the amount of transmittable PDCP data only to the MAC entity configured for the cell group indicated by the exclusive cell group information (or information element ul-DataPath) and does not indicate the amount of transmittable PDCP data to another MAC entity. For example, if the exclusive cell group information (or ul-DataPath) instructs the SCG, the amount of transmittable data only to the MAC (SCG MAC) configured for the SCG is indicated.

In step 950, the terminal indicates the amount of transmittable PDCP data even to the MAC entity of another cell group as well as the MAC entity of the cell group instructed by the exclusive cell group information (or ul-DataPath). For example, even though the exclusive cell group information (or ul-DataPath) instructs the SCG, if the amount of transmittable data is equal to or more than the threshold, the amount of transmittable data is indicated to both of the SCG MAC and the MCG MAC.

If the PDCP apparatus is operated as described above, when new PDCP data are generated in an empty buffer in the MAC entity of the exclusive cell group, the regular BSR is triggered and if the PDCP data has priority higher than other transmittable data of the non-exclusive cell group, when the data amount of PDCP exceeds the threshold, the regular BSR is triggered in the MAC entity of the non-exclusive cell group.

Figure 10:
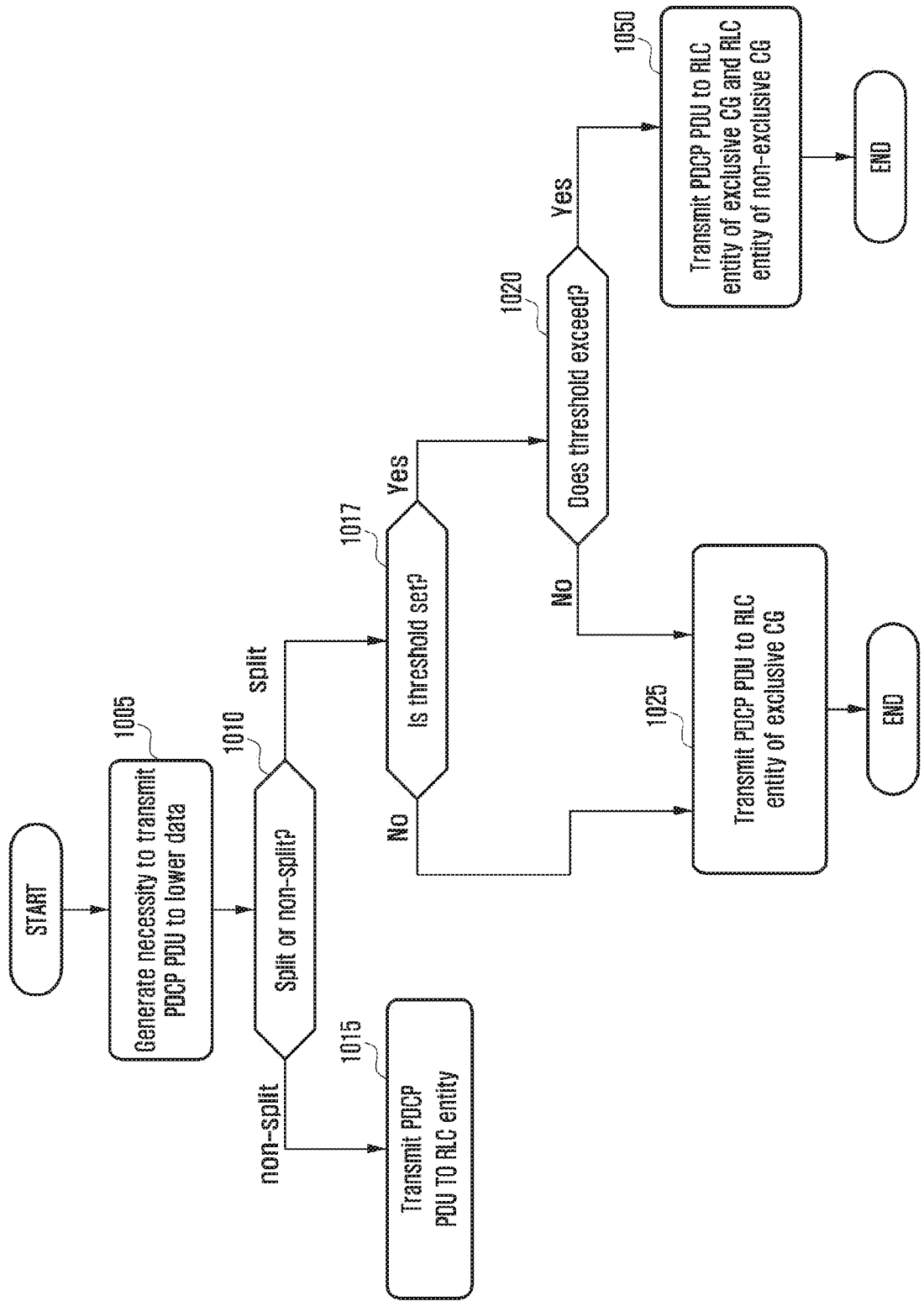
FIG. 10 is a diagram illustrating a method for transmitting, by the PDCP apparatus of the terminal, a PDCP PDU to a lower layer according to the present embodiment.

FIG. 10 is a diagram illustrating a method for transmitting, by a PDCP apparatus of a terminal, a PDCP PDU to a lower layer according to the present embodiment.

As illustrated in FIG. 10, The PDCP apparatus transmits the PDCP PDU to a lower layer according to the request of the lower layer apparatus. The PDCP apparatus transmits the PDCP PDU to the lower layer depending on the amount of transmittable PDCP data. In this case, the PDCP apparatus of the non-split bearer and the PDCP apparatus of the split bearer transmits the PDCP PDU to the RLC entity by different schemes.

In step 1005, an event to transmit the PDCP PDU from the PDCP apparatus to the lower layer apparatus is generated. For example, the event corresponds to the case of requesting the transmission of the data from the lower layer to the PDCP apparatus, etc.

In step 1010, the PDCP apparatus determines whether the corresponding bearer is the split bearer or the non-split bearer. Alternatively, it is checked whether the exclusive cell group information (or ul-DataPath) is configured in the PDCP apparatus.

In the case of the split bearer, it proceeds to step 1017 and in the case of the non-split bearer, it proceeds to step 1015.

The RLC apparatus connected to the PDCP apparatus is only one and therefore PDCP apparatus proceeding to step 1015 transmits the PDCP PDU to the connected RLC apparatus.

In step 1017, the PDCP apparatus checks whether the threshold is set and if set, it proceeds to step 1020 and if not set, it proceeds to step 1025.

In step 1020, the PDCP apparatus checks whether the amount of transmittable PDCP data exceeds the threshold and if exceeding, it proceeds to step 1050 and if not exceeding, it proceeds to step 1025.

The amount of transmittable PDCP data is an amount considered up to the PDCP PDU to be transmitted to the lower layer. For example, if the threshold is 1000 bytes and the amount of transmittable PDCP data at the corresponding timing is 1200 bytes, that is, the size of the PDUCP PDU to be transmitted to the lower layer is 300 bytes, it may be changed whether the amount of transmittable PDCP data exceeds the threshold depending on whether to consider the PDCP PDU to be transmitted to the lower layer. In this case, even though the PDCP is scheduled to be transmitted to the lower layer, it compares with the threshold by including the amount of transmittable PDCP data.

In step 1025, the PDCP apparatus transmits the PDCP PDU to RLC entity configured for exclusive CG. Alternatively, if the ul-DataPath is configured as the SCG, it is transmitted to the RLC entity configured for the SCG and if not, it is transmitted to the RLC entity configured for the MCG. Even though the PDCP apparatus receives a transmission request of the PDCP PDU, the PDCP apparatus does not transmit the PDCP PDU to RLC entities other than the RLC entity (or RLC entity configured for CG specified by the ul-DataPath) configured for the exclusive CG.

In step 1050, the PDCP apparatus transmits the PDCP PDU to the RLC entity requesting the transmission of the PDCP PDU without considering the exclusive CG or the ul-DataPath. As a result, the PDCP apparatus transmits the PDCP PDU to the RLC entities of an exclusive CG and a non-exclusive CG.

Figure 11:
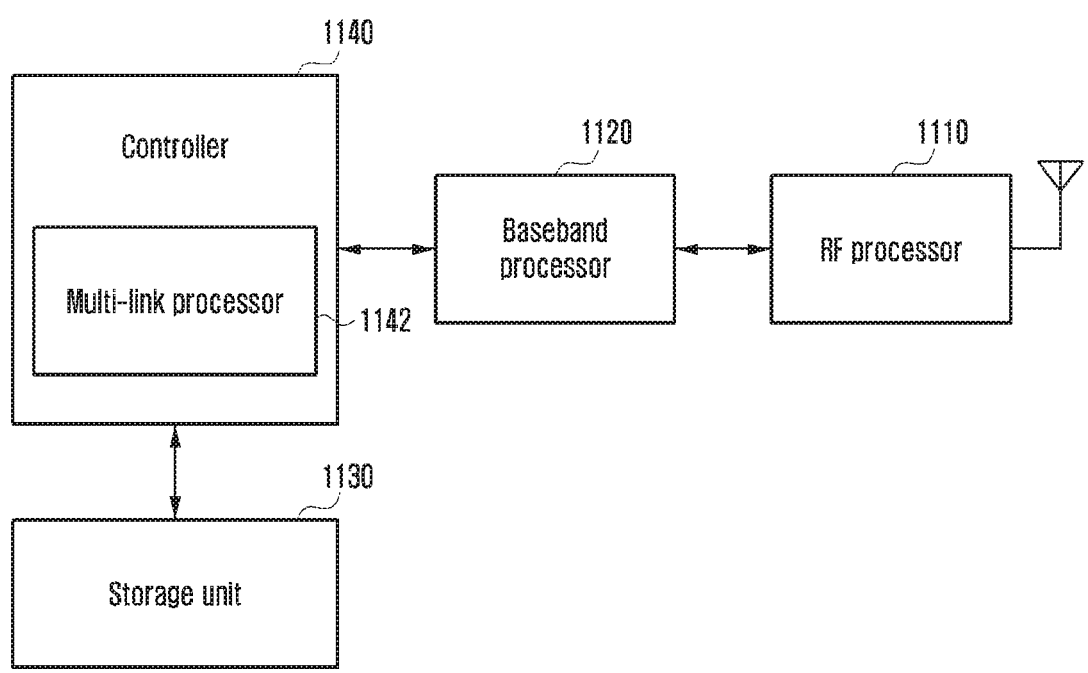
FIG. 11 is a block configuration diagram of a terminal in a wireless communication system according to the present embodiment.

FIG. 11 is a block configuration diagram of the terminal in the wireless communication system according to the present embodiment.

Referring to FIG. 11, the terminal includes a radio frequency (RF) processor 1110, a baseband processor 1120, a storage unit 1130, and a controller 1140.

The RF processor 1110 serves to transmit/receive as signal through a radio channel, such as band conversion and amplification of a signal. That is the RF processor 1110 up-converts a baseband signal provided from the baseband processor 1120 into an RF band signal and then transmits the baseband signal through an antenna and down-converts the RF band signal received through the antenna into the baseband signal. For example, the RF processor 1110 may include a transmitting filter, a receiving filter, an amplifier, a mixer, an oscillator, a digital to analog converter (DAC), an analog to digital converter (ADC), or the like. FIG. 11 illustrates only one antenna but the terminal may include a plurality of antennas. Further, the RF processor 1110 may include a plurality of RF chains. Further, the RF processor 1110 may perform beamforming. For the beamforming, the RF processor 1110 may adjust a phase and a size of each of the signals transmitted and received through a plurality of antennas or antenna elements.

The baseband processor 1120 performs a conversion function between the baseband signal and the bit string according to a physical layer standard of the system. For example, when data are transmitted, the baseband processor 1120 generates complex symbols by coding and modulating a transmitting bit string. Further, when data are received, the baseband processor 1120 recovers the receiving bit string by demodulating and decoding the baseband signal provided from the RF processor 1110. For example, according to the orthogonal frequency division multiplexing (OFDM) scheme, when data are transmitted, the baseband processor 1120 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 1120 divides the baseband signal provided from the RF processor 1110 in an OFDM symbol unit and recovers the signals mapped to the sub-carriers by a fast Fourier transform (FFT) operation and then recovers the receiving bit string by the modulation and decoding.

The baseband processor 1120 and the RF processor 1110 transmit and receive a signal as described above. Therefore, the baseband processor 1120 and the RF processor 1110 may be called a transmitter, a receiver, a transceiver, or a communication unit. Further, at least one of the baseband processor 1120 and the RF processor 1110 may include a plurality of communication modules to support a plurality of different radio access technologies. Further, at least one of the baseband processor 1120 and the RF processor 1110 may include different communication modules to process signals in different frequency bands. For example, the different radio access technologies may include the wireless LAN (IEEE 802.11), a cellular network (LTE), or the like. Further, the different frequency bands may include a super high frequency (SHF) (2.5 GHz, 5 GHz) band, a millimeter wave (60 GHz) band.

The storage unit 1130 stores data such as basic programs, application programs, and configuration information for the operation of the terminal. In particular, the storage unit 1130 may store information associated with a second access node performing wireless communication using a second access technology. Further, the storage unit 1130 provides the stored data according to the request of the control unit 1140.

The controller 1140 controls the general operations of the terminal. For example, the controller 1140 transmits/receives a signal through the baseband processor 1120 and the RF processor 1110. Further, the controller 1140 records and reads data in and from the storage unit 1140. For this purpose, the controller 1140 may include at least one processor. For example, the controller 1140 may include a communication processor (CP) performing a control for communication and an application processor (AP) controlling an upper layer such as the application programs. According to the embodiment of the present invention, the controller 1140 may control the terminal to perform the operation and the procedure of the terminal illustrated in FIGS. 7 to 10.

Figure 12:
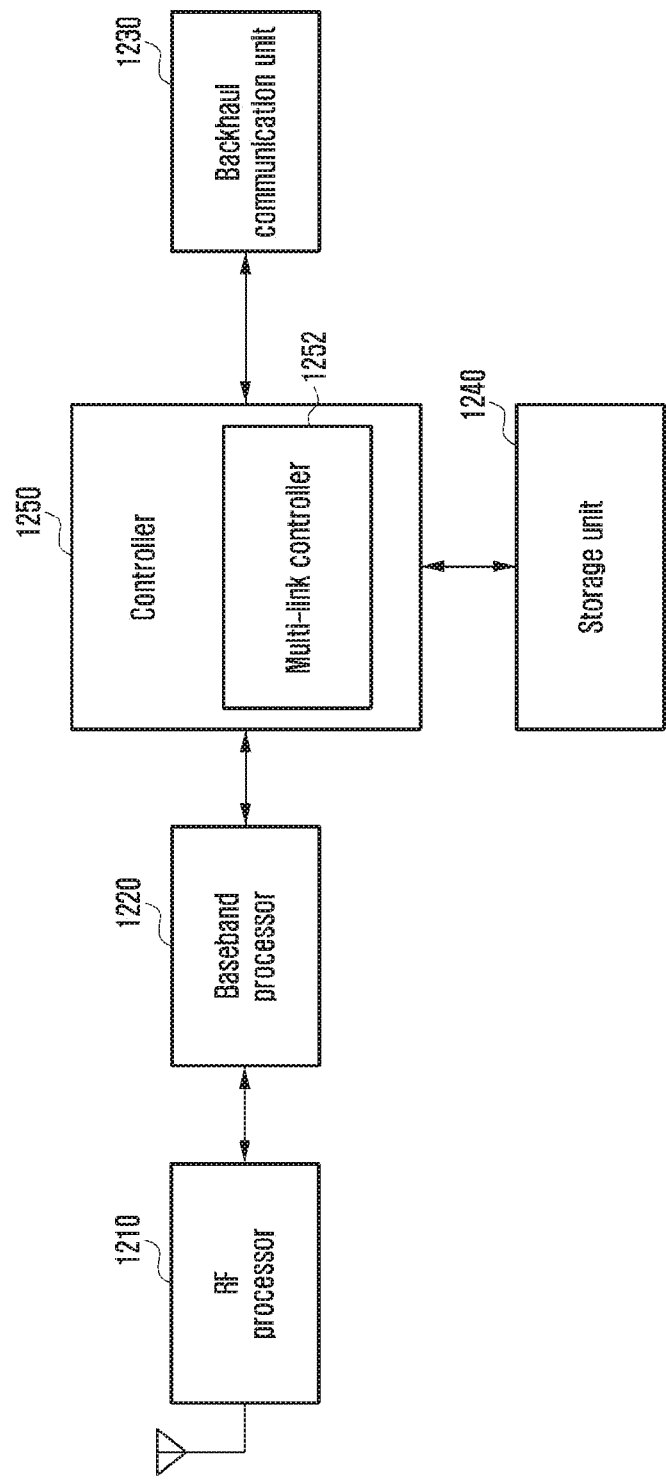
FIG. 12 is a block configuration diagram of a main base station in a wireless communication system according to the present embodiment.

FIG. 12 is a block configuration diagram of a main base station in a wireless communication system according to an exemplary embodiment of the present disclosure.

As illustrated in FIG. 12, the base station is configured to include an RF processor 1210, a baseband processor 1220, a backhaul communication unit 1230, a storage unit 1240, and a controller 1250.

The RF processor 1210 serves to transmit/receive as signal through a radio channel, such as band conversion and amplification of a signal. That is, the RF processor 1210 up-converts a baseband signal provided from the baseband processor 1220 into an RF band signal and then transmits the baseband signal through an antenna and down-converts the RF band signal received through the antenna into the baseband signal. For example, the RF processor 1210 may include a transmitting filter, a receiving filter, an amplifier, a mixer, an oscillator, a DAC, an ADC, etc. FIG. 12 illustrates only one antenna but the base station may include a plurality of antennas. Further, the RF processor 1210 may include the plurality of RF chains. Further, the RF processor 1210 may perform the beamforming. For the beamforming, the RF processor 1210 may adjust a phase and a size of each of the signals transmitted and received through a plurality of antennas or antenna elements.

The baseband processor 1220 performs a conversion function between the baseband signal and the bit string according to the physical layer standard of the system. For example, when data are transmitted, the baseband processor 1220 generates complex symbols by coding and modulating a transmitting bit string. Further, when data are received, the baseband processor 1220 recovers the receiving bit string by demodulating and decoding the baseband signal provided from the RF processor 1210. For example, according to the OFDM scheme, when data are transmitted, the baseband processor 1220 generates the complex symbols by coding and modulating the transmitting bit string, maps the complex symbols to the sub-carriers, and then performs the IFFT operation and the CP insertion to configure the OFDM symbols. Further, when data are received, the baseband processor 1220 divides the baseband signal provided from the RF processor 1210 in the OFDM symbol unit and recovers the signals mapped to the sub-carriers by the FFT operation and then recovers the receiving bit string by the modulation and decoding. The baseband processor 1220 and the RF processor 1210 transmit and receive a signal as described above. Therefore, the baseband processor 1220 and the RF processor 1210 may be called a transmitter, a receiver, a transceiver, a communication unit, or a wireless communication unit.

The backhaul communicator 1230 provides an interface for performing communication with other nodes within the network. That is, the backhaul communication unit 1230 converts bit strings transmitted from the main base station to other nodes, for example, an auxiliary base station, a core network, etc., into physical signals and converts the physical signals received from other nodes into the bit strings.

The storage unit 1240 stores data such as basic programs, application programs, and setting information for the operation of the main base station. In particular, the storage unit 1240 may store the information on the bearer allocated to the accessed terminal, the measured results reported from the accessed terminal, etc. Further, the storage unit 1240 may store information that is the determination reference on whether to provide a multi-link to the terminal or store the multi-link to the terminal. Further, the storage unit 1240 provides the stored data according to the request of the control unit 1250.

The controller 1250 controls the general operations of the main base station. For example, the controller 1250 transmits/receives a signal through the baseband processor 1220 and the RF processor 1210 or the backhaul communicator 1230. Further, the controller 1250 records and reads data in and from the storage unit 1240. For this purpose, the controller 1250 may include at least one processor. According to the embodiment of the present invention, the controller 1250 includes a multi-link controller 1252 that performs a control to provide the multi-link to the terminal. For example, the controller 1250 may control the main base station to perform the operation and the procedure of the base station illustrated in FIGS. 7 to 10.

Second Embodiment

Generally, a mobile communication system has been developed to provide communication while securing mobility of a user. The mobile communication system may provide a voice communication service and a high-speed data communication service by virtue of the rapid progress of technologies.

In recent years, as one of the next-generation mobile communication systems, standardization for a long term evolution (LTE) system in 3rd generation partnership project (3GPP) is in progress. The LTE system is a technology of implementing high-speed packet based communications having a transmission rate a maximum of 100 Mbps higher than a data transmission rate now being provided and the standardization for the LTE system is almost complete currently.

Recently, discussions about an advanced LTE communication system (LTE-advanced (LTE-A)) which increases a transmission rate by combining various new technologies with the LTE communication system have started in earnest. A representative of the technologies to be newly introduced may include carrier aggregation (used together with carrier wave aggregation, carrier wave collection, etc.). Conventionally, a terminal uses only one forward carrier and one reverse carrier to transmit and receive data. Differently from this, however, the carrier aggregation allows one terminal to use a plurality of forward carriers and a plurality of reverse carriers to transmit and receive data.

In the current LTE-A, only intra-ENB carrier aggregation is defined. This results in reducing applicability of the carrier aggregation. In particular, in a scenario of overlappingly operating a plurality of pico cells and one micro cell, a problem in that a macro cell and a pico cell are not integrated may be caused. To solve the problem, the 3GPP Release 12 has conducted a study named 'Small cell enhancement'. The study is mainly focusing on the inter-ENB carrier aggregation for integrating serving cells belonging to another base station to allow one terminal to secure a high data transmission rate or a dual connectivity technology between heterogeneous base stations (hereinafter, the inter-ENB carrier aggregation or the dual connectivity between the heterogeneous base stations are collectively called dual connectivity). Further, other fields like mobility support have been actively discussed, but as the existing carrier aggregation technology supported only within the base station may be applied between a base station and a pico cell or small cell base station, the dual connectivity technology is expected to have a big effect on future communication technologies.

As the use of data through a smart phone is suddenly increased in the future, the number of small cells is expected to be increased exponentially and the small cell base stations which may independently receive the terminals along with a configuration of the small cell using the existing remote radio head (RRH) are expected to take up a big part in a market. According to the dual connectivity technology, the terminal may receive other kinds of data from a macro base station as soon as it accesses the small cell to receive data.

The present embodiment can improve an uplink maximum transmission rate of a terminal by transmitting data of one bearer to two base stations.

Hereinafter, the present embodiments will be described in detail with reference to the accompanying drawings. In this case, it is noted that like reference numerals denote like elements in the accompanying drawings. Further, detailed descriptions related to well-known functions or configurations will be ruled out in order not to unnecessarily obscure the subject matter of the present invention.

Further, in describing in detail the present embodiment in the present specification, the 3GPP will define the standardized LTE as a major target. However, a main subject of the present invention may be slightly changed to be applied even to other communication systems having similar technical backgrounds without greatly departing the scope of the present invention, which may be determined by those skilled in the art to which the present invention pertains.

Hereinafter, prior to describing the present embodiment, an LTE system and carrier aggregation will be briefly described.

Figure 13:
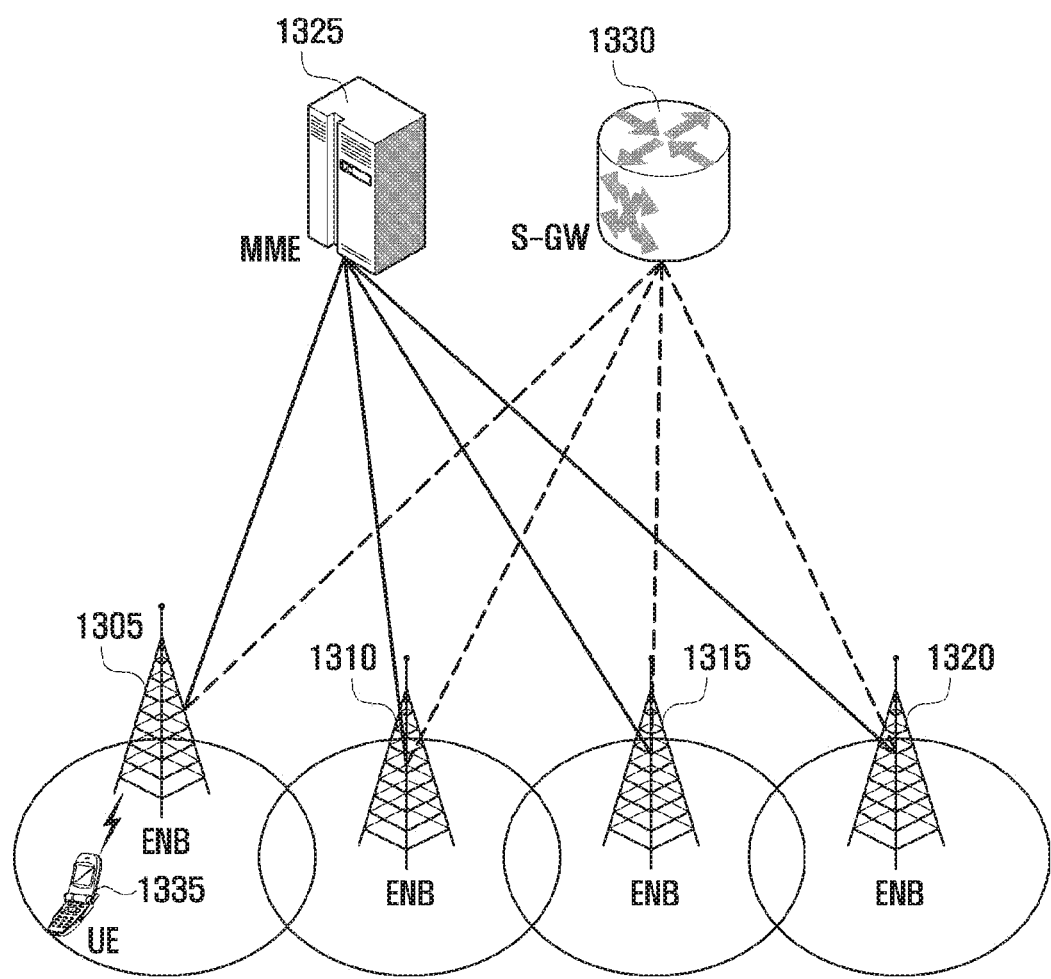
FIG. 13 is a diagram illustrating a structure of the LTE system to which the present embodiment is applied.

FIG. 13 is a diagram illustrating a structure of the LTE system to which the present embodiment is applied.

Referring to FIG. 13, a radio access network of the LTE system includes next-generation base stations (evolved node B, hereinafter, ENB, Node B, or base station) 1305, 1310, 1315, and 1320, a mobility management entity (MME) 1325, and a serving-gateway (S-GW) 1330. User equipment (hereinafter, UE or terminal) 135 is connected to an external network through the ENBs 1305, 1310, 1315, and 1320 and the S-GW 1330. In FIG. 13, the ENBs 1305, 1310, 1315, and 1320 correspond to the existing node B of a universal mobile telecommunications system (UMTS). The ENB is connected to the UE 1335 through a radio channel and performs more complicated role than the existing node B.

In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel status of the UEs is required. Here, the ENBs 1305, 1310, 1315, and 1320 take charge of the collecting and scheduling. One ENB generally controls a plurality of cells. To implement a data transmission rate of 100 Mbps, the LTE system uses, as a radio access technology, orthogonal frequency division multiplexing (hereinafter, OFDM) in a bandwidth of 20 MHz. Further, an adaptive modulation and coding (hereinafter, called AMC) determining a modulation scheme and a channel coding rate depending on the channel status of the terminal is applied.

The S-GW 1330 is an apparatus for providing a data bearer and generates or removes the data bearer according to the control of the MME 1325. The MME is an apparatus for performing a mobility management function for the terminal and various control functions and is connected to a plurality of base stations.

Figure 14:
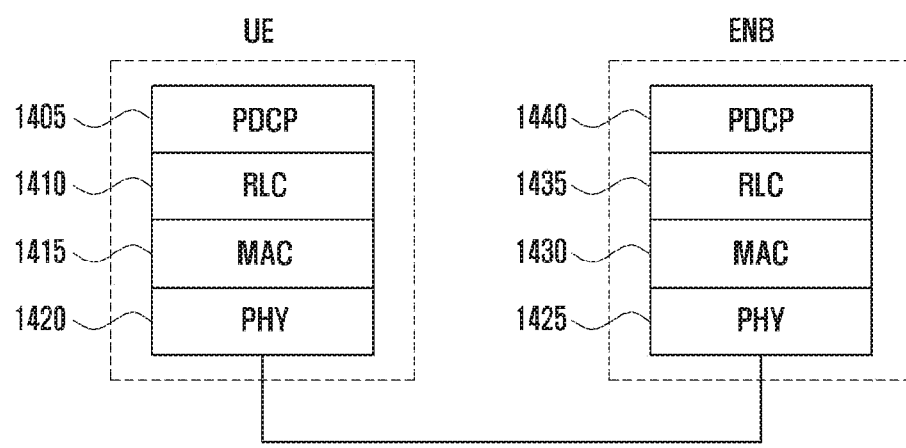
FIG. 14 is a diagram illustrating a radio protocol structure in an LTE system to which the present embodiment is applied.

FIG. 14 is a diagram illustrating a radio protocol structure in the LTE system to which the present embodiment is applied.

Referring to FIG. 14, the radio protocol of the LTE system consists of packet data convergence protocols (PDCPs) 1405 and 1440, radio link controls (RLCs) 1410 and 1435, and medium access controls (MACs) 1415 and 1430 in the terminal and the ENB, respectively.

The PDCPs 1405 and 1440 take charge of an operation of IP header compression/recovery, etc., and the RLCs 1410 and 1435 reconfigure a PDCP packet data unit (PDU) at an appropriate size to perform an automatic repeat reQuest (ARQ) operation, or the like. The MACs 1415 and 1430 are connected to several RLC layer apparatuses configured in one terminal and performs an operation of multiplexing RLC PDUs into an MAC PDU and demultiplexing the RLC PDUs from the MAC PDU.

Physical layers (PHYs) 1420 and 1425 perform an operation of channel-coding and modulating upper layer data, making them as an OFDM symbol, and transmitting them to the radio channel or an operation of demodulating the OFDM symbol received through the radio channel, channel-decoding it, and transmitting it to an upper layer.

Figure 15:
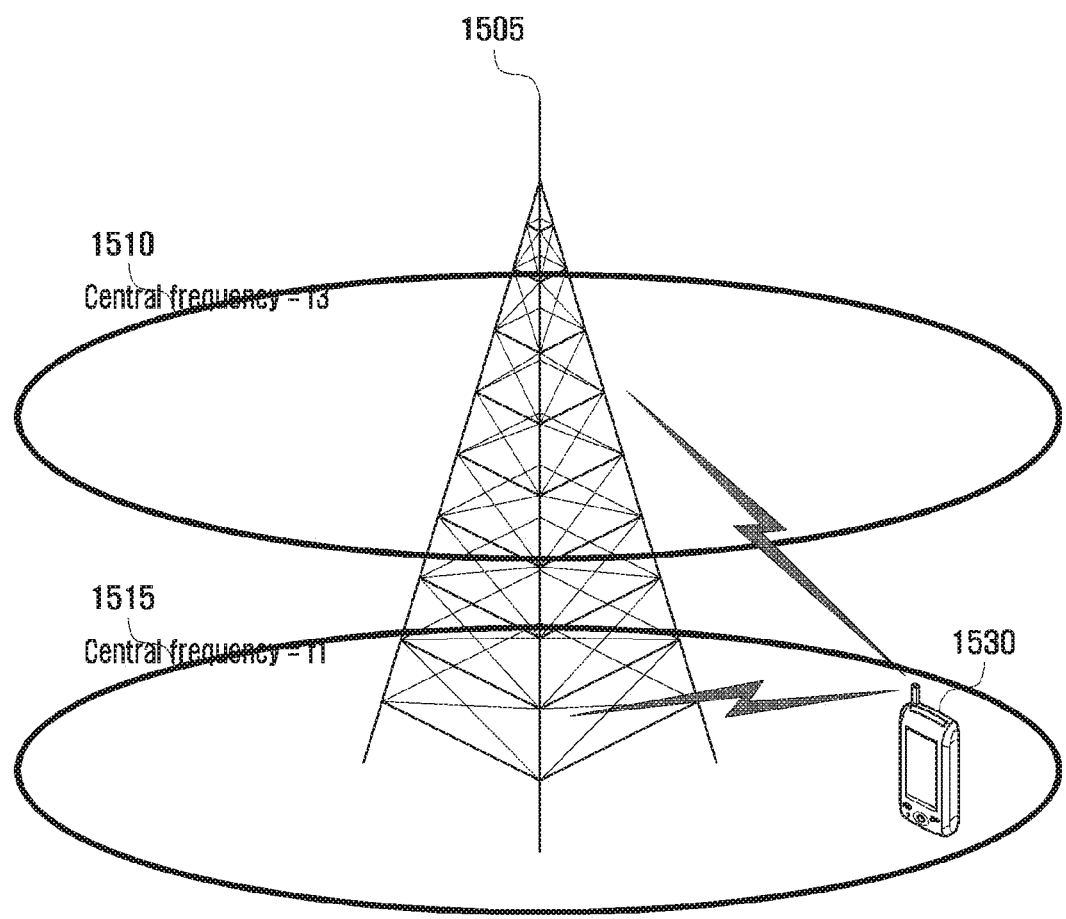
FIG. 15 is a diagram illustrating carrier aggregation within an LTE-A base station.

FIG. 15 is a diagram for describing carrier aggregation within an LTE-A base station.

Referring to FIG. 15, one base station generally transmits and receives multi-carriers over several frequency bands. For example, when a carrier 1505 of which the forward central frequency is f1 and a carrier 1510 of which the forward central frequency is f3 are transmitted from the base station 1505, in the related art, one terminal transmits and receives data using one of the two carriers 1515 and 1510.

However, a terminal having carrier aggregation ability may simultaneously transmit and receive data through several carriers. Therefore, the base station 1505 may allocate more carriers to the terminal 1530 having the carrier aggregation ability in some case to increase a data transmission rate of the terminal 1530.

As described above, aggregating forward carriers and reverse carriers transmitted and received by one base station is called intra-ENB carrier aggregation. However, in some cases, unlike one illustrated in FIG. 15, it may be required to aggregate forward carriers and reverse carriers transmitted and received by different base stations.

Figure 16:
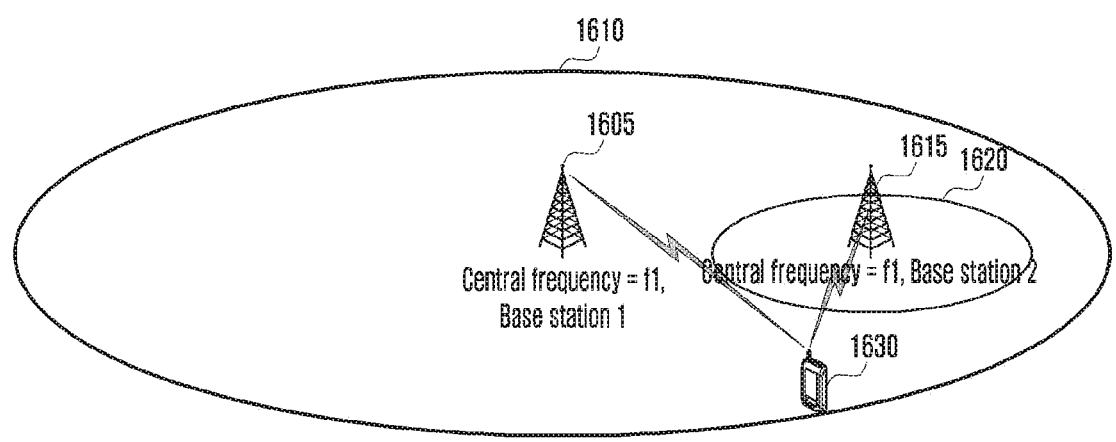
FIG. 16 is a diagram illustrating dual connectivity between base stations to which the present embodiment is applied.

FIG. 16 is a diagram illustrating dual connectivity between base stations to which the embodiment of the present invention is applied.

Referring to FIG. 16, when base station 1 (macro cell base station or MeNB) 1605 transmits and receives a carrier 1610 of which the central frequency is f1 and base station 2 (small cell base station or SeNB) 1615 transmits and receives a carrier 1620 of which the central frequency is f2, if the terminal 1630 integrates a carrier 1610 of which the forward central frequency is f1 and a carrier 1620 of which the forward central frequency is f2, one terminal results in integrating carriers transmitted and received from at least two base stations. According to the embodiment of the present invention, the carrier aggregation is called inter-ENB carrier aggregation or dual connectivity.

Hereinafter, the terms frequently used in the present specification will be described.

As the traditional meaning, when one forward carrier transmitted from one bas station and one reverse carrier received by the base station configure one cell, the carrier aggregation may also be understood that the terminal simultaneously transmits and receives data through several cells. By doing so, the maximum transmission rate is increased in response to the integrated number of carriers.

Therefore, receiving, by the terminal, data through any forward carrier or transmitting, from the terminal, the data through any reverse carrier have the same meaning as transmitting and receiving the data through a control channel and a data channel which are provided from a cell a central frequency and a frequency band characterizing the carriers. Therefore, the carrier aggregation in the existing LTE 3GPP Release 10 standard has the same meaning as configuring a plurality of serving cells, in which the serving cell may be divided into a primary serving cell (hereinafter, PCell) and a secondary serving cell (hereinafter, SCell) according to the role of the respective serving cells. The PCell is a main serving cell taking charging of an access of the terminal to the network and mobility of the terminal and the SCell is a serving cell additionally configured at the time of the carrier aggregation to increase the uplink and downlink transmission and reception rate of the terminal and is mainly used to transmit user data.

In the dual connectivity, a set of the serving cells is newly defined as follows. The serving cells (PCell, SCell, and the like for the carrier aggregation) of the macro base station are divided into a primary cell group (PCG) (or master cell group (MCG)) and the serving cell (SCell, etc.) of the small cell base station is divided into a secondary cell group (SCG). The MCG means a set of the serving cells controlled by the macro base station (master base station, main base station, or MeNB) controlling the PCell and the SCG means a set of the serving cells controlled by the base station (secondary base station, subObase station, or SeNB), not by the base station controlling the PCell. The base station instructs information on whether a predetermined serving cell belong to the MCG or the SCG to the terminal while the corresponding serving cell is configured.

The main use purpose of the terms is to differentiate what cell is controlled by the base station controlling a PCell of a specific terminal and an operation scheme of the corresponding cell may be different depending on whether the cell is controlled by the base station (MeNB) controlling the PCell of the specific terminal and whether the cell is controlled by another base station (SeNB).

Unless particularly described, abbreviations/terms used in the present invention follows defined standards 3GPP TS 36.211, 36.213, 36.213, 36.300, 36.321, 36.322, 36.323, and 36.331.

The present invention proposes a power headroom report (PHR) operation associated with the dual connectivity.

The PHR allows the terminal to report the available transmission power to the base station and if the predetermined condition is satisfied, the terminal transmits the PHR to the base station. Three kinds of PHAR formats of a normal PHR format, an extended PHR format, and a dual connectivity PHR format may be present.

Figure 17:
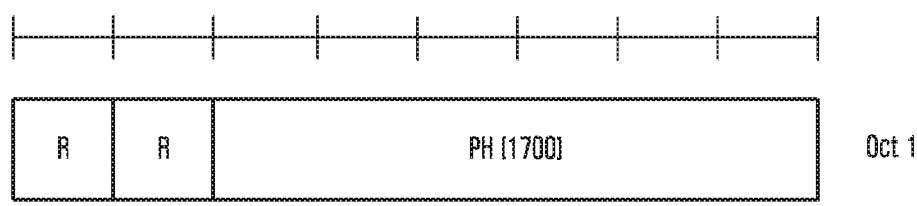
FIG. 17 is a diagram illustrating a normal PHR format.

FIG. 17 is a diagram illustrating the normal PHR format. According to FIG. 17, PH information on one serving cell is received in the normal PHR format, in which the PH 1700 is 6 bit indexes and have a value between 0 and 63.

FIG. 18 is a diagram illustrating the extended PHR format. According to FIG. 18, the extended PHR format includes the PH information and PCMAX information which is the maximum information of the terminal on a plurality of serving cells. The terminal transmits the PH of the serving cells which is in the activated state at the corresponding timing and is included in the extended PHR to the base station.

FIG. 19 is a diagram illustrating the dual connectivity PHR format. Referring to FIG. 19, the dual connectivity PHR format is similar to the extended PHR format and includes another type 2 PH 1900 for the primary secondary cell (PSCell) which may transmit uplink control information among the serving cells configured in the sub-base station, compared to the extended PHR.

The base station may determine whether the PHR function is configured in any terminal and what format is used to instruct the terminal.

An element defining the PHR function is several. An example of the element may include a parameter specifying a PHR triggering event, a parameter controlling periodic PHR transmission, etc. The information is transmitted to the terminal through the upper layer signal (used together mixed RRC signaling) while being received in the information element called phr-Config.

The PHR format transmitted from the terminal to the base station is determined by parameter of extendedPHR and dualconnectivityPHR. If either of the two information is not signaled, the normal PHR format is used, if the extendedPHR is signaled, the extendedPHR format is used, and if the dualconnectivityPHR is signaled, the dualconnectivity PHR format is used. The base station determines what format is applied in consideration of the current situation.

Figure 20:
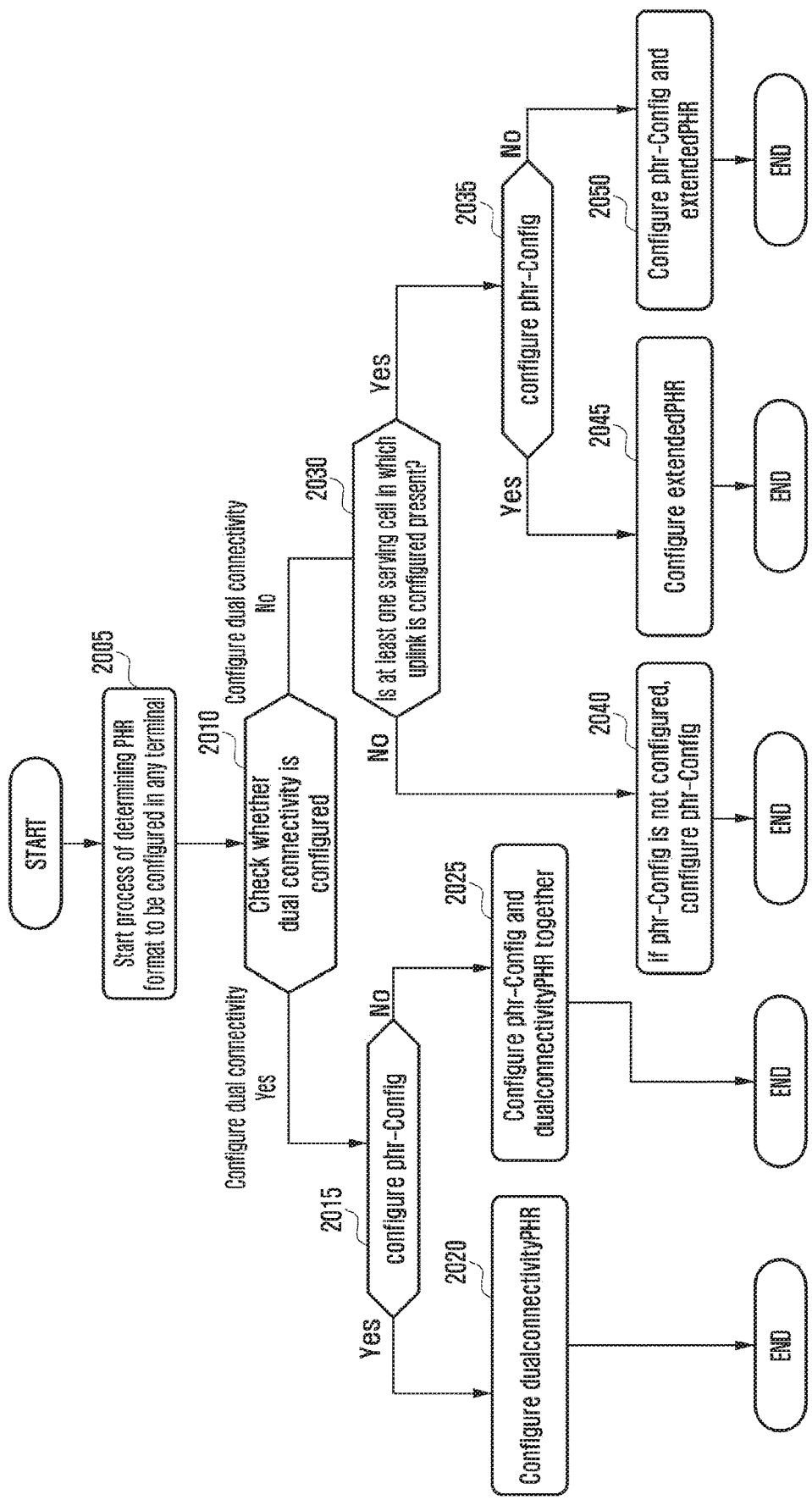
FIG. 20 is a diagram illustrating a process of determining the PHR format which the base station applies according to the present embodiment.

FIG. 20 illustrates a process of determining the PHR format to which the base station will be applied, according to the present embodiment.

Referring to FIG. 20, in step 2005, the base station starts a process of determining the PHR format which will be configured in any terminal.

In step 2010, the base station checks whether the dual connectivity is configured in the terminal. Alternatively, it is checked whether the SCG is configured in the terminal or the SCG MAC is configured in the terminal.

As the check result, if the dual connectivity is configured, it proceeds to the step 2015 and if the dual connectivity is not configured, it proceeds to step 2030.

In step 2015, the base station checks whether the phr-Config is configured and if configured, it proceeds to step 2020 and if not configured, it proceeds to step 2025.

In the step 2020, the base station configures the dual connectivity PHR format in the terminal. That is, the RRC control message in which the dualconnectivity PHR is configured as setup in the terminal is generated and transmitted to the terminal.

In step 2025, the base station generates the phr-Config receiving parameters appropriate for the terminal and the RRC control message including the dualconnectivity PHR configured as the setup and transmits the generated phr-Config and RRC control message to the terminal.

In step 2030, the base station checks whether the serving cell with configured uplink is one or more and if so, that is, if the uplink is configured in the plurality of serving cell, it proceeds to step 2035 and if only one serving cell with configured uplink is present, it proceeds to step 2040.

In step 2035, the base station checks whether the phr-Config is configured in the terminal and if configured, it proceeds to step 2045 and if not configured, it proceeds to step 2050.

In the step 2045, the base station configures the extended PHR format in the terminal. That is, the RRC control message in which the extendedPHR is configured as setup is generated and transmitted to the terminal.

In step 2050, the base station generates the phr-Config receiving appropriate parameters and the RRC control message including the extendedPHR configured as the setup and transmits the generated phr-Config and RRC control message to the terminal.

In the step 2040, the base station configures the normal PHR format in the terminal. If the phr-Config is not configured in the terminal, the base station generates the RRC control message in which the phr-Config is received and transmits the generated RRC control message to the terminal.

Figure 21:
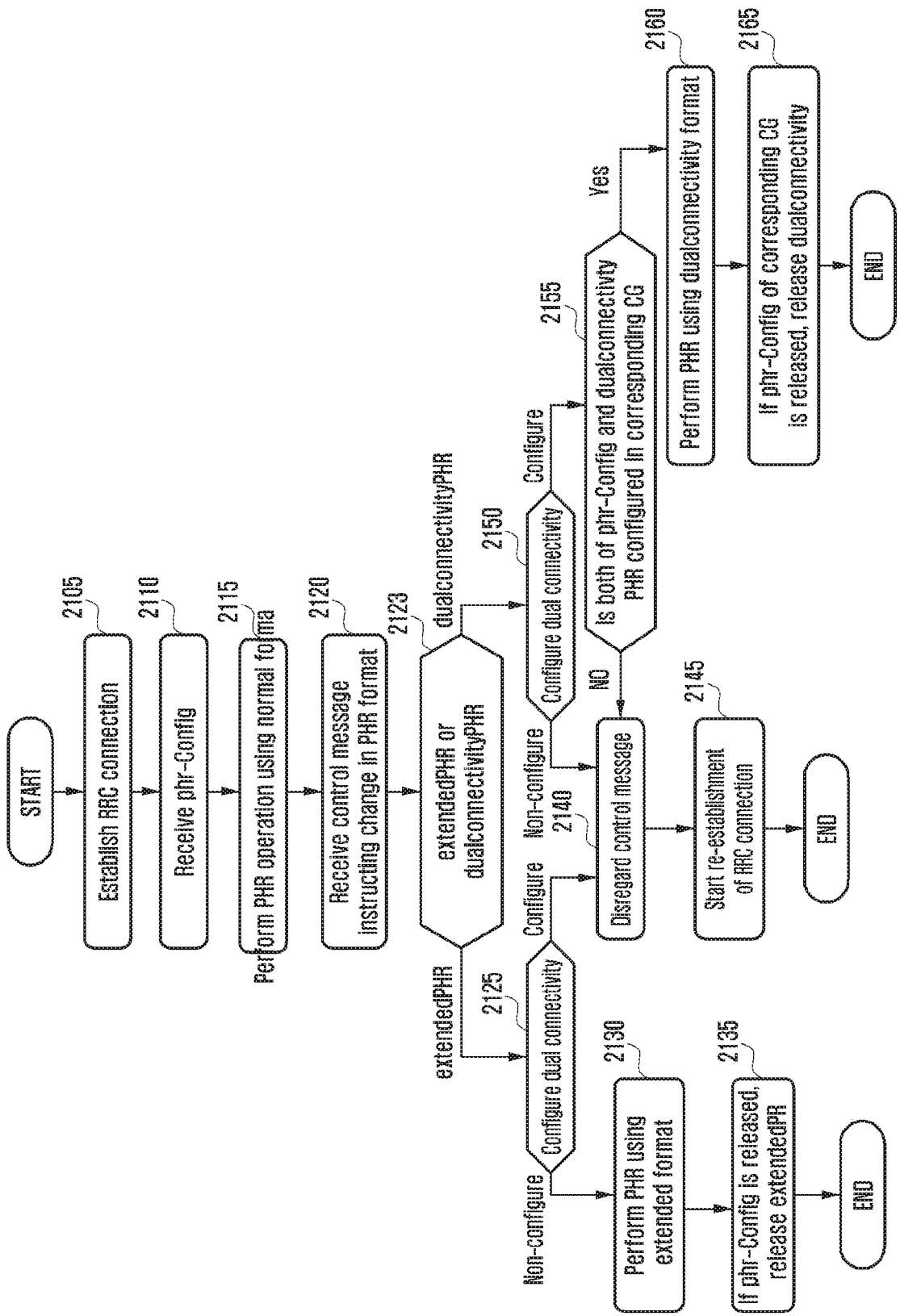
FIG. 21 is a flow chart illustrating the operation of the terminal according to the present embodiment.

FIG. 21 illustrates the terminal operation according to the present embodiment.

Referring to FIG. 21, in step 2105, the terminal establishes the RRC connection to the base station.

If the base station needs to configure the PHR function in performing the transmission and reception to and from the terminal, the base station generates the RRC control message including the phr-Config and transmits the generated RRC control message to the terminal. In step 2110, the terminal receiving the phr-Config configures the PHR function according to one instructed in the control information and proceeds to step 2115 to apply the normal PHR format, thereby performing the PHR operation.

In step 2120, when the terminal receives the control message instructing the change in the PHR format, the terminal proceeds to step 2123.

In step 2123, the terminal checks whether the extendedPHR is included in the control message or the dualConnectivityPHR is included in the control message, and if the extendedPHR is included, the terminal proceeds to step 2125 and if the dualConnectivityPHR is included, the terminal proceeds to step 2150.

Next, in step 2125, the terminal checks whether the dual connectivity is configured therein, and if configured, the terminal proceeds to step 2140 and if not configured, the terminal proceeds to step 2130.

In step 2130, the terminal applies the extended PHR format to perform the PHR. If the base station instructs that the phr-Config is released in the future, the terminal releases the extended PHR together (2135).

In step 2140, the terminal disregards the received control message, and the terminal proceeds to step 2145 to start an RRC connection re-establishment procedure. The reason is that the dual connectivity is configured in the terminal but the extendedPHR indicated as the control message by the base station is an obvious error, and therefore the current RRC connection is highly likely to be wrong.

In step 2150, the terminal receiving the control message in which the dualConnectivityPHR is included checks whether the dual connectivity is configured, and if the dual connectivity is configured, the terminal proceeds to step 2155 and if the dual connectivity is not configured, the terminal proceeds to step 2140.

The terminal proceeding to step 2155 checks whether both of the phr-Config and the dualConnectivityPHR are configured in one cell group (for example, MCG or SCG) and if not configured, the terminal proceeds to step 2140 and if configured, the terminal proceeds to step 2160. Proceeding from the step 2155 to the step 2140 means that the case in which the phr-Config for the MAC of the cell group instructed by the dualConnectivityPHR is not configured is generated. Proceeding from the step 2155 to the step 2160 means that the phr-Config for the MAC of the cell group instructed by the dualConnectivityPHR is configured.

The terminal proceeding to the step 2160 performs the PHR applying the dualConnectivity PHR format to the cell group in which both of the phr-Config and the dualConnectivityPHR are configured.

Next, in step 2165, if the base station instructs the release of the phr-Config of the CG in the future, even though the base station does not separately instruct the release for the dualConnectivityPHR, the dualConnectivityPHR of the CG is released together.

In summary, the base station configures the PHR in the terminal, and therefore the dual connection is not configured and the extendedPHR is set as setup for the terminal in which the uplink is configured in at least one serving cell and the dualConnectivityPHR is configured as setup for the configured terminal.

If both of the dualConnectivityPHR and the phr-Config are configured for one cell group, the terminal uses the dualConnectivity PHR format to perform the PHR. Further, if the phr-Config is released for the CG, the dualConnectivityPHR of the corresponding CG is released together.

Figure 22:
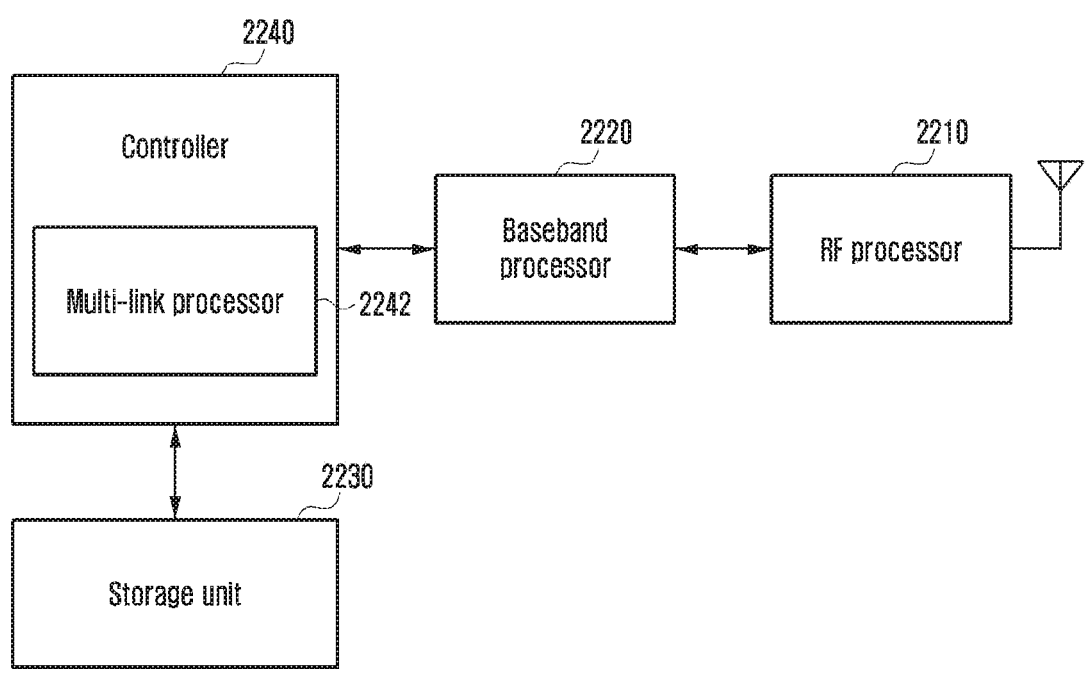
FIG. 22 is a block configuration diagram of a terminal in a wireless communication system according to the present embodiment.

FIG. 22 is a block configuration diagram of a terminal in a wireless communications system according to an exemplary embodiment of the present disclosure.

Referring to FIG. 22, the terminal includes a radio frequency (RF) processor 2210, a baseband processor 2220, a storage unit 2230, and a controller 2240.

The RF processor 2210 serves to transmit/receive as signal through a radio channel, such as band conversion and amplification of a signal. That is, the RF processor 2210 up-converts a baseband signal provided from the baseband processor 2220 into an RF band signal and then transmits the baseband signal through an antenna and down-converts the RF band signal received through the antenna into the baseband signal. For example, the RF processor 2210 may include a transmitting filter, a receiving filter, an amplifier, a mixer, an oscillator, a digital to analog converter (DAC), an analog to digital converter (ADC), or the like. FIG. 22 illustrates only one antenna but the terminal may include a plurality of antennas. Further, the RF processor 2210 may include the plurality of RF chains. Further, the RF processor 2210 may perform beamforming. For the beamforming, the RF processor 2210 may adjust a phase and a size of each of the signals transmitted and received through a plurality of antennas or antenna elements.

The baseband processor 2220 performs a conversion function between the baseband signal and the bit string according to a physical layer standard of the system. For example, when data are transmitted, the baseband processor 2220 generates complex symbols by coding and modulating a transmitting bit string. Further, when data are received, the baseband processor 2220 recovers the receiving bit string by demodulating and decoding the baseband signal provided from the RF processor 2210. For example, according to the orthogonal frequency division multiplexing (OFDM) scheme, when data are transmitted, the baseband processor 2220 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 2220 divides the baseband signal provided from the RF processor 2210 in an OFDM symbol unit and recovers the signals mapped to the sub-carriers by a fast Fourier transform (FFT) operation and then recovers the receiving bit string by the modulation and decoding.

The baseband processor 2220 and the RF processor 2210 transmit and receive a signal as described above. Therefore, the baseband processor 2220 and the RF processor 2210 may be called a transmitter, a receiver, a transceiver, or a communication unit. Further, at least one of the baseband processor 2220 and the RF processor 2210 may include a plurality of communication modules to support a plurality of different radio access technologies. Further, at least one of the baseband processor 2220 and the RF processor 2210 may include different communication modules to process signals in different frequency bands. For example, the different radio access technologies may include the wireless LAN (for example: IEEE 802.11), a cellular network (for example: LTE), or the like. Further, different frequency bands may include a super high frequency (SHF) (for example: 2.5 GHz, 5 GHz) band, a millimeter wave (for example: 60 GHz) band.

The storage unit 2230 stores data such as basic programs, application programs, and configuration information for the operation of the terminal. In particular, the storage unit 2230 may store information associated with a second access node performing wireless communication using a second access technology. Further, the storage unit 2230 provides the stored data according to the request of the control unit 2240.

The controller 2240 controls the general operations of the terminal. For example, the controller 2240 transmits/receives a signal through the baseband processor 1420 and the RF processor 2210. Further, the controller 2240 records and reads data in and from the storage unit 2240. For this purpose, the controller 1440 may include at least one processor. For example, the controller 2240 may include a communication processor (CP) performing a control for communication and an application processor (AP) controlling an upper layer such as the application programs. According to the embodiment of the present invention, the controller 2240 may control the terminal to perform the operation and the procedure of the terminal illustrated in FIGS. 20 and 21.

Figure 23:
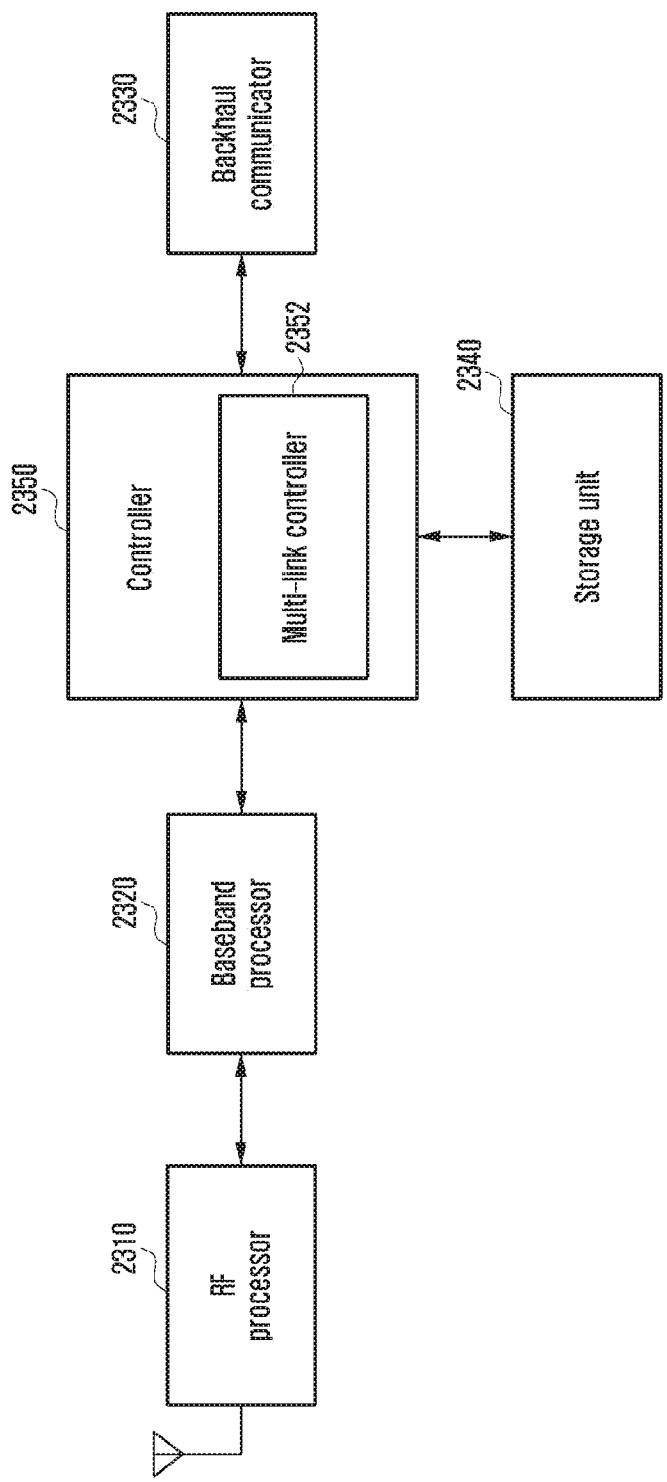
FIG. 23 is a block configuration diagram of a base station in a wireless communication system according to the present embodiment.

FIG. 23 is a block configuration diagram of a main base station in a wireless communication system according to an exemplary embodiment of the present disclosure.

As illustrated in FIG. 23, the bas station is configured to include an RF processor 2310, a baseband processor 2320, a backhaul communication unit 2330, a storage unit 2340, and a controller 2350. The base station may be the main base station.

The RF processor 2310 serves to transmit/receive as signal through a radio channel, such as band conversion and amplification of a signal. That is, the RF processor 2310 up-converts a baseband signal provided from the baseband processor 2320 into an RF band signal and then transmits the baseband signal through an antenna and down-converts the RF band signal received through the antenna into the baseband signal. For example, the RF processor 2310 may include a transmitting filter, a receiving filter, an amplifier, a mixer, an oscillator, a DAC, an ADC, etc. FIG. 23 illustrates only one antenna but the base station may include a plurality of antennas. Further, the RF processor 2310 may include the plurality of RF chains. Further, the RF processor 2310 may perform the beamforming. For the beamforming, the RF processor 2310 may adjust a phase and a size of each of the signals transmitted and received through a plurality of antennas or antenna elements.

The baseband processor 2320 performs a conversion function between the baseband signal and the bit string according to the physical layer standard of the system. For example, when data are transmitted, the baseband processor 2320 generates complex symbols by coding and modulating a transmitting bit string. Further, when data are received, the baseband processor 2320 recovers the receiving bit string by demodulating and decoding the baseband signal provided from the RF processor 2310. For example, according to the OFDM scheme, when data are transmitted, the baseband processor 2320 generates the complex symbols by coding and modulating the transmitting bit string, maps the complex symbols to the sub-carriers, and then performs the IFFT operation and the CP insertion to configure the OFDM symbols. Further, when data are received, the baseband processor 2320 divides the baseband signal provided from the RF processor 2310 in the OFDM symbol unit and recovers the signals mapped to the sub-carriers by the FFT operation and then recovers the receiving bit string by the modulation and decoding. The baseband processor 2320 and the RF processor 2310 transmit and receive a signal as described above. Therefore, the baseband processor 2320 and the RF processor 2310 may be called a transmitter, a receiver, a transceiver, a communication unit, or a wireless communication unit.

The backhaul communicator 2330 provides an interface for performing communication with other nodes within the network. That is, the backhaul communication unit 2330 converts bit strings transmitted from the main base station to other nodes, for example, an auxiliary base station, a core network, etc., into physical signals and converts the physical signals received from other nodes into the bit strings.

The storage unit 2340 stores data such as basic programs, application programs, and setting information for the operation of the main base station. In particular, the storage unit 2340 may store the information on the bearer allocated to the accessed terminal, the measured results reported from the accessed terminal, etc. Further, the storage unit 2340 may store information that is the determination reference on whether to provide a multi-link to the terminal or store the multi-link to the terminal. Further, the storage unit 2340 provides the stored data according to the request of the control unit 1550.

The controller 2350 controls the general operations of the main base station. For example, the controller 2350 transmits/receives a signal through the baseband processor 2320 and the RF processor 2310 or the backhaul communicator 2330. Further, the controller 2350 records and reads data in and from the storage unit 2340. For this purpose, the controller 2350 may include at least one processor. According to the embodiment of the present invention, the controller 2350 includes a multi-link controller 2352 that performs a control to provide the multi-link to the terminal. For example, the controller 2350 may control the main base station to perform the operation and procedure illustrated in the operation of the base station illustrated in FIGS. 20 and 21.

Third Embodiment

Hereinafter, when it is determined that the detailed description of the known art related to the present invention may obscure the gist of the present invention, the detailed description thereof will be omitted. Hereinafter, embodiments of the present invention will be described in detail with reference to the accompanying drawings.

The present invention relates to a method and an apparatus for performing a scheduling request (SR) in a plurality of cells which may transmit a physical uplink control channel (PUCCH) in an LTE mobile communication system.

Figure 24:
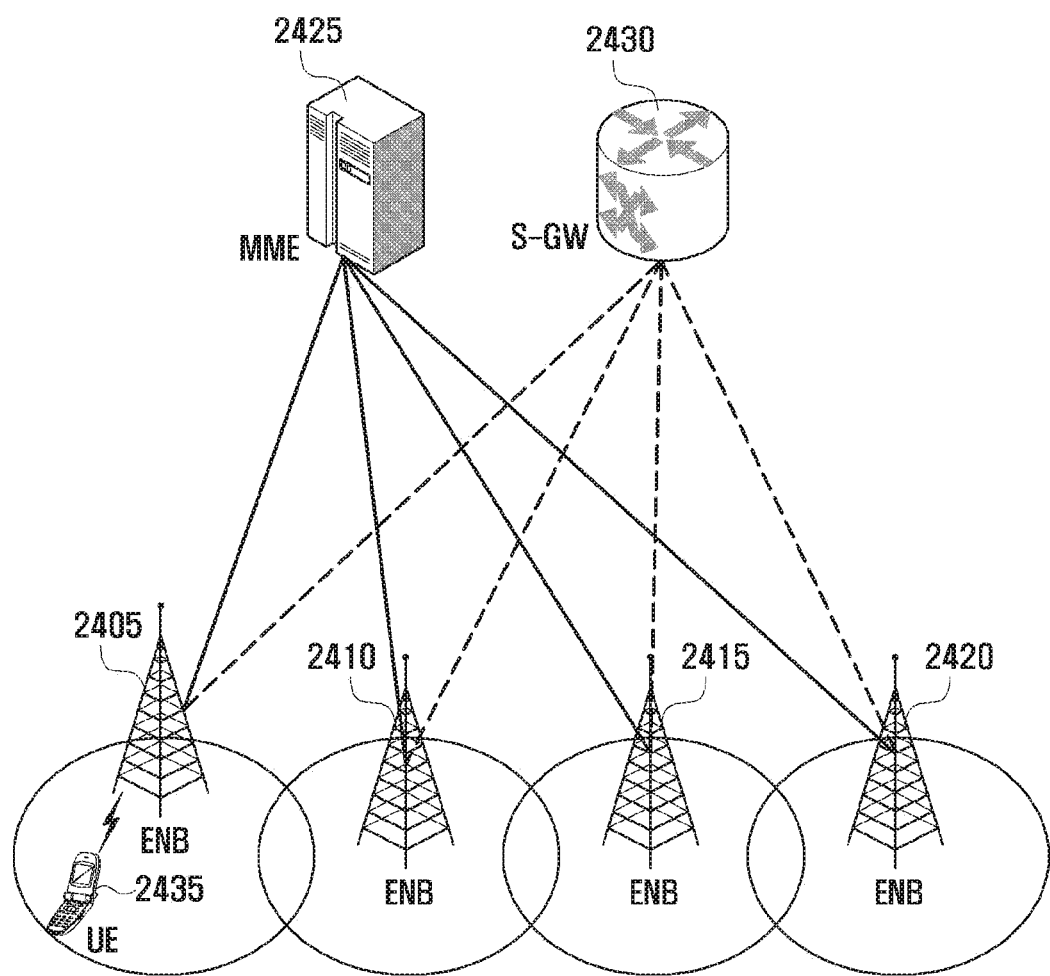
FIG. 24 is a diagram illustrating a structure of the LTE system to which the present invention is applied.

FIG. 24 is a diagram illustrating a structure of the LTE system to which the present invention is applied.

Referring to FIG. 24, a radio access network of the LTE system is configured to include next-generation base stations (evolved node B, hereinafter, ENB, Node B, or base station) 2405, 2410, 2415, and 2420, a mobility management entity (MME) 2425, and a serving-gateway (S-GW) 2430. User equipment (hereinafter, UE or terminal) 2435 is connected to an external network through the ENBs 2405, 2410, 2415, and 2420 and the S-GW 2430.

In FIG. 24, the ENBs 2405, 2410, 2415, and 2420 correspond to the existing node B of a UMTS system. The ENB is connected to the UE 2435 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel state of the UEs is required. Here, the ENBs 2405, 2410, 2415, and 2420 take charge of the collecting and scheduling.

One ENB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation & coding (hereinafter, called AMC) determining a modulation scheme and a channel coding rate depending on a channel status of the terminal is applied. The S-GW 2430 is an apparatus for providing a data bearer and generates or removes the data bearer according to the control of the MME 2425. The MME is an apparatus for performing a mobility management function for the terminal and various control functions and is connected to a plurality of base stations.

Figure 25:
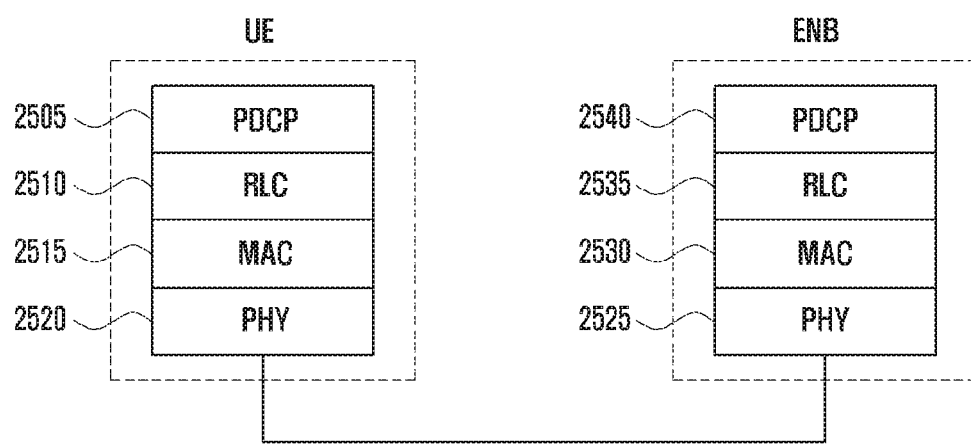
FIG. 25 is a diagram illustrating a radio protocol structure in an LTE system to which the present invention is applied.

FIG. 25 is a diagram illustrating a radio protocol structure in an LTE system to which the present invention is applied.

Referring to FIG. 25, the radio protocol of the LTE system consists of packet data convergence protocols (PDCPs) 2505 and 2540, radio link controls (RLCs) 2510 and 2535, and medium access controls (MMCs) 2515 and 2530 in the terminal and the ENB, respectively. The packet data convergence protocols (PDCPs) 2505 and 2540 performs operations such as compression/recovery of an IP header and the radio link controls (hereinafter, referred to as RLC) 2510 and 2535 reconfigures a PDCP packet data unit (PDU) at an appropriate length to perform an ARQ operation, or the like. The MACs 2515 and 2530 are connected to several RLC layer apparatuses configured in one terminal and performs an operation of multiplexing RLC PDUs into an MAC PDU and demultiplexing the RLC PDUs from the MAC PDU. Physical layers 2520 and 2525 perform an operation of channel-coding and modulating upper layer data, making them as an OFDM symbol, and transmitting them to the radio channel or an operation of demodulating the OFDM symbol received through the radio channel, channel-decoding it, and transmitting it to an upper layer.

Figure 26:
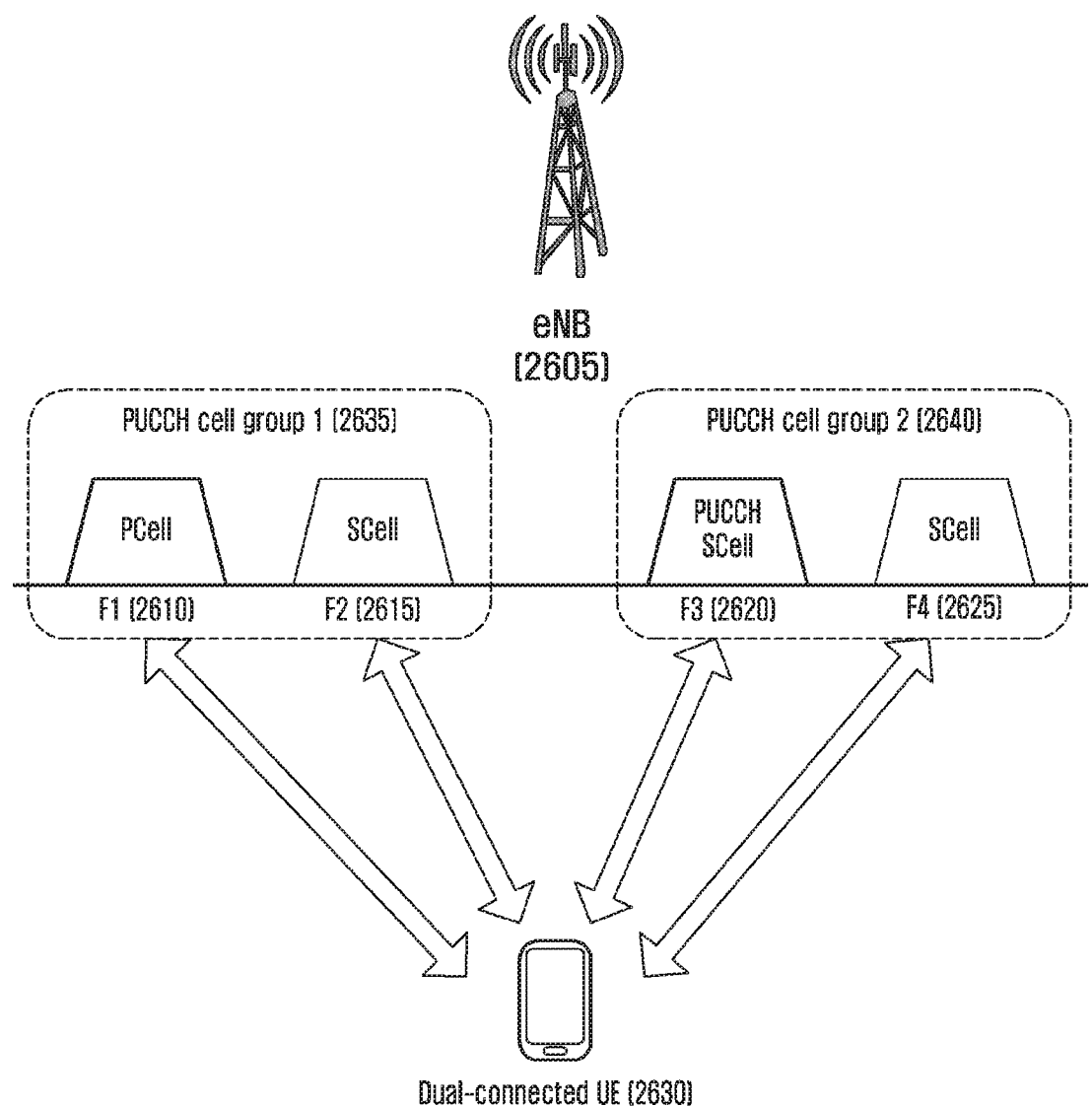
FIG. 26 is a diagram illustrating improved carrier aggregation applied to the terminal.

FIG. 26 is a diagram for describing improved carrier aggregation applied to the terminal.

Referring to FIG. 26, one base station generally transmits and receives multi-carriers over several frequency bands. For example, when the base station 2605 transmits uplink carriers for four cells, according to the related art, one terminal uses one of the plurality of cells to transmit and receive data. However, the terminal having carrier aggregation ability may simultaneously transmit and receive data through several carriers. The base station 2605 may allocate more carriers to the terminal 2630 having the carrier aggregation ability in some case to increase a transmission rate of the terminal 2630.

As the traditional meaning, when one forward carrier transmitted from one bas station and one reverse carrier received by the base station configure one cell, the carrier aggregation may also be understood that the terminal simultaneously transmits and receives data through several cells. By doing so, the maximum transmission rate is increased in response to the integrated number of carriers. The LTE Release 10 carrier aggregation technology may configure up to five cells in one terminal. One of the configured cells necessarily has the PUCCH, the cell is called a primary cell (PCell), and the rest cells which do not have the PUCCH is called a secondary cell (SCell). The PCell needs to be able to perform functions of a traditional serving cell such as a handover and a radio link failure (RLF) related operation performance, in addition to features having the PUCCH.

Hereinafter, in describing the present invention, receiving, by the terminal, data through any forward carrier or transmitting, from the terminal, the data through any reverse carrier have the same meaning as transmitting and receiving the data through a control channel and a data channel which are provided from a cell a central frequency and a frequency band characterizing the carriers. Further, the following embodiment of the present invention will describe the LTE system for convenience of explanation but the present invention may be applied to various kinds of wireless communication systems supporting the carrier aggregation.

In the Release 10 carrier aggregation technology, the uplink control information may be transmitted and received through the PUCCH only in the PCell. However, if an information amount to be transmitted to the base station through the PUCCH is increased, processing, by only the single PUCCH, the corresponding information amount may be burdened. In particular, a method for supporting up to 32 carriers has been discussed in the LTE Release 13 and in addition to the PCell, making the SCell have the PUCCH has an advantage of a PUCCH loading dispersion, or the like. Therefore, in addition to the PCell, a method for introducing the PUCCH into the SCell has been proposed. For example, in FIG. 26, the PUCCH may be additionally introduced into one SCell 2620. In the present invention, the SCell having the PUCCH is called a PUCCH SCell.

Conventionally, all PUCCH related signaling is transmitted to the base station through the PCell. However, the plurality of PUCCHs are present, and therefore there is a need to differentiate through which PUCCH the PUCCH signalings of each SCell are transmitted to the base station. As illustrated in FIG. 26, if it is assumed that two PUCCHs are present, to transmit the uplink control information, they are differentiated into a group 2635 of cells using the PUCCH of the PCell and a group 2640 of cells using the PUCCH of a specific SCell. In the present invention, the group is called a PUCCH cell group.

As described above, when up to 32 carriers are configured in one terminal to be used for a data transmitting and receiving service, the maximum transmission rate of the corresponding terminal is greatly improved. In this case, theoretically, the maximum transmission rate reaches approximately 25 Gbps. To support this, field lengths of layer 2 (PDCP, RLC, and MAC) parameters need to be increased together.

In the present invention, when the situation in which the field lengths of the layer 2 parameters need to be increased happens, a method for effectively configuring the situation has been proposed. Further, a format for variably changing a filed indicating a length of an MAC header has been proposed.

In the present invention, as the maximum transmission rate of the terminal is increased, a sequence number (SN) of a PDCP layer, an SN and a segment offset (SO) of an RLC layer, and a length L field of the MAC field are chosen as the layer 2 parameter fields whose the field lengths need to be expanded together.

A PDCP SN field is a value given one by one for each PDCP PDU generated at the PDCP layer and allocates the PDCP SN value increased by 1 to the PDCP SDU according to the generated order. The length of the PDCP SN is as the following table 29.

TABLE 2

| Length | Description |
| --- | --- |
| 5 | SRBs |
| 7 | DRBs, if configured by upper layers (pdcp-SN-Size [3]) |
| 12 | DRBs, if configured by upper layers (pdcp-SN-Size [3]) |
| 15 | DRBs, if configured by upper layers (pdcp-SN-Size [3]) |
| 16 | SLRBs |

Here, once a data radio bearer (DRB) associated with the data transmission is considered, up to 15 bits are used to indicate the length of the PDCP SN. The bit information used to indicate the length of the PDCP SN is transmitted to and configured in the terminal through an RRC message (PDCP-config IE).

The RLC SN field is a value given one by one for each RLC PDU generated at the RLC layer and has different lengths according to a kind of RLC PDUs. 10 bits in the case of an acknowledgement mode data PDU (AMD PDU) and an AMD PDU segment and 5 bits or 10 bits in the case of an unacknowledgement mode data PDU (UMD PDU) are used to indicate a length of the RLC SN. The bit information used to indicate the length of the RLC SN is transmitted to and configured in the terminal through the RRC message (PDCP-config IE).

An RLC SO field is used to indicate to which position of an original AMD PDU the AMD PDU segment corresponds. The length of the field is fixed as 15 bits.

An MAC L field is used to indicate a length of an MAC SDU introduced into the MAC layer or a length of an MAC control element (CE) having a variable length. In the length of the field, 7 bits or 15 bits are used to indicate the MAC L field. It is determined which of the bit values is used based on a value of an F field just before the L field. For example, if the F field value is 0, the length of the L field has 7 bits and if the F field value is 1, the length of the L field has 15 bits.

If the maximum transmission rate of the terminal is greatly increased, the number of bits used to indicate the fields needs to be increased. For example, the number of predicted bits to be increased is as the following Table 3. If the terminal is configured to have the maximum transmission rate, the field configuration information supporting the same may be configured together. The present invention proposes a method for configuring and releasing an extended PDCP header and an extended RLC header together to lower terminal implementation complexity and reduce signaling overhead.

TABLE 3

| | Existing header field (AM DRB) | Extended header field (AM DRB) |
|---|---|---|
| PDCP SN | 12 or 15 bit | 23 bit |
| RLC SN | 10 bit | 18 bit |
| RLC SO | 15 bit | 23 bit |
| MAC L | 7 or 15 bit | 7 or 15 or 23 bit |

The present embodiment is characterized in that the length of the RLC SN for any AM DRB, the length of the RLC SO, and the length of the MAC L are determined based on the length of the PDCP SN. That is, if the PDCP SN for any AM DRB is set to be 15 bits or 12 bits like before, as the RLC SN, 10 bits are used, as the RLC SO, 15 bits are used, and the MAC L field uses 7 bits or 15 bits. Otherwise, if the PDCP SN for any AM DRB is set to be extended 23 bits, as the RLC SN, 18 bits are used, as the RLC SO, 15 bits are used, and the MAC L field uses 7 bits, 15 bits, or 23 bits.

The length of the MAC L field is indicated based on F which is another field within the MAC header unlike the case of the PDCP SN configured as the RRC message, the RLC SN, and the RLC SO.

Figure 27:
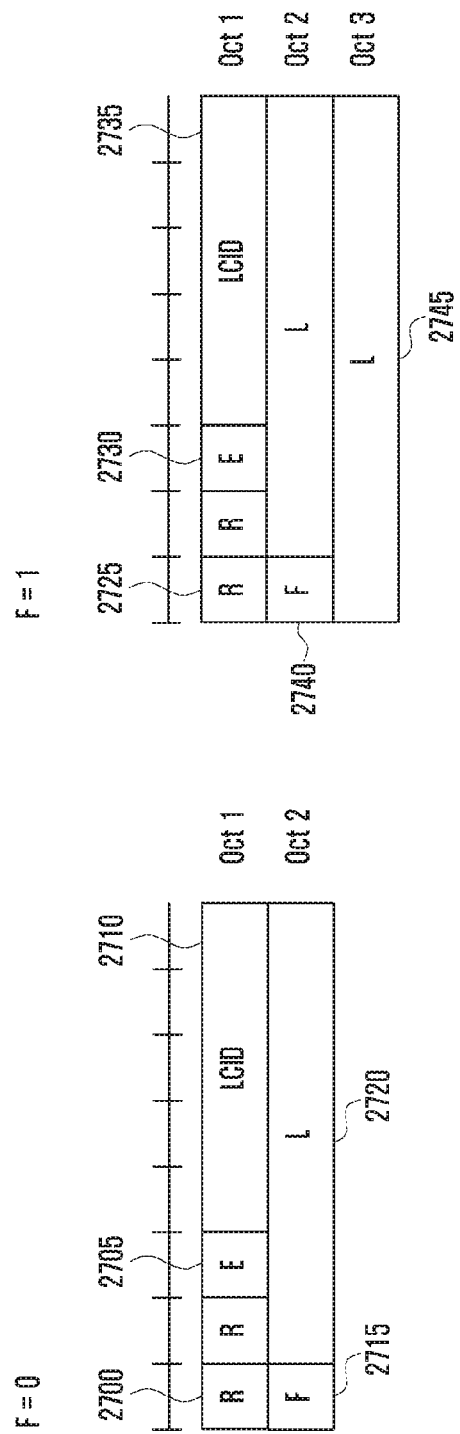
FIG. 27 illustrates a format of an MAC header according to the existing technology.

FIG. 27 illustrates a format of the MAC header according to the existing technology.

FIG. 27 is a diagram for describing the F field indicating the length of the MAC L field. The MAC PDU may consist of a plurality of MAC CEs and a plurality of MAC SDUs. The MAC CE is included if necessary, and therefore is not necessarily included in the MAC PDU. To indicate the plurality of MAC CEs and MAC SDUs, a header portion which is a front portion of the MAC PDU is filled with sub-headers corresponding to the MAC CE and the MAC SDU, respectively, one-to-one. In the existing technology, two sub-header formats, that is, FIGS. 27A and 27B are present depending on the length of the L field.

In FIG. 27, an R field is reserved bits 2700 and 2725 and has a 0 value and E fields 2705 and 2730 indicate whether other sub-headers in addition to the present sub-header are present. If the E field is set to be 1, other sub-headers are continued on the present sub-header, and otherwise, if the E field is set to be 0, the MAC SDU, the MAC CE, or padding bits are continued on the present sub-header. LCID fields 2710 and 2735 indicate a kind of MAC CE or MAC SDU corresponding to the present sub-header. The F fields 2715 and 2740 indicate the length of the L field included in the present sub-header. If the F field is set to be 0, it means that a length of an L field 2720 is 7 bits. In other words, it means that the size of the MAC CE or the MAC SDU corresponding to the present sub-header is smaller than 128 bytes. If the F field is set to be 1, the length of the L field is 15 bits (2745). The L field is described above.

The present embodiment proposes a new MAC sub-header format which may indicate the extended L field. In the present embodiment, as the extended L field value, the following two methods are proposed. The first method defines a new 1-bit F field at a position not concatenated to the existing F field. A second method is to extend the existing F field to 2 bits and has a form in which added 1 bit is concatenated to the existing F field. Independent of the method, in conclusion, 1-bit F field is further added, and therefore the L field having up to four sizes may be indicated.

Figure 28:
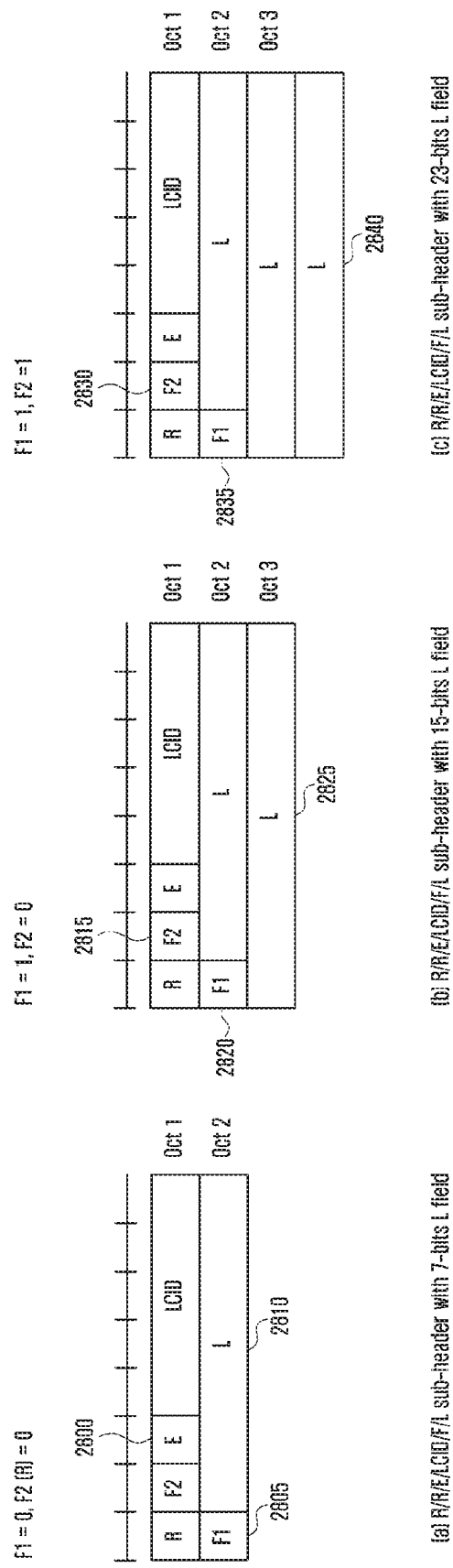
FIG. 28 is a diagram illustrating a format in which a newly added F field is present at the existing reserved bit position.
Figure 29:
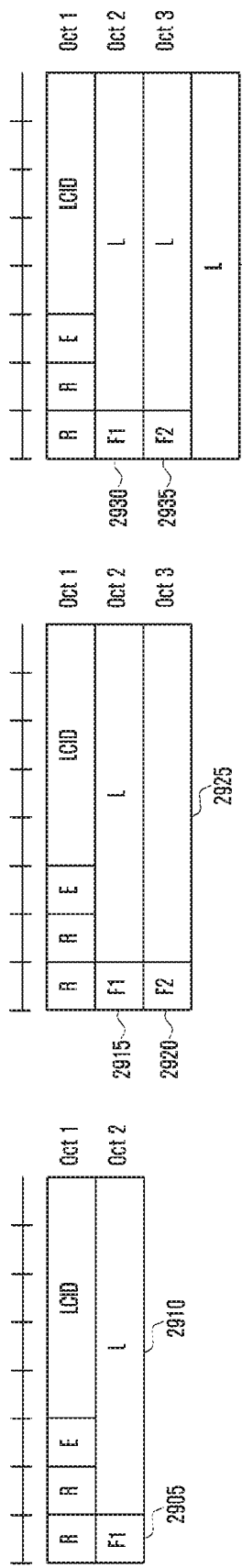
FIG. 29 is a diagram illustrating a format in which a new F field is present, after two bytes.

According to the first method, various formats depending on at which position newly added 1-bit F field is positioned may be present. FIGS. 28 and 29 illustrate two of several formats.

FIG. 28 is a diagram illustrating a format in which the newly added F field is present at the existing reserved bit position.

As described above, the reserved bit of 2 bits is present in the existing sub-header format, but one of them is used as the new F field. FIG. 28 illustrates a method for using an R bit later positioned among the two reserved bits as a new F field, that is, F2 2800, 2825, and 2830. To differentiate the new F field, the existing F field is named F1 2805, 2820, and 2835. If F1=0, the length of the L field is 7 bits (2810). If F1=1 and F2=0, the length of the L field is 15 bits (2825). If F1=1 and F2=1, the length of the L field is 23 bits (2840). The method uses the existing reserved bit to increase bit utilization. Further, the F field is used in the reserved bit relatively positioned at a head is used, and therefore when the sub-header bits are sequentially searched, it may know whether the L field extended at very rapid time is used.

FIG. 29 is a diagram illustrating a format in which a new F field is present, after two bytes.

In FIG. 29, F1 fields 2905, 2915, and 2930 have 0 or 1 value depending on whether a 7-bit F field or an F field more than that is present. If F1=0, after F1, a 7-bit L field 2910 is continued. In the present format, in addition to 7 bits as the length of the L field, 15 bits or 22 bits are considered. The reason is that a newly added F2 field is present at a position other than the reserved bit. To prevent bits from being discarded without being used, the sub-header needs to maintain a byte unit. Therefore, the byte unit is maintained, and in this case, one of the available bits is used as a new F2 field, and therefore the number of bits used in the L field may be naturally reduced one. Generally, it is difficult to reduce a bits allocated to another field, that is, the LCID field.

In the present embodiment, after the first two bytes, a new F2 field is positioned. However, in the drawings, an F2 filed among the bits allocated to the L field may be present at any position, and the position needs to be promised in advance. If the value of the F2 field is 0 2920, 7-bit L field 2925 is additionally positioned behind the F2 field. Therefore, a total 14 bits of L field is made. If the value of the F2 field is set to be 1 2935, a 15-bit L field 2940 is additionally positioned behind the F2 field.

Figure 30:
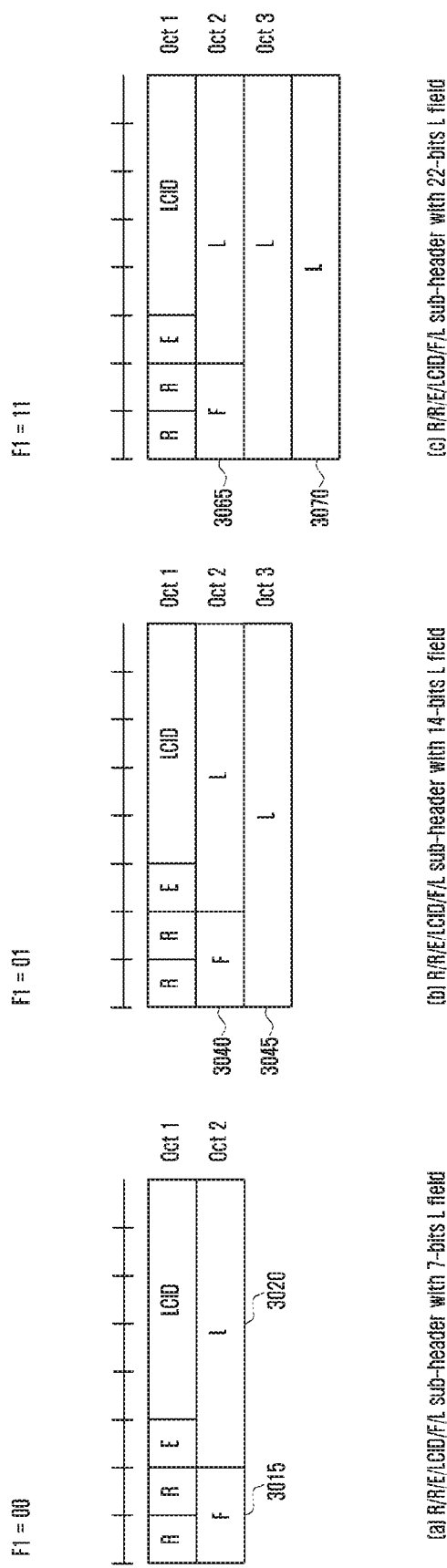
FIG. 30 is a diagram illustrating a format in which the existing F field is extended.

FIG. 30 is a diagram illustrating a format in which the existing F field is extended.

Referring to FIG. 30, an added 1 bit is concatenated to the existing F fields 3015, 3040, and 3065. If F=00 3015, a 6-bit L field is present. If F=00 3040, a 14-bit L field is present. If F=10 3065, a 22-bit L field is present.

Figure 31:
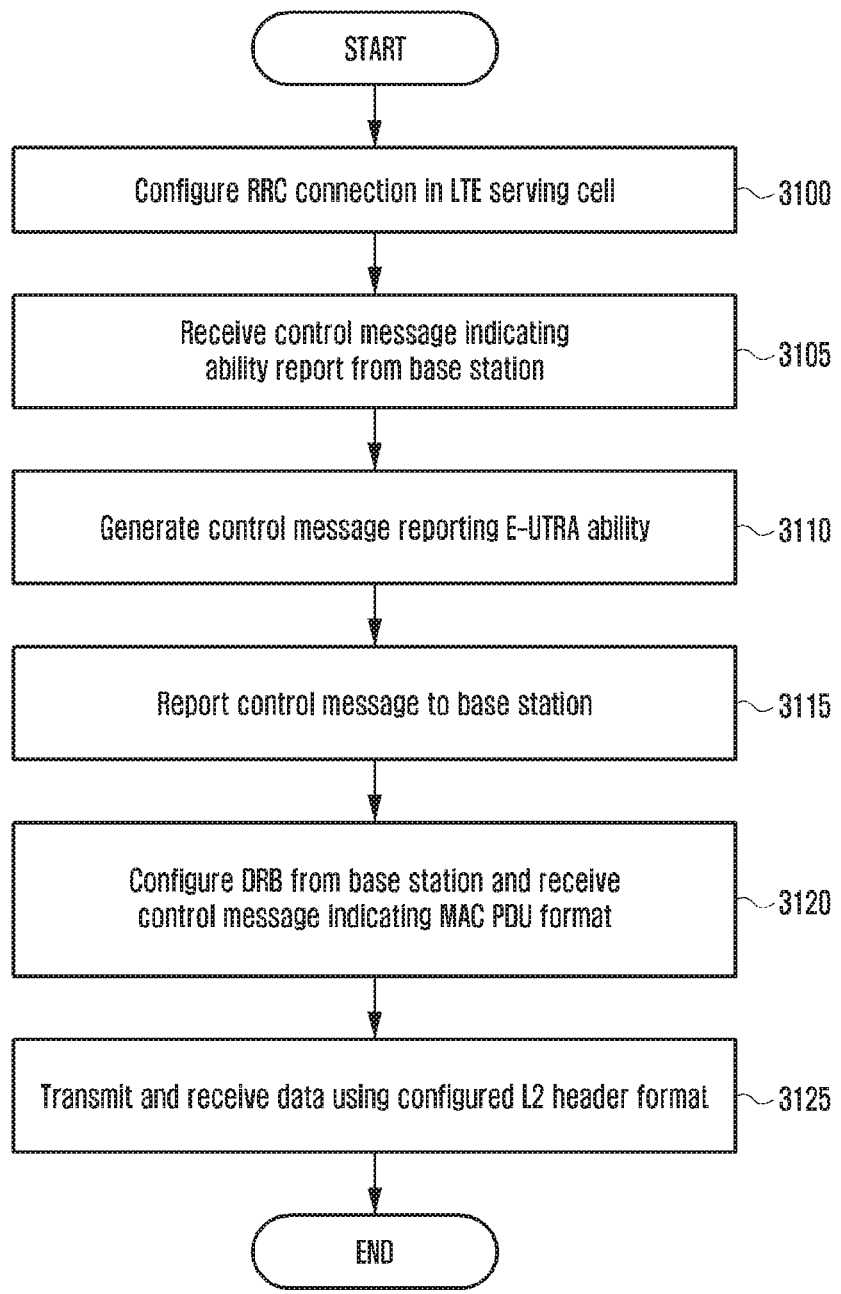
FIG. 31 is a flow chart illustrating the operation of the terminal according to the present embodiment.

FIG. 31 is a flow chart illustrating a terminal operation in the present invention.

In step 3100, a terminal configures an RRC connection to a serving cell. In step 3105, the terminal receives a control message indicating an ability report from the base station. The control message includes an indicator indicating a report of ability associated with E-UTRA. In step 3110, the terminal generates a control message reporting the E-UTRA capability and the message includes information displaying whether to support an extended Layer 2 header introduced in the present invention. Here, supporting the extended Layer 2 header means supporting all of 23 bit PDCP SN, 18 bit RLC SN, 23 bit RLC SO, and extended MAC sub-header (F1 and F2).

In step 3115, the terminal transmits the generated message to the base station. In step 3120, the terminal receives an RRC control message indicating the DRB configuration from the base station. If the DRB configuration information is the same as the existing DRB configuration information, that is, if it is mapped to the AM RLC and the PDCP SN is 12 bits or 15 bits, the terminal configures a format using RLC SN=10 bits and RLC SO=15 bits. Further, the MAC PDU format is configured as a format using the 1-bit F field. This performs the existing operation. Otherwise, if the DRB configuration information is mapped to the AM RLC and the PDCP SN is 23 bits, as in the present invention it is configured as a format using RLC SN=18 bit and RLC SO=23 bit without separate signaling. Further, the MAC PDU format is configured as a format using (or using 2-bit F field) F1 and F2 bits. The MAC sub-header format including the detailed F1 and F2 format is already described in detail. In step 3025, the terminal uses the configured format to transmit and receive data.

Figure 32:
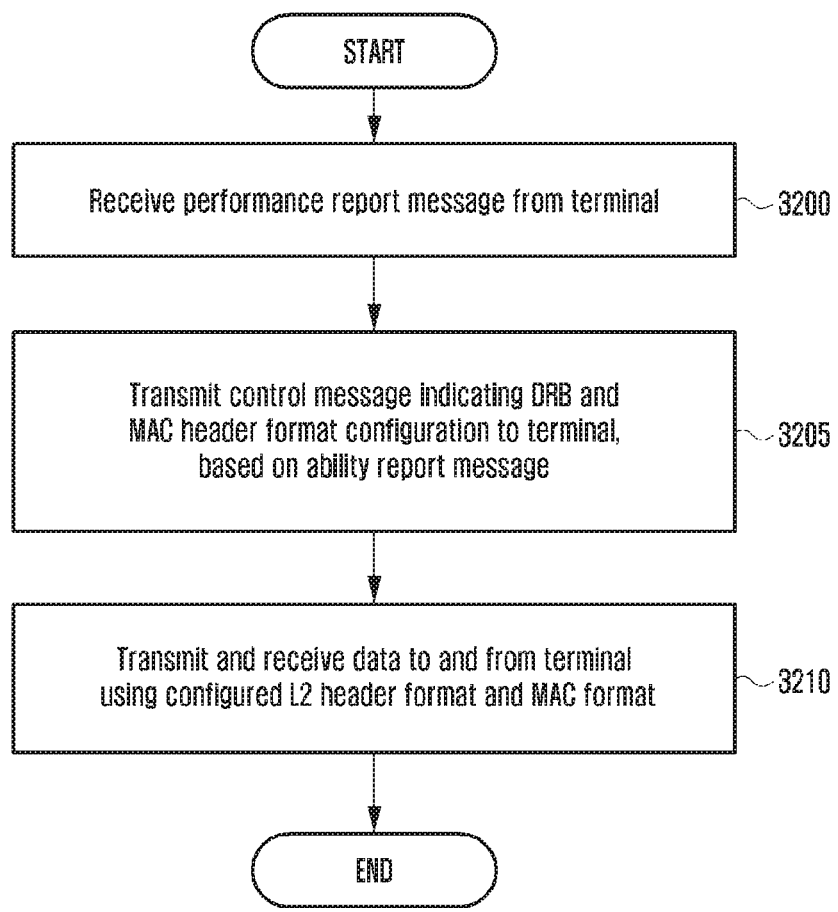
FIG. 32 is a flow chart illustrating the operation of the base station according to the present invention.

FIG. 32 is a flow chart illustrating a base station operation in the present invention.

In step 3200, the base station receives a capability report message from the terminal. In step 3205, the base station transmits a control message indicating the DRB and MAC header format configuration to the terminal. If the terminal supports the extended L2, PDCP SN=23 bits, RLC SN=18 bits, and RLC SO=23 bits or PDCP SN=15 bits or 12 bits, RLC SN=10 bits, and RLC SO=15 bits. Otherwise, if the terminal does not support the extended layer L2, PDCP SN=15 bits or 12 bits, RLC SN=10 bits, and RLC SO=15 bits. If the terminal supports the extended layer L2 and the RLC SO is set to be 23 bits, it is configured to use the extended format. If the terminal supports the extended layer L2 and the RLC SO is set to be 15 bits, it is configured not to use the extended format. If the terminal does not support the extended layer L2, it is configured not to use the extended format. In step 3210, the base station performs transmission and reception to and from the terminal using the configured L2 header format and the MAC format.

Figure 33:
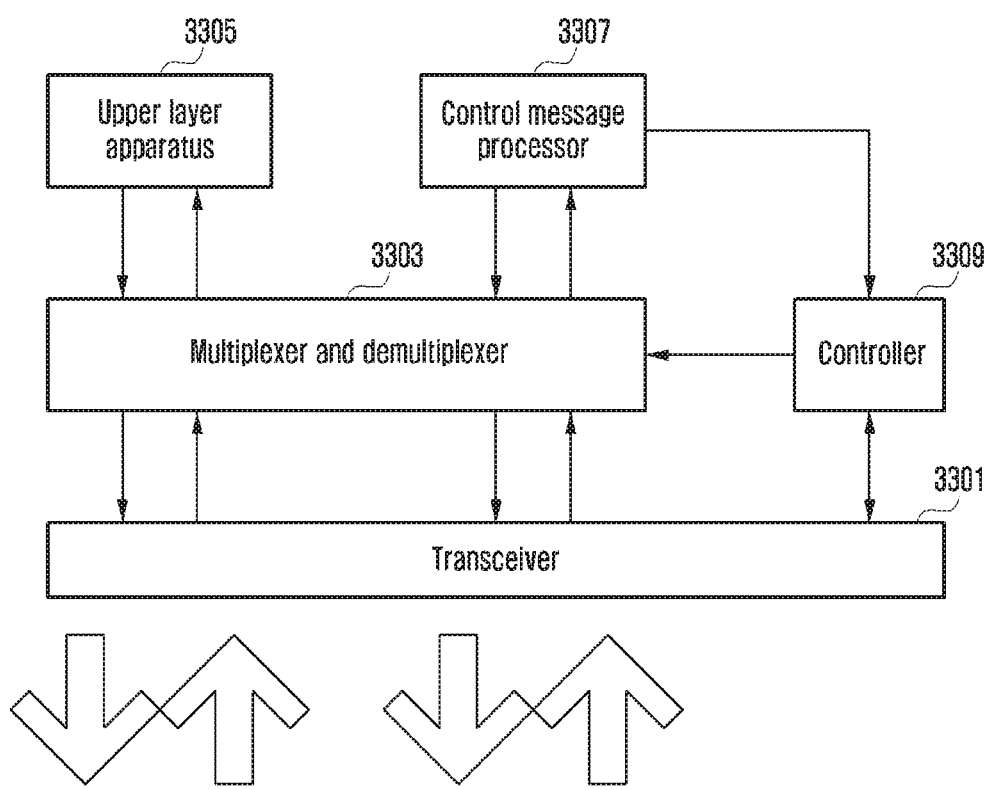
FIG. 33 is an apparatus diagram illustrating the terminal which may perform the present embodiment.

FIG. 33 is a diagram illustrating the terminal apparatus which may perform the present embodiment.

Referring to FIG. 33 The terminal transmits and receives data, etc., to and from an upper layer 3305, transmits and receives control messages through a control message processor 3307, upon the transmission, multiplexes data using a multiplexer 3303 according to a control of a controller 3309 and then transmits (3301) the data through the transmitter, and upon the reception, receives (3301) a physical signal to the receiver according to the control of the controller 3309, demultiplexes the received signal by a demultiplexer 3303, and then transmits it to the upper layer 3305 or a control message processor 3307 according to the message information.

In the present invention, if the control message processor 3307 receives an activation/deactivation MAC CE, the control message processor 3307 informs an SCell activation/deactivation processor 3311 of the received activation/deactivation MAC CE to determine first timing upon activation and at the first timing, the controller 3309 and the control message processor 3307 are instructed to perform the operations to be performed at the first timing. If the deactivation of the already activated SCell is instructed, second timing is determined, and the controller 3309 and the control message processor 3307 are instructed to perform first operations to be performed before the second timing and at the second timing, are instructed to perform the second operations to be performed at the second timing.

When using the proposed method, the defined operation is performed at the timing when the SCell is activated and deactivated in the case of using the carrier aggregation technology, thereby preventing a malfunction and performing an accurate operation.

While the present invention has been described in connection with the exemplary embodiments thereof, various modifications and variations can be made without departing from the scope of the present invention. Therefore, the scope of the present embodiment should be not construed as being limited to the described exemplary embodiments but be defined by the appended claims as well as equivalents thereto.

Figure 34:
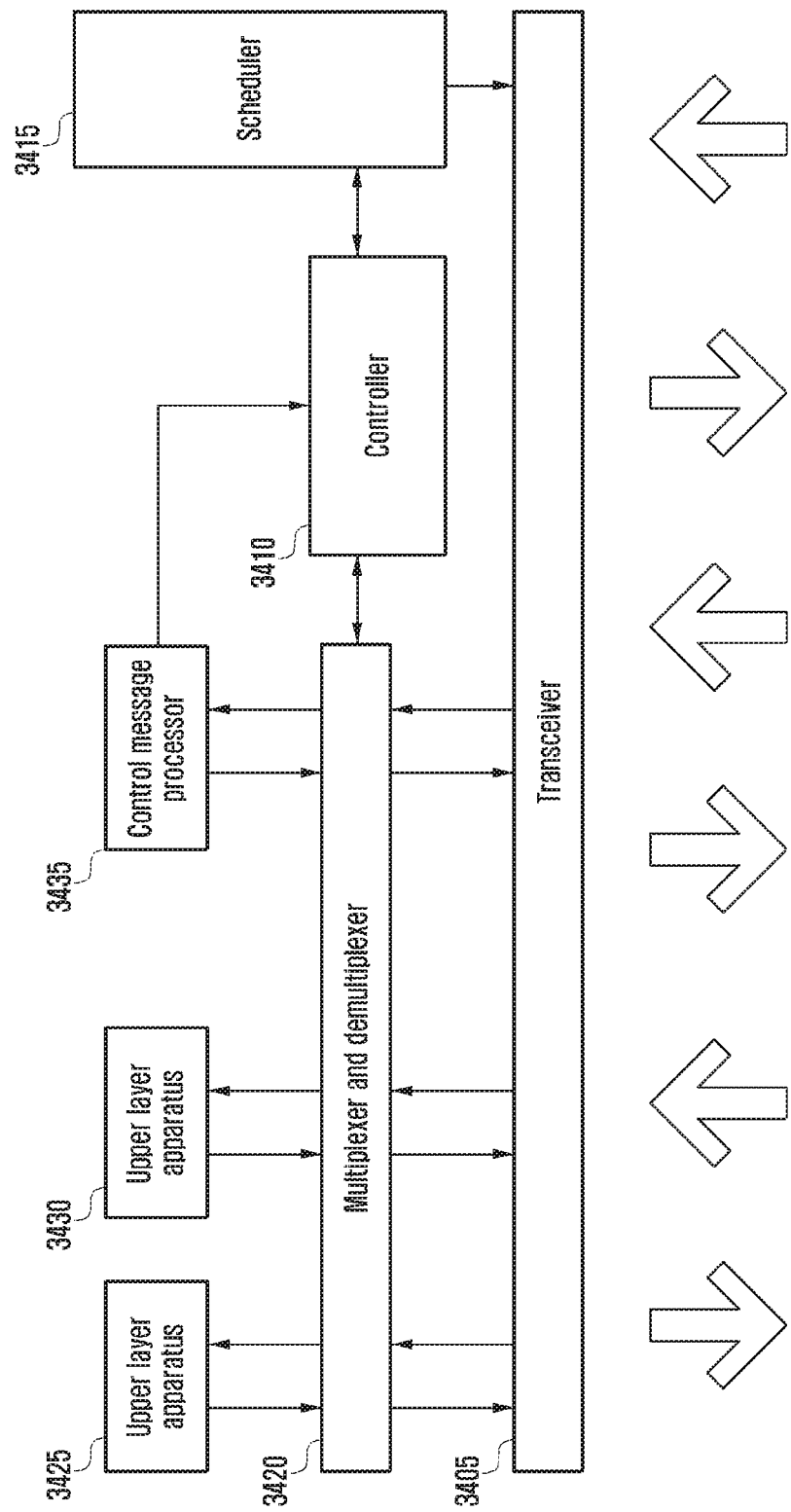
FIG. 34 is a block diagram illustrating the configuration of the base station according to the present embodiment.

FIG. 34 is a block diagram illustrating a configuration of the base station according to the embodiment of the present invention.

The base station apparatus of FIG. 341 includes a transceiver 3405, a controller 3410, a multiplexer and demultiplexer 3420, a control message processor 3435, various kinds of upper layer processors 3425 and 3430, and a scheduler 3415.

The transceiver 3405 transmits data and a predetermined control signal to a downlink carrier and the data and receives the predetermined control signal through an uplink carrier. When a plurality of carriers are configured, the transceiver 3405 transmits and receives data and a control signal through the plurality of carriers.

The multiplexer and demultiplexer 3420 multiplexes data generated from the upper layer processors 3425 and 3430 or the control message processor 3435 or demultiplexes data received by the transceiver 3405 and transmits the data to the appropriate upper layer processors 3425 and 3430, the control message processor 3435, or the controller 3410. The control message processor 3435 allows the terminal to process the transmitted control message to perform the required operation or generates the control message to be transmitted to the terminal and transmits the generated control message to the lower layer.

The upper layer processors 3425 and 3430 may be configured for each terminal and each service and processes data generated from user services such as FTP and VoIP and transmits the processed data to the multiplexer and demultiplexer 3420 or processes data transmitted from the multiplexer and demultiplexer 3420 and transmits the processed data to service applications of the upper layer.

The controller 3410 determines when the terminal transmits channel status information, or the like to control the transceiver.

The scheduler 3415 allocates a transmission resource to the terminal at appropriate timing in consideration of the buffer status and the channel status of the terminal, the operation time of the terminal, etc., and allows the transceiver to process a signal transmitted from the terminal or performs a process to transmit a signal to the terminal.

Fourth Embodiment

Hereinafter, when it is determined that the detailed description of the known art related to the present embodiment may obscure the gist of the present embodiment, the detailed description thereof will be omitted. Hereinafter, the present embodiment will be described in detail with reference to the accompanying drawings.

The present invention relates to a method and an apparatus for performing a scheduling request (SR) in a plurality of cells which may transmit a physical uplink control channel (PUCCH) in an LTE mobile communication system.

Figure 35:
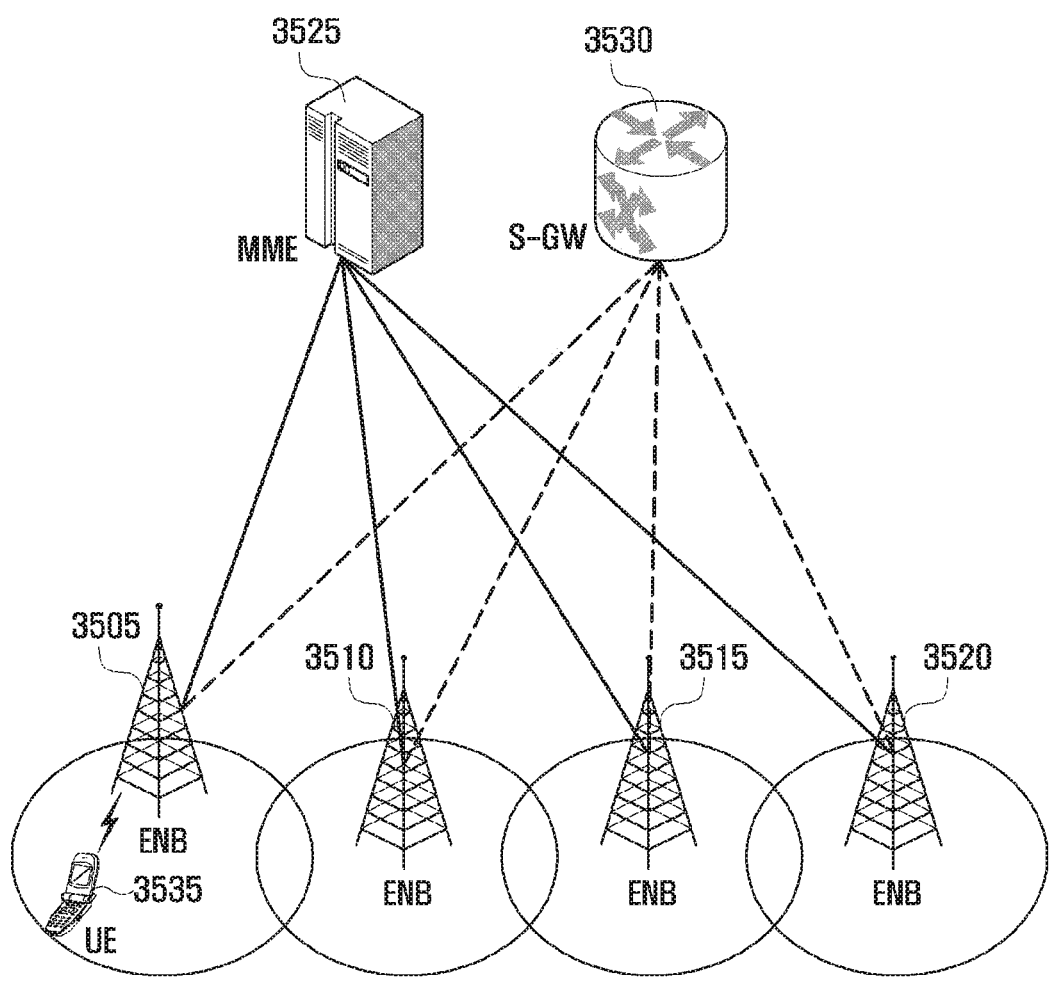
FIG. 35 is a diagram illustrating a structure of the LTE system to which the present embodiment is applied.

FIG. 35 is a diagram illustrating a structure of the LTE system to which the present embodiment is applied.

Referring to FIG. 35, a radio access network of the LTE system is configured to include next-generation base stations (evolved node B, hereinafter, ENB, Node B, or base station) 3505, 3510, 3515, and 3520, a mobility management entity (MME) 3525, and a serving-gateway (S-GW) 3530. User equipment (hereinafter, UE or terminal) 135 is connected to an external network through the ENBs 3505, 3510, 3515, and 3520 and the S-GW 3530.

In FIG. 1, the ENBs 3505, 3510, 3515, and 3520 correspond to the existing node B of a UMTS system. The ENB is connected to the UE 3535 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel state of the UEs is required. Here, the ENBs 3505, 3510, 3515, and 3520 take charge of the collecting and scheduling.

One ENB generally controls a plurality of cells. For example, to implement a transmission rate of 100 Mbps, the LTE system uses, as a radio access technology, orthogonal frequency division multiplexing (OFDM) in, for example, a bandwidth of 20 MHz. Further, an adaptive modulation & coding (AMC) determining a modulation scheme and a channel coding rate depending on a channel status of the terminal is applied. The S-GW 3530 is an apparatus for providing a data bearer and generates or removes the data bearer according to the control of the MME 3325. The MME is an apparatus for performing a mobility management function for the terminal and various control functions and is connected to a plurality of base stations.

Figure 36:
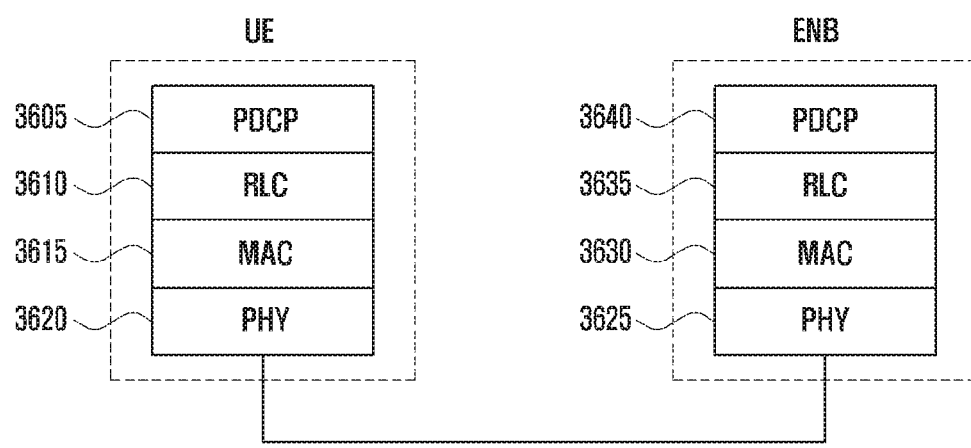
FIG. 36 is a diagram illustrating a radio protocol structure in the LTE system to which the present embodiment is applied.

FIG. 36 is a diagram illustrating a radio protocol structure in an LTE system to which the present embodiment is applied.

Referring to FIG. 36, the radio protocol of the LTE system consists of packet data convergence protocols (PDCPs) 3605 and 3640, radio link controls (RLCs) 3610 and 3635, and medium access controls (MMCs) 3615 and 3630 in the terminal and the ENB, respectively. The packet data convergence protocols (PDCPs) 3605 and 3640 performs operations such as compression/recovery of an IP header and the radio link controls (hereinafter, referred to as RLC) 3610 and 3635 reconfigures a PDCP packet data unit (PDU) at an appropriate size to perform an ARQ operation, or the like. The MACs 3615 and 3630 are connected to several RLC layer apparatuses configured in one terminal and performs an operation of multiplexing RLC PDUs into an MAC PDU and demultiplexing the RLC PDUs from the MAC PDU.

Physical layers 3620 and 3625 perform an operation of channel-coding and modulating upper layer data, making them as an OFDM symbol, and transmitting them to the radio channel or an operation of demodulating the OFDM symbol received through the radio channel, channel-decoding it, and transmitting it to an upper layer.

Figure 37:
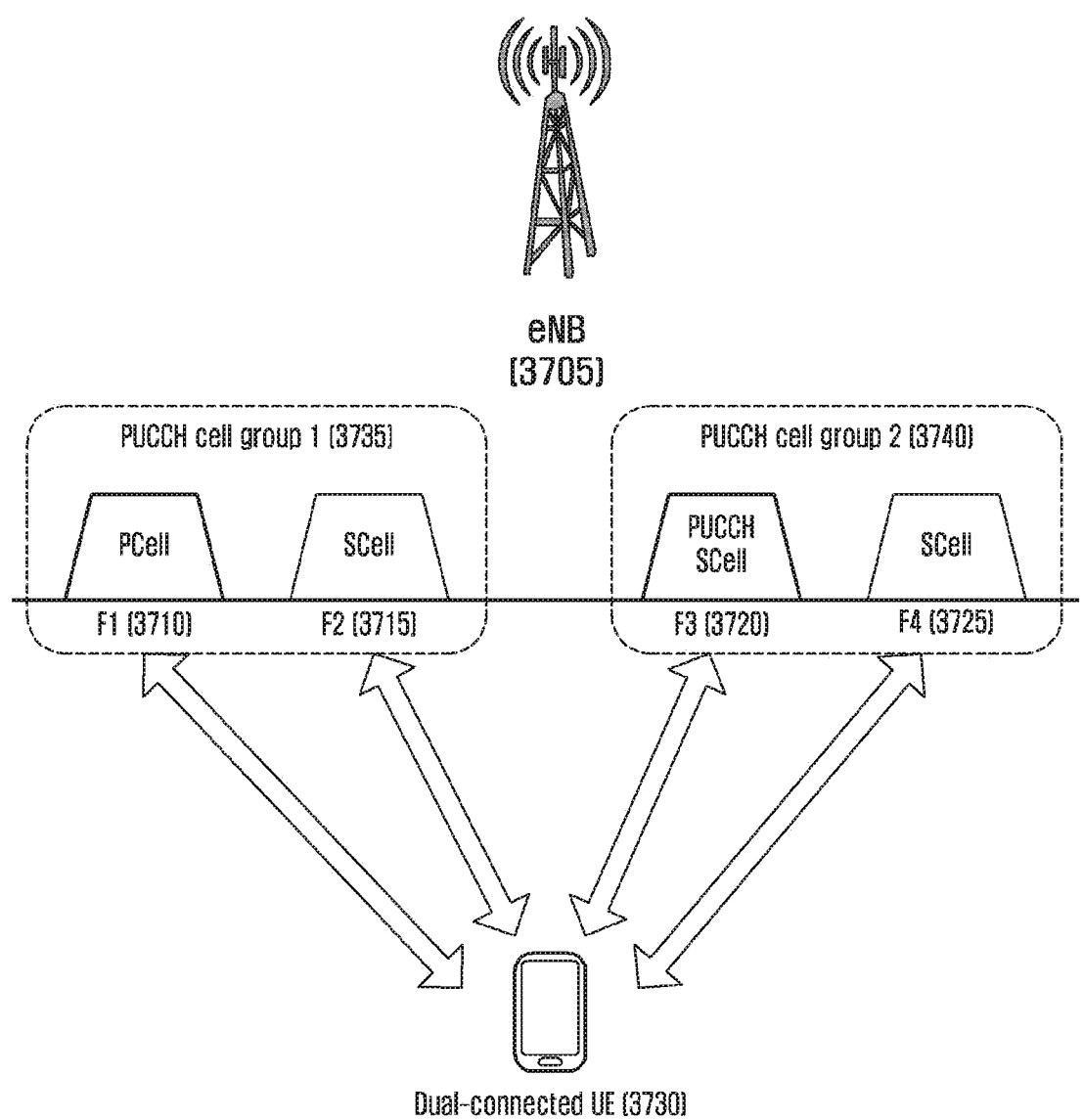
FIG. 37 is a diagram illustrating the improved carrier aggregation in the terminal.

FIG. 37 is a diagram illustrating improved carrier aggregation system in the terminal.

Referring to FIG. 37, one base station generally transmits and receives multi-carriers over several frequency bands. For example, when the base station 305 receives uplink carriers for four cells, according to the related art, one terminal uses one of the plurality of cells to transmit and receive data. However, the terminal having carrier aggregation ability may simultaneously transmit and receive data using several carriers. The base station 3705 may allocate more carriers to the terminal 3730 having the carrier aggregation ability in some case to increase a transmission rate of the terminal 3730.

As the traditional meaning, when one forward carrier transmitted from one bas station and one reverse carrier received by the base station configure one cell, the carrier aggregation may also be understood that the terminal simultaneously transmits and receives data through several cells. By doing so, the maximum transmission rate is increased in response to the integrated number of carriers.

The LTE Release (Rel)-10 carrier aggregation technology may configure up to five cells in one terminal. One of the configured cells necessarily has the PUCCH, the cell is called a primary cell (PCell), and the rest cells which do not have the PUCCH is called a secondary cell (SCell). The PCell needs to be able to perform functions of a traditional serving cell such as a handover and a radio link failure (RLF) related operation performance, in addition to features having the PUCCH.

Hereinafter, in describing the present invention, receiving, by the terminal, data through any forward carrier or transmitting, from the terminal, the data through any reverse carrier have the same meaning as transmitting and receiving the data through a control channel and a data channel which are provided from a cell a central frequency and a frequency band characterizing the carriers. Further, the following embodiment of the present invention will describe the LTE system for convenience of explanation but the present invention may be applied to various kinds of wireless communication systems supporting the carrier aggregation.

In the Release 10 carrier aggregation technology, the uplink control information may be transmitted and received through the PUCCH only in the PCell. However, if an information amount to be transmitted to the base station through the PUCCH is increased, processing, by only the single PUCCH, the corresponding information amount may be burdened. In particular, a method for supporting up to 32 carriers has been discussed in the LTE Release 13 and in addition to the PCell, making the SCell have the PUCCH has an advantage of a PUCCH loading dispersion, or the like. Therefore, in addition to the PCell, a method for introducing the PUCCH into the SCell has been proposed. For example, in FIG. 37, the PUCCH may be additionally introduced into one SCell 2620. In the present invention, the SCell having the PUCCH is called a PUCCH SCell.

Conventionally, all PUCCH related signaling is transmitted to the base station through the PCell. However, the plurality of PUCCHs are present, and therefore there is a need to differentiate through which PUCCH the PUCCH signalings of each SCell are transmitted to the base station. As illustrated in FIG. 37, if it is assumed that two PUCCHs are present, to transmit the uplink control information, they are differentiated into a group 3735 of cells using the PUCCH of the PCell and a group 3740 of cells using the PUCCH of a specific SCell. In the present invention, the group is called a PUCCH cell group.

The present invention proposes a process of activating the PUCCH SCell. When the PUCCH SCell is activated, the present embodiment performs the random access or the SR transmission depending on whether the uplink synchronization is made.

Prior to describing the content of the present invention, two methods for activating SCell according to the related art are present, which will be described below.

Figure 38:
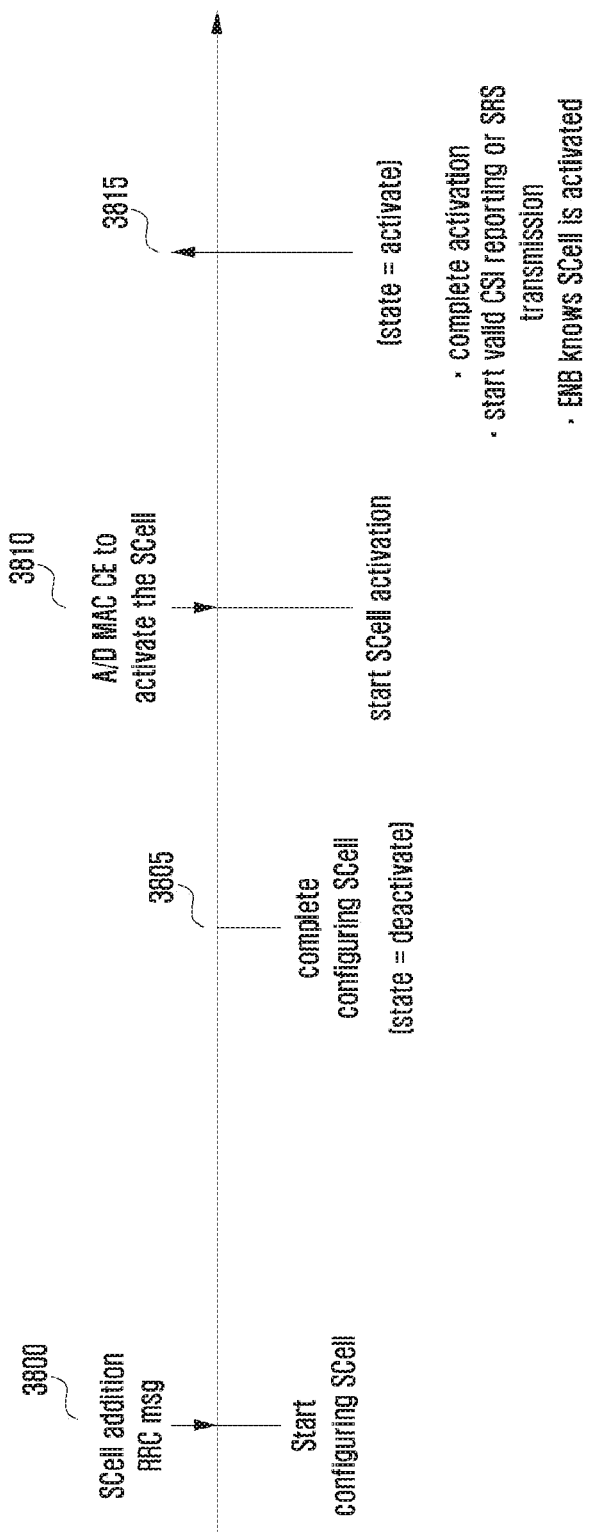
FIG. 38 is a diagram illustrating a process of activating a general SCell other than a PSCell in the related art.

FIG. 38 is a diagram illustrating a process of activating a general SCell other than a PSCell in the related art.

Referring to FIG. 38, the terminal receives the RRC message indicating an addition of the general SCell from the base station. In this case, the terminal configures the general SCell. When the terminal completes the configuration of the SCell, the state of the SCell is deactivated (3805). Then, if the activation/deactivation MAC CE is received from the base station, the terminal activates the SCell (3810). If the activation of the SCell is completed, the terminal reports valid channel state information CSI to the SCell and transmits an SRS on the SCell (3815).

Another SCell is PSCell. The PSCell is configured when using dual connectivity transmitting and receiving data by simultaneously connecting the terminal to the plurality of base stations. In a base station other than the base station including the PScell, only one PSCell needs to be configured. The terminal transmits an uplink PUCCH signal onto the PUCCH to the base station through the PSCell. The PSCell is the SCell but has the PUCCH unlike the SCell and after the configuration, is automatically activated.

Figure 39:
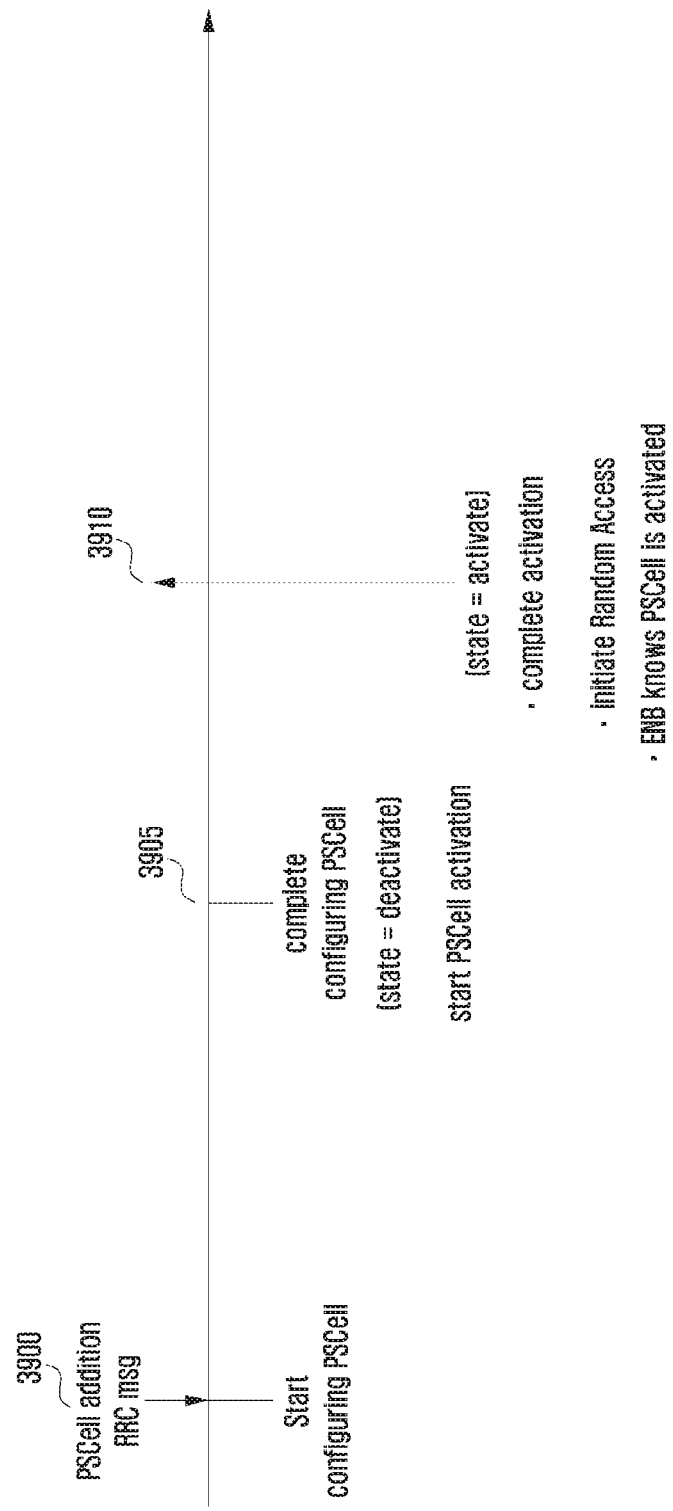
FIG. 39 is a diagram illustrating a process of activating PSCell in the related art.

FIG. 39 is a diagram illustrating a process of activating PSCell in the related art.

Referring to FIG. 39, the terminal receives the RRC message indicating an addition of the PSCell from the base station (3900). In this case, the terminal configures the PSCell. If the configuration of the PSCell is completed, the terminal automatically activates the PSCell (3905). The PSCell is considered as the deactivation state before the activation of the PSCell is completed. If the activation of the PSCell is completed, the terminal and the base station perform the random access using the PSCell (3910).

In the present invention, the PUCCH SCell has the PUCCH like the SCell or the PSCell. In this case, the method for activating PUCCH SCell may introduce one of the existing two processes described above. The configured PUCCH SCell is in the deactivation state. According to the process of the general SCell, the terminal receives the activation/deactivation MAC CE from the base station and then starts the activation process. On the other hand, according to the case of the PSCell, after the configuration completion, the terminal automatically starts the activation process. Another difference is an operation after the activation completion. In the case of the general SCell, the valid CSI report and the SRS transmission are performed, but in the case of the PSCell, the random access is performed. The reason of performing the random access is to synchronize the uplink of the terminal and the base station and inform the base station that the activation of the PSCell is completed.

Figure 40:
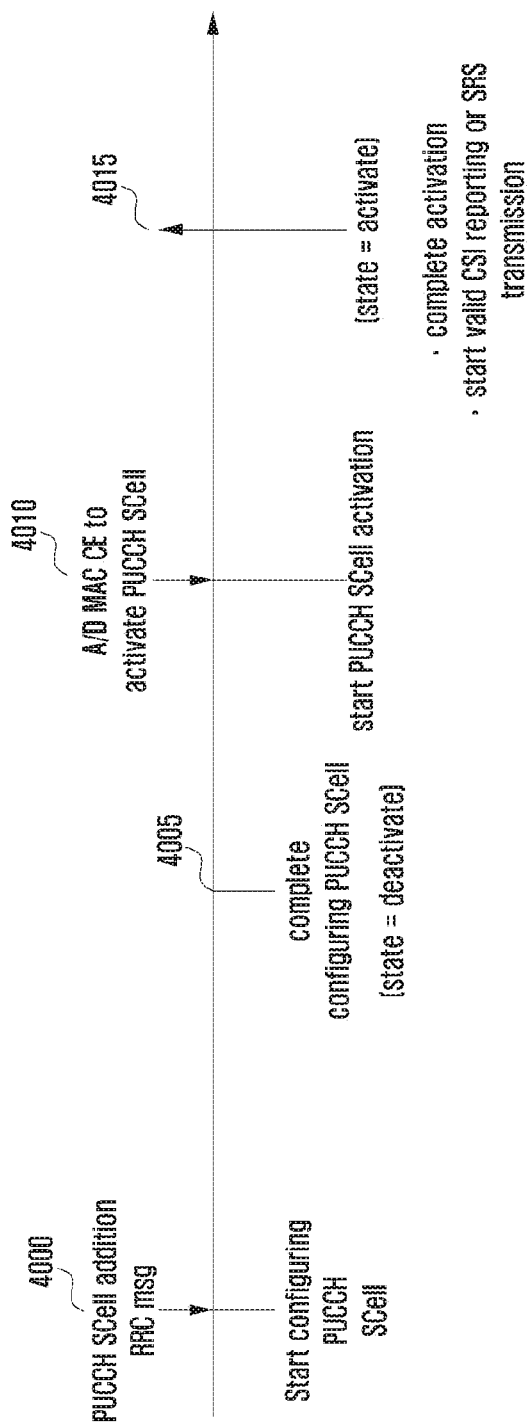
FIG. 40 is a diagram illustrating a process of activating PUCCH SCell according to the process of activating a general SCell.

FIG. 40 is a diagram illustrating a process of activating PUCCH SCell according to the process of activating a general SCell.

Referring to FIG. 40, the terminal receives the RRC message indicating an addition of the PUCCH SCell from the base station (4000). In this case, the terminal configures the PUCCH SCell. When the terminal completes the configuration of the PUCCH SCell, the state of the PUCCH SCell is deactivated (4005). Then, if the terminal receives the activation/deactivation MAC CE from the base station, the terminal activates the PUCCH SCell (4010). In this case, the base station may not transmit the activation/deactivation MAC CE immediately after the configuration completion. The reason is that the terminal does not accurately know when it finishes preparation to receive the MAC CE. Therefore, in consideration of this situation, the base station holds a time margin to some extent and then transmits the activation/deactivation MAC CE to the terminal. If the activation of the PUCCH SCell is completed, the terminal reports the valid CSI to the SCell and transmits the SRS on the SCell (4015).

After the activation is completed, the base station may not also know when the terminal reports the CSI and starts the SRS transmission. Therefore, the base station needs to perform blind decoding until the information is received. This increases the complexity of the base station. When the uplink synchronization of the base station and the terminal is not matched, the base station additionally instructs the terminal to perform the random access through a physical downlink control channel (PDCCH) order (may serve to instruct the terminal to the random access). In this case, a longer delay time is required for the CSI report and the SRS transmission.

Figure 41:
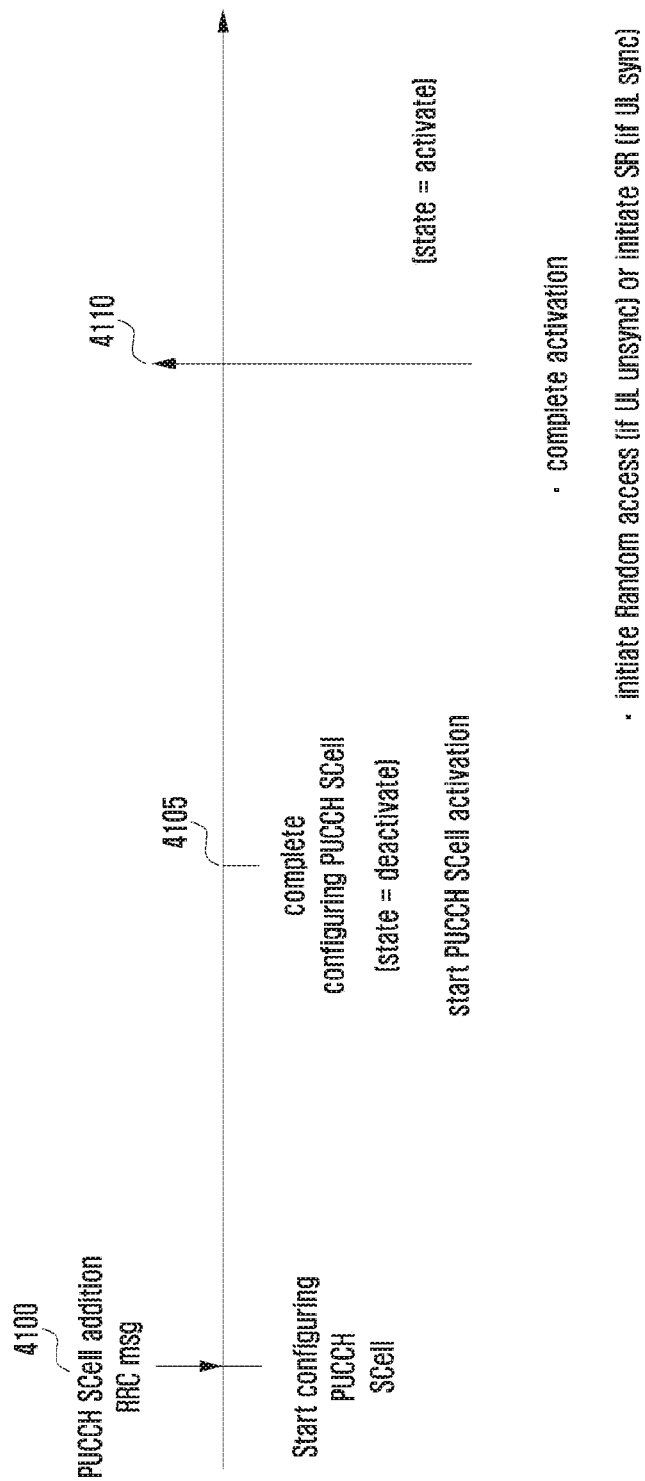
FIG. 41 is a diagram illustrating a process of activating PUCCH SCell according to the process of activating a general SCell.

FIG. 41 is a diagram illustrating a process of activating PUCCH SCell according to the process of activating a PSCell.

Referring to FIG. 41, the terminal receives the RRC message indicating an addition of the PUCCH SCell from the base station (4100). In this case, the terminal configures the PUCCH SCell. If the configuration of the PUCCH SCell is completed, the terminal automatically activates the PUCCH SCell (4105). The PUCCH SCell is considered as the deactivation state before the activation of the PUCCH SCell is completed. If the activation of the PUCCH SCell is completed, the terminal and the base station performs the random access to the PUCCH SCell (4110).

According to the related art, after the activation all the times, the random access is performed, and therefore the base station need not perform the blinding decoding. The reason is that after the random access, the terminal will perform the valid CSI report and the SRS transmission to the SCell. However, the case of the rest SCell except for the case in which the base station instructs the PUCCH SCell uses the activation/deactivation MAC CE to perform the activation or deactivation process., Therefore, the terminal needs to have two kinds of activation mechanisms, and therefore the complexity is increased.

On the other hand, according to the existing process of activating PSCell, performing the random access all the times may be unnecessary in some cases. For example, when the SCell that is being used as the general SCell is reconfigured as the PUCCH SCell, the general SCell may be already synchronized. In this case, after the activation of the PUCCH SCell is completed, it may be unnecessary to perform the random access again.

The present embodiment proposes a method for changing the existing process of activating PSCell to be appropriate for the process of activating PUCCH PSCell while bascially following the existing process of activating PSCell. The present embodiment performs another terminal operation depending on the uplink synchronization after the PUCCH SCell is completed. That is, if the PUCCH SCell is in the synchronized state in the uplink and the dedicated scheduling configuration (D-SR) is configured, the terminal transmits the D-SR n times and then starts the CSI transmission and the SRS transmission. Otherwise, if the PUCCH SCell is in the synchronized state in the uplink and the D-SR is not configured, the terminal starts the CSI transmission and the SRS transmission from the defined timing, for example, (n+m) timing. Here, n may be timing when the RRC message configuring the PUCCH SCell is received, timing when the configuration of the PUCCH SCell is completed, or timing when the activation of the PUCCH SCell is completed. If the PUCCH SCell is in an asynchronized state in the uplink, the random access starts in the PUCCH SCell.

Figure 42:
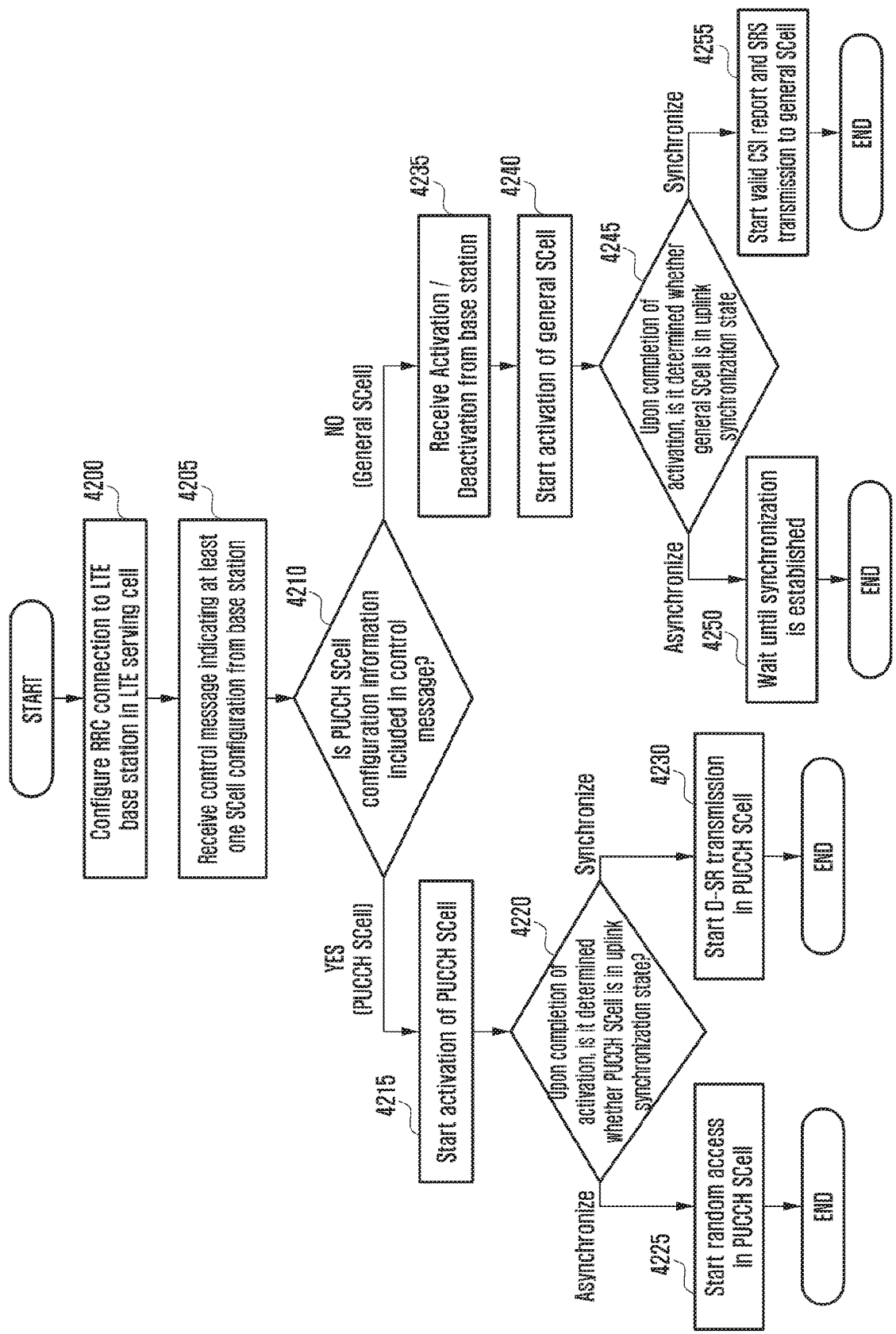
FIG. 42 is a flow chart illustrating the operation of the terminal according to the present embodiment.

FIG. 42 is a flow chart illustrating a terminal operation in the present embodiment.

Referring to FIG. 42, in step 4200, the terminal configures the RRC connection to the LTE base station in the LTE serving cell. In step 4205, the terminal receives a control message instructing at least one SCell configuration from the base station. In step 4210, the terminal determines whether the configuration information of the PUCCH SCell is included in the control message. If included, based on the configuration information, the terminal completes the configuration of the PUCCH SCell and then in step 4215, starts the activation of the PUCCH SCell.

When the activation of the PUCCH SCell is completed, in step 4220, the terminal determines whether the PUCCH SCell is synchronized in the upper link. The synchronization may be determined depending on whether a valid time alignment timer (TAT) timer is driving, for the PUCCH SCell. If the TAT timer is driving, the synchronization is being maintained. Otherwise, the synchronization process is required.

If ayncronized, in step 4225, the terminal starts the random access on the PUCCH SCell. If synchronized, the terminal starts the D-SR transmission on the PUCCH SCell. If the D-SR transmission is not required, a predetermined time lapses and then the CSI report and the SRS transmission are performed.

For the general SCell, the SCell configuration is completed and then the SCell is configured to maintain the deactivation state. In step 4235, the terminal receives the activation/deactivation MAC CE from the base station. If the instruction to activate the SCell in the deactivation state in the A/D MAC CE is issued, in step 4240, the terminal starts the activation of the SCell in the deactivation state. As described above, the case except for the case in which the base station instructs the PUCCH SCell uses the activation/deactivation MAC CE like the general SCell to perform the process of activating or deactivating the SCell.

In step 4245, the terminal determines whether the instruction to activate the general SCell in the deactivation state is issued. If the general SCell is in the asynchronized state, in step 4250, the process waits until the synchronization is established in the uplink. In this case, the base station will instruct the terminal to perform the random access for synchronization in the PDCCH order. If the general SCell is in the synchronized state, the valid CSI report for the SCell and the SRS transmission to the SCell start.

Figure 43:
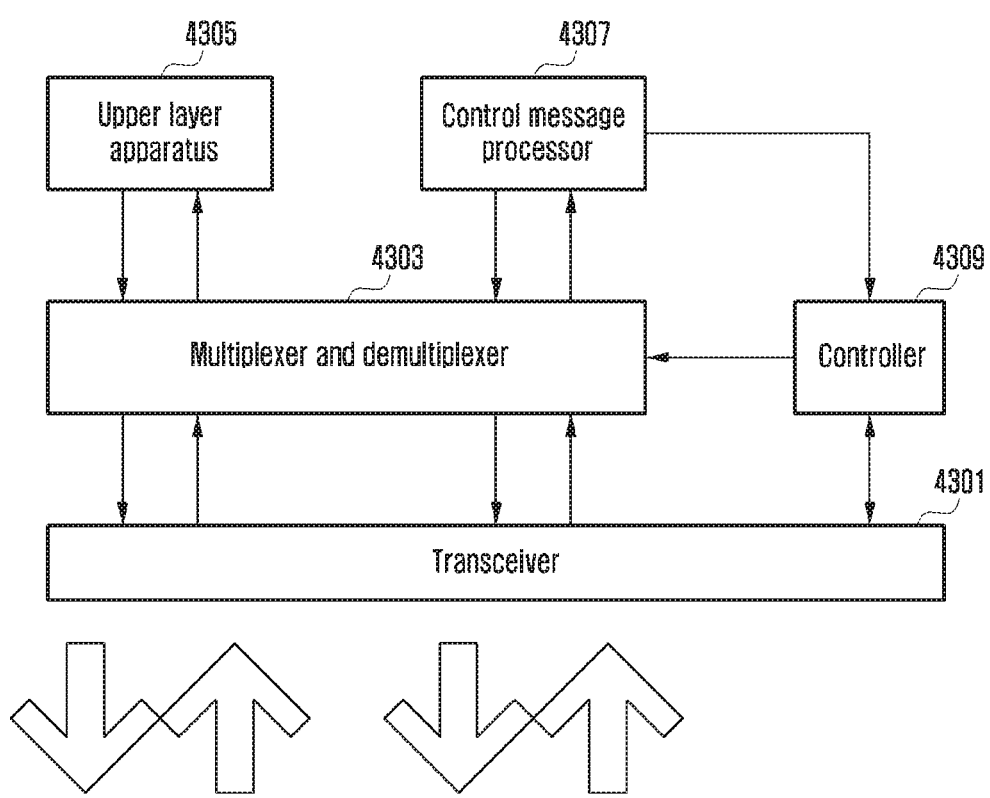
FIG. 43 is a diagram illustrating the terminal apparatus which may perform the present embodiment.

FIG. 43 illustrates the terminal apparatus which may perform the present embodiment.

Referring to FIG. 43, the terminal transmits and receives data, etc., to and from an upper layer 4305, transmits and receives control messages through a control message processor 4307, upon the transmission, multiplexes data using a multiplexer 4303 according to a control of a controller 4309 and then transmits (4301) the data through the transmitter, and upon the reception, receives (4301) a physical signal to the receiver according to the control of the controller 4309, demultiplexes the received signal by a multiplexer and demultiplexer 4303, and then transmits it to the upper layer 4305 or a control message processor 4307 according to the message information.

In the present embodiment, if the control message processor 4307 receives the activation/deactivation MAC CE, the control message processor 4307 informs an SCell activation/deactivation processor 4311 of the received activation/deactivation MAC CE to determine first timing upon activation and at the first timing, the controller 4309 and the control message processor 4307 are instructed to perform the operations to be performed at the first timing. If the deactivation of the already activated SCell is instructed, second timing is determined, and the controller 4309 and the control message processor 4307 are instructed to perform first operations to be performed before the second timing and at the second timing, are instructed to perform the second operations to be performed at the second timing.

When using the proposed method, the defined operation is performed at the defined timing when the SCell is activated and deactivated in the case of using the carrier aggregation technology, thereby preventing a malfunction and performing an accurate operation.

While the present invention has been described in connection with the exemplary embodiments thereof, various modifications and variations can be made without departing from the scope of the present embodiment. Therefore, the scope of the present embodiment should be not construed as being limited to the described exemplary embodiments but be defined by the appended claims as well as equivalents thereto.

Fifth Embodiment

Hereinafter, when it is determined that the detailed description of the known art related to the present embodiment may obscure the gist of the present embodiment, the detailed description thereof will be omitted. Hereinafter, the present embodiment will be described in detail with reference to the accompanying drawings.

The present invention relates to a method and an apparatus for performing a scheduling request (SR) in a plurality of cells which may transmit a physical uplink control channel (PUCCH) in an LTE mobile communication system.

Figure 44:
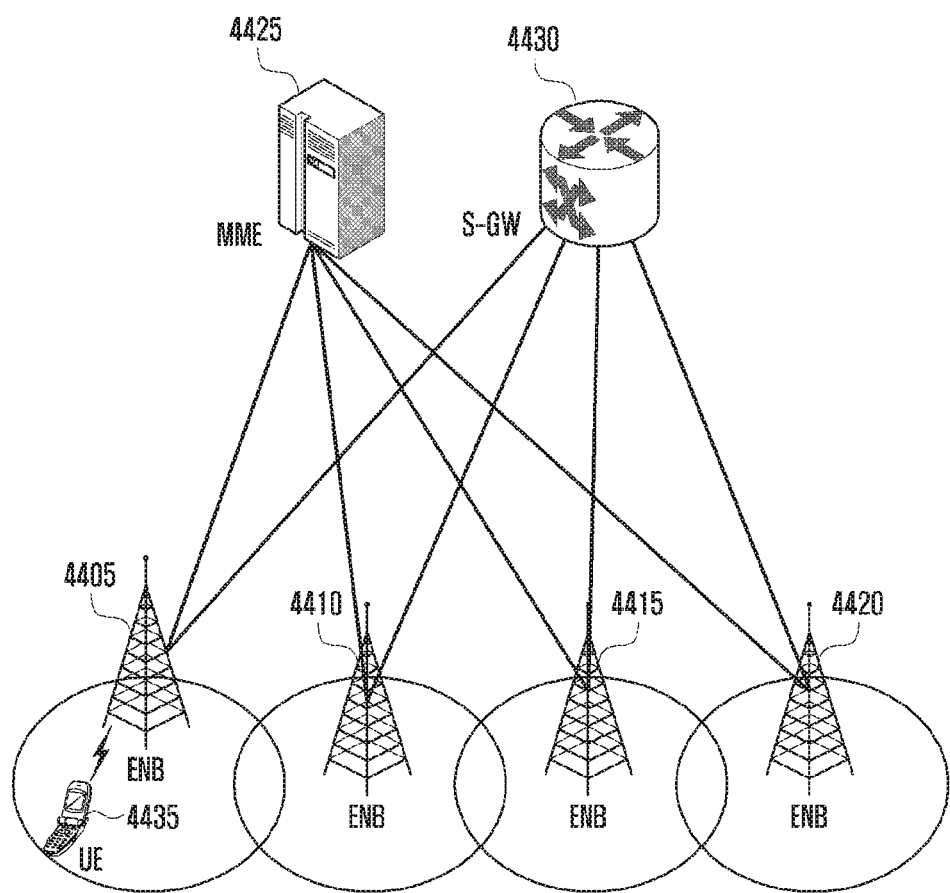
FIG. 44 is a diagram illustrating the structure of the LTE system to which the present invention is applied.

FIG. 44 is a diagram illustrating a structure of the LTE system to which the present embodiment is applied.

Referring to FIG. 44, a radio access network of the LTE system is configured to include next-generation base stations (evolved node B, hereinafter, ENB, Node B, or base station) 4405, 4410, 4415, and 4420, a mobility management entity (MME) 4425, and a serving-gateway (S-GW) 4430. User equipment (hereinafter, UE or terminal) 4435 is connected to an external network through the ENBs 4405, 4410, 4415, and 4420 and the S-GW 4430.

In FIG. 44, the ENBs 4405, 4410, 4415, and 4420 correspond to the existing node B of a UMTS system. The ENB is connected to the UE 4435 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel state of the UEs is required. Here, the ENBs 4405, 4410, 4415, and 4420 take charge of the collecting and scheduling.

One ENB generally controls a plurality of cells. For example, to implement a transmission rate of 100 Mbps, the LTE system uses, as a radio access technology, orthogonal frequency division multiplexing (OFDM) in, for example, a bandwidth of 20 MHz. Further, an adaptive modulation & coding (AMC) determining a modulation scheme and a channel coding rate depending on a channel status of the terminal is applied. The S-GW 4430 is an apparatus for providing a data bearer and generates or removes the data bearer according to the control of the MME 4425. The MME is an apparatus for performing a mobility management function for the terminal and various control functions and is connected to a plurality of base stations.

Figure 45:
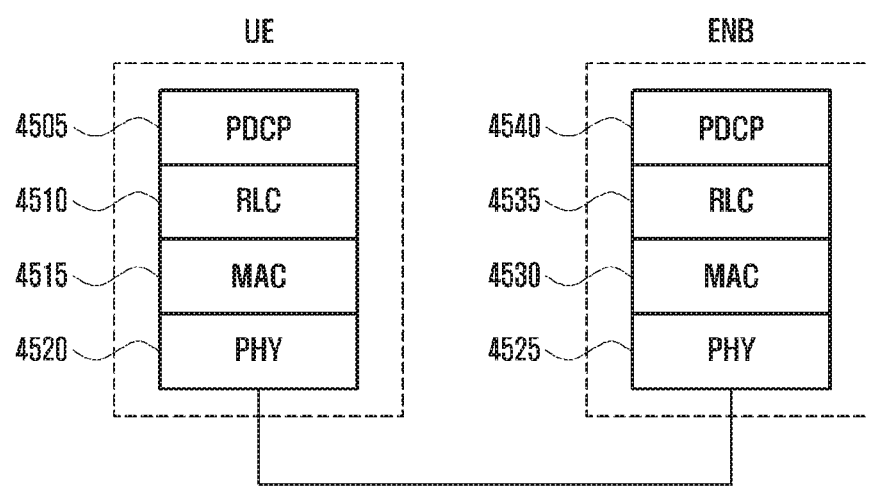
FIG. 45 is a diagram illustrating the radio protocol structure in an LTE system to which the present invention is applied.

FIG. 45 is a diagram illustrating a radio protocol structure in an LTE system to which the present invention is applied.

Referring to FIG. 45, the radio protocol of the LTE system consists of packet data convergence protocols (PDCPs) 4505 and 4540, radio link controls (RLCs) 4510 and 4535, and medium access controls (MMCs) 4515 and 4530 in the terminal and the ENB, respectively. The packet data convergence protocols (PDCPs) 4505 and 4540 performs operations such as compression/recovery of an IP header and the radio link controls (hereinafter, referred to as RLC) 4510 and 4535 reconfigures a PDCP packet data unit (PDU) at an appropriate size to perform an ARQ operation, or the like. The MACs 4515 and 4530 are connected to several RLC layer apparatuses configured in one terminal and performs an operation of multiplexing RLC PDUs into an MAC PDU and demultiplexing the RLC PDUs from the MAC PDU. Physical layers 4520 and 4525 perform an operation of channel-coding and modulating upper layer data, making them as an OFDM symbol, and transmitting them to the radio channel or an operation of demodulating the OFDM symbol received through the radio channel, channel-decoding it, and transmitting it to an upper layer.

Figure 46:
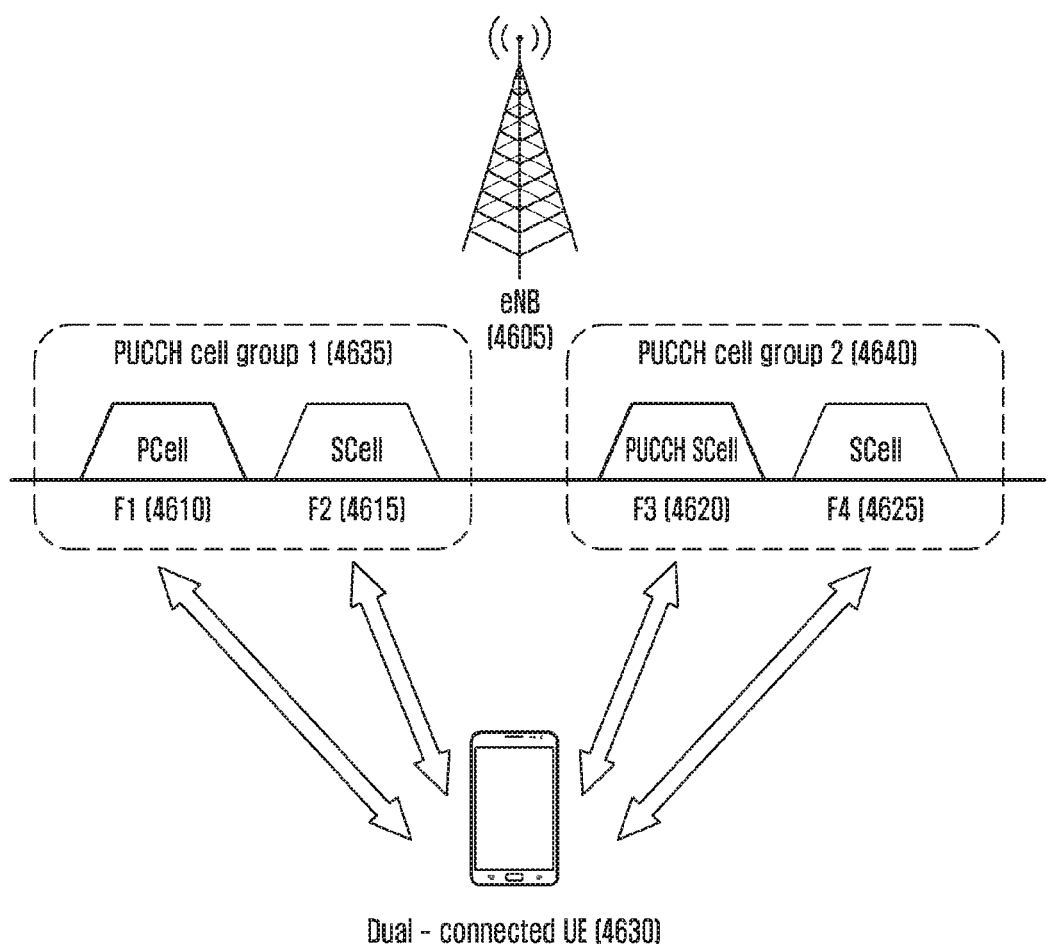
FIG. 46 is a diagram illustrating the improved carrier aggregation in the terminal.

FIG. 46 is a diagram illustrating an improved carrier aggregation system in the terminal.

Referring to FIG. 46, one base station generally transmits and receives multi-carriers over several frequency bands. For example, when the base station 4605 receives uplink carriers for four cells, according to the related art, one terminal uses one of the plurality of cells to transmit and receive data. However, the terminal having carrier aggregation ability may simultaneously transmit and receive data through several carriers. The base station 4605 may allocate more carriers to the terminal 4630 having the carrier aggregation ability in some case to increase a data transmission rate of the terminal 4630.

As the traditional meaning, when one forward carrier transmitted from one bas station and one reverse carrier received by the base station configure one cell, the carrier aggregation may also be understood that the terminal simultaneously transmits and receives data through several cells. By doing so, the maximum transmission rate is increased in response to the integrated number of carriers.

The LTE Release (Rel)-10 carrier aggregation technology may configure up to five cells in one terminal. One of the configured cells necessarily has the PUCCH, the cell is called a primary cell (PCell), and the rest cells which do not have the PUCCH is called a secondary cell (SCell). The PCell needs to be able to perform functions of a traditional serving cell such as a handover and a radio link failure (RLF) related operation performance, in addition to features having the PUCCH.

Hereinafter, in describing the present invention, receiving, by the terminal, data through any forward carrier or transmitting, from the terminal, the data through any reverse carrier have the same meaning as transmitting and receiving the data through a control channel and a data channel which are provided from a cell a central frequency and a frequency band characterizing the carriers. Further, the following embodiment of the present invention will describe the LTE system for convenience of explanation but the present invention may be applied to various kinds of wireless communication systems supporting the carrier aggregation.

In the Release 10 carrier aggregation technology, the uplink control information may be transmitted and received through the PUCCH only in the PCell. However, if an information amount to be transmitted to the base station through the PUCCH is increased, processing, by only the single PUCCH, the corresponding information amount may be burdened. In particular, a method for supporting up to 32 carriers has been discussed in the LTE Release 13 and in addition to the PCell, making the SCell have the PUCCH has an advantage of a PUCCH loading dispersion, or the like. Therefore, in addition to the PCell, a method for introducing the PUCCH into the SCell has been proposed. For example, in FIG. 46, the PUCCH may be additionally introduced into one SCell 4620. In the present invention, the SCell having the PUCCH is called a PUCCH SCell.

Conventionally, all PUCCH related signaling is transmitted to the base station through the PCell. However, the plurality of PUCCHs are present, and therefore there is a need to differentiate through which PUCCH the PUCCH signalings of each SCell are transmitted to the base station. As illustrated in FIG. 46, if it is assumed that two PUCCHs are present, to transmit the uplink control information, they are differentiated into a group 4635 of cells using the PUCCH of the PCell and a group 4640 of cells using the PUCCH of a specific SCell. In the present invention, the group is called a PUCCH cell group.

In the LTE mobile communication system, the terminal reports HARQ feedback information, channel status information report, and an SR to the base station through the PUCCH.

Figure 47:
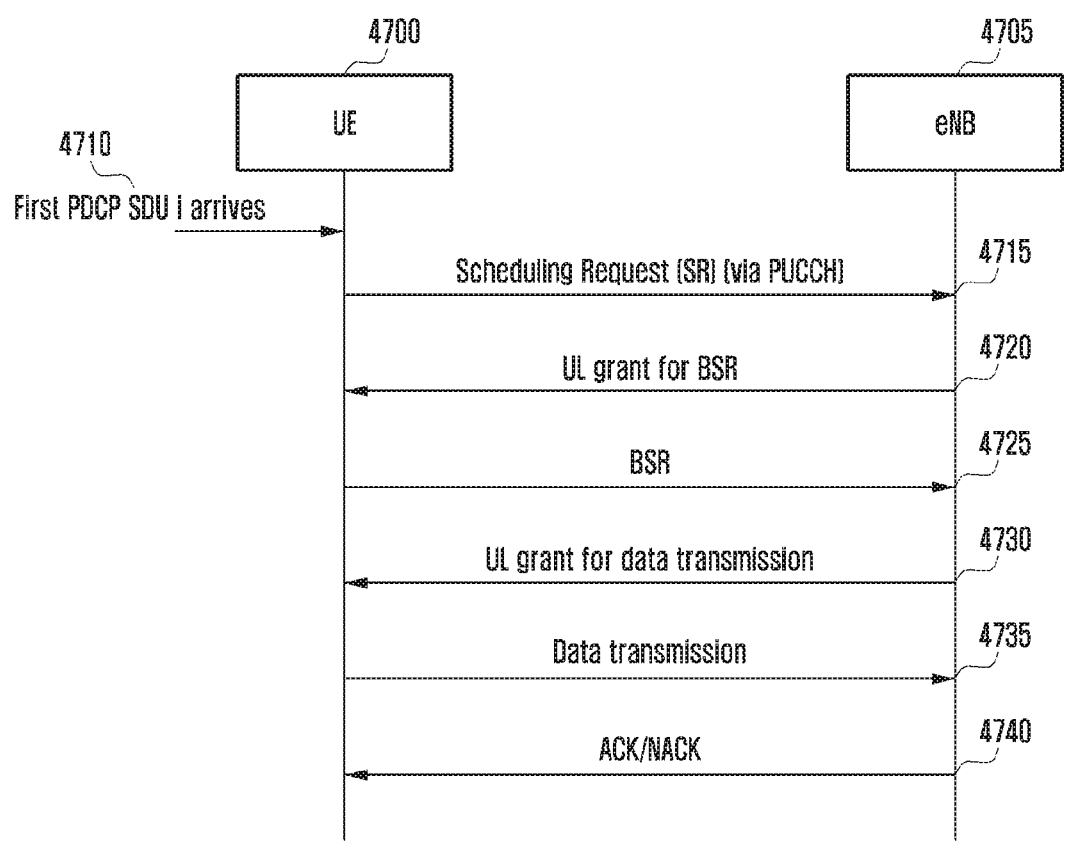
FIG. 47 is a diagram for describing a process of receiving a radio resource allocated from the base station by allowing the terminal to transmit the SR.

FIG. 47 is a diagram illustrating a process of receiving a radio resource allocated from the base station by allowing the terminal to transmit the SR.

Referring to FIG. 47, in step 4710, a PDCP SDU to be transmitted to a terminal 4700 is generated. In step 4715, the terminal determines whether the radio resource transmitting the data is present. If the resource is not present, it is determined whether usable PUCCH is allocated. If the PUCCH is present, the SR is transmitted to a base station 4705 using the PUCCH. In this case, the terminal starts a scheduling request prohibit timer (SR prohibit timer). The SR prohibit timer is introduced to prevent the SR from being frequently transmitted. The SR prohibit timer is derived by an sr-ProhibitTimer informationelement (IE) and SR periodicity configured as the RRC message.

The following Table represents MAC-MainConfig IE. The IE is provided to the terminal through the RRC message. Sr-ProhibitTimer-r9 IE included in the MAC-MainConfig IE has values between 0 to 7. The value of the SR prohibit timer value is derived by a product of the value and the SR periodicity.

MAC-MainConfig information element

```
-- ASN1START
MAC-MainConfig ::=                      SEQUENCE {
        ul-SCH-Config                   SEQUENCE {
                maxHARQ-Tx
        ENUMERATED {
                                                                n1,
n2, n3, n4, n5, n6, n7, n8,
        n10, n12, n16, n20, n24, n28,
        spare2, spare1}         OPTIONAL, -- Need ON
                periodicBSR-Timer               PeriodicBSR-Timer-r12
OPTIONAL, -- Need ON
                retxBSR-Timer                           RetxBSR-Timer-
r12,
                ttiBundling                             BOOLEAN
        }
                                OPTIONAL, -- Need ON
        drx-Config                              DRX-Config
                OPTIONAL, -- Need ON
        timeAlignmentTimerDedicated             TimeAlignmentTimer,
        phr-Config                              CHOICE {
                release                                 NULL,
                setup                                   SEQUENCE {
                        periodicPHR-Timer               ENUMERATED
{sf10, sf20, sf50, sf100, sf200,
                        sf500, sf1000, infinity},
                        prohibitPHR-Timer               ENUMERATED
{sf0, sf10, sf20, sf50, sf100,
                                sf200, sf500, sf1000},
                        dl-PathlossChange               ENUMERATED
{dB1, dB3, dB6, infinity}
                }
        }                       OPTIONAL, -- Need ON
        ...,
        [[      sr-ProhibitTimer-r9             INTEGER (0..7)
                OPTIONAL  -- Need ON
        ]],
        [[      mac-MainConfig-v1020            SEQUENCE {
                        sCellDeactivationTimer-r10      ENUMERATED
{
        rf2, rf4, rf8, rf16, rf32, rf64, rf128,
        spare}          OPTIONAL, -- Need OP
                        extendedBSR-Sizes-r10           ENUMERATED
{setup}         OPTIONAL, -- Need OR
                        extendedPHR-r10
                ENUMERATED {setup}
OPTIONAL        -- Need OR
                }
                                OPTIONAL  -- Need ON
        ]],
        [[      stag-ToReleaseList-r11          STAG-ToReleaseList-
r11     OPTIONAL, -- Need ON
                stag-ToAddModList-r11           STAG-ToAddModList-
r11     OPTIONAL, -- Need ON
                drx-Config-v1130                DRX-Config-v1130
        OPTIONAL
        -- Need ON
]],
        [[      e-HARQ-Pattern-r12                      BOOLEAN
                        OPTIONAL, -- Need ON
                dualConnectivityPHR     CHOICE {
        release                 NULL,
                        setup
SEQUENCE {
                        phr-ModeOtherCG-r12
ENUMERATED {real, virtual}
                }
        }
                        OPTIONAL, -- Need ON
                logicalChannelSR-Config-r12     CHOICE {
                        release
NULL,
                        setup
```

```
            SEQUENCE {
                        logicalChannelSR-ProhibitTimer-r12
            ENUMERATED {sf20, sf40, sf64, sf128, sf512, sf1024, sf2560, spare1}
                    }
                }
                                        OPTIONAL   -- Need ON
        ]]
}
MAC-MainConfigSCell-r11 ::=              SEQUENCE {
    stag-Id-r11                              STAG-Id-r11
    OPTIONAL, -- Need OP
    ...
}
DRX-Config ::=                           CHOICE {
    release                                  NULL,
    setup                                    SEQUENCE {
        onDurationTimer                          ENUMERATED
{
    psf1, psf2, psf3, psf4, psf5, psf6,
    psf8, psf10, psf20, psf30, psf40,
    psf50, psf60, psf80, psf100,
    psf200},
        drx-InactivityTimer              ENUMERATED {
    psf1, psf2, psf3, psf4, psf5, psf6,
    psf8, psf10, psf20, psf30, psf40,
    psf50, psf60, psf80, psf100,
    psf200, psf300, psf500, psf750,
    psf1280, psf1920, psf2560, psf0-v1020,
    spare9, spare8, spare7, spare6,
    spare5, spare4, spare3, spare2,
    spare1},
        drx-RetransmissionTimer          ENUMERATED {
    psf1, psf2, psf4, psf6, psf8, psf16,
    psf24, psf33},
        longDRX-CycleStartOffset     CHOICE {
                sf10                             INTEGER(0..9),
                sf20                             INTEGER(0..19),
                sf32                             INTEGER(0..31),
                sf40                             INTEGER(0..39),
                sf64                             INTEGER(0..63),
                sf80                             INTEGER(0..79),
                sf128
INTEGER(0..127),
                sf160
INTEGER(0..159),
                sf256
INTEGER(0..255),
                sf320
INTEGER(0..319),
                sf512
INTEGER(0..511),
                sf640
INTEGER(0..639),
                sf1024
INTEGER(0..1023),
                sf1280
INTEGER(0..1279),
                sf2048
INTEGER(0..2047),
                sf2560
INTEGER(0..2559)
        },
        shortDRX                             SEQUENCE {
            shortDRX-Cycle
ENUMERATED      {
sf2, sf5, sf8, sf10, sf16, sf20,
sf32, sf40, sf64, sf80, sf128, sf160,
sf256, sf320, sf512, sf640},
            drxShortCycleTimer                   INTEGER (1..16)
        }          OPTIONAL
                            -- Need OR
    }
}
DRX-Config-v1130 ::=                     SEQUENCE {
    drx-RetransmissionTimer-v1130            ENUMERATED {psf0-v1130}
    OPTIONAL, --Need OR
    longDRX-CycleStartOffset-v1130           CHOICE {
        sf60-v1130
```

```
            INTEGER(0..59),
                sf70-v1130
            INTEGER(0..69)
            }
                                    OPTIONAL, --Need OR
        shortDRX-Cycle-v1130                    ENUMERATED
            {sf4-v1130} OPTIONAL --Need OR
}
PeriodicBSR-Timer-r12 ::=                       ENUMERATED {
                                                                    sf5,
sf10, sf16, sf20, sf32, sf40, sf64, sf80,
        sf128, sf160, sf320, sf640, sf1280, sf2560,
        infinity, spare1}
RetxBSR-Timer-r12 ::=                                   ENUMERATED
{
        sf320, sf640, sf1280, sf2560, sf5120,
        sf10240, spare2, spare1}
STAG-ToReleaseList-r11 ::=      SEQUENCE (SIZE (1..maxSTAG-r11)) OF STAG-
Id-r11
STAG-ToAddModList-r11 ::=       SEQUENCE (SIZE (1..maxSTAG-r11)) OF STAG-
ToAddMod-r11
STAG-ToAddMod-r11 ::=           SEQUENCE {
        stag-Id-r11                         STAG-Id-r11,
        timeAlignmentTimerSTAG-r11  TimeAlignmentTimer,
        ...
}
STAG-Id-r11::=                              INTEGER (1..maxSTAG-r11)
-- ASN1STOP
```

In step 4720, the base station successfully receiving the SR schedules the radio resource through which the terminal may transmit the buffer status report (BSR) to the terminal. If the radio resource which may transmit the BSR is not scheduled and the SR prohibit timer expires, the terminal may again transmit the SR. Further, every time the SR transmission is attempted, an SR_COUNTER counter value is increased by 1. If the counter value is equal to dsr-TransMax which is one setting value, the terminal attempts the random access to the base station. The base station configures the dsr-TransMax value in the terminal and the dsr-TransMax value has one of {4, 8, 16, 32, 64}. The BSR is used to inform the base station how much the terminal has transmission data.

In step 4725, the terminal uses the allocated radio resource to transmit the BSR to the base station. In step 4730, the base station allocates the radio resource to allow the terminal to transmit the PDCP SDU. In step 4735, the terminal transmits the data to the base station using the allocated radio resource. In step 4740, the base station transmits ACK/NACK information on the data to the terminal. The terminal periodically uses the allocated SR radio resource to transmit the SR to the base station. As shown in the following Table 4, the SR radio resource is allocated to the PUCCH at a period of at least 1 ms and up to 80 ms.

Terminal 4

| SR configuration Index $I_{SR}$ | SR periodicity (ms) $SR_{PERIODICITY}$ | SR subframe offset $N_{OFFSET,SR}$ |
| --- | --- | --- |
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

In the Release-13 LTE standard technology, the plurality of serving cells having the PUCCH may be configured. Therefore, the terminal may also transmit the SR from at least one serving cell in the uplink.

Figure 48:
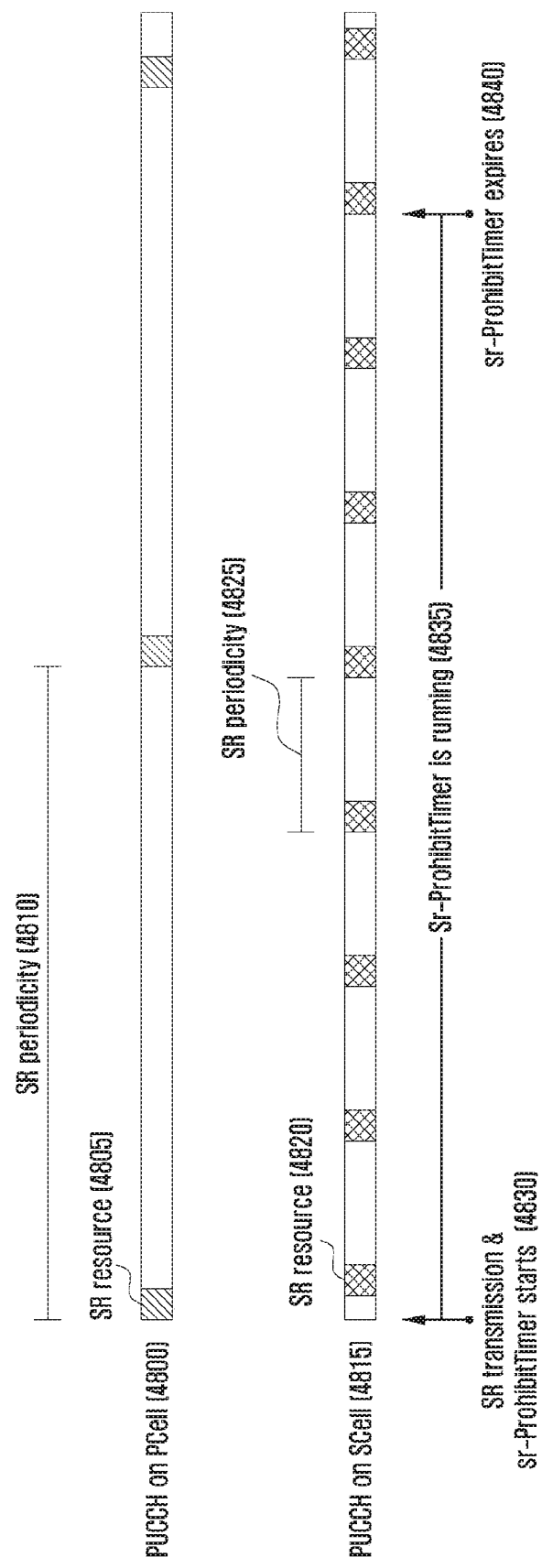
FIG. 48 is a diagram for describing a process of transmitting SR from a plurality of serving cells having PUCCH.

FIG. 48 is a diagram illustrating a process of transmitting SR from a plurality of serving cells having PUCCH.

Referring to FIG. 48, the PCell has the PUCCH. Therefore, it is assumed that the PUCCH is additionally configured in one SCell. In the case, a separate SR radio resource may be allocated to each PUCCH. It is assumed that two serving cells, that is, the PCell 4800 and one SCell 4815 provide the PUCCH. SR periodicity 4810 of an SR radio resource 4805 in the PUCCH of the PCell need not to be the same as SR periodicity 4825 of an SR radio resource 4820 in the PUCCH of the SCell. Further, offset values of the positions of the SR radio resources need not be the same.

If one SR is triggered, the terminal may select one of the SR radio resources of the respective PUCCHs depending on a predetermined rule to transmit the SR of the terminal to the base station. Every time the terminal transmits the SR, the SR_COUNTER value is increased by 1. Further, after the terminal transmits the SR, the SR prohibit timer starts. If the SR prohibit timer expires, the terminal may retransmit the SR again. In the case of FIG. 48, the SR is transmitted onto the SR radio resource 4805 (4830) and the SR prohibit timer proceeds and thus is completed (4835 and 4840), and then the new SR may be transmitted again.

By the way, in this case, there is a need to determine how to set the SR prohibit timer value. Unlike the related art, the reason is that two SR periodicity is present. In the present embodiment, when the plurality of SRs are configured in the plurality of serving cells having the PUCCH, a method for deriving an SR prohibit value is proposed.

If the dedicated D-SR is configured in the PUCCH SCell or the PCell, the terminal applies one of predetermined rules enumerated below to determine the sr-ProhibitTimer IE and the SR periodicity which will be used to the SR prohibit timer value. In the present emobodiment, it is assumed that the sr-ProhibitTimer IE may be configured in each serving cell having the PUCCH. When the Sr-ProhibitTimer IE is configured only in one serving cell, a rule to determine the sr-ProhibitTimer IE and the SR periodicity which will be used is as follows.

Rule 1-1: The Sr-ProhibitTimer IE applies the SR periodicity of the configured serving cell to derive the SR prohibit timer value. For example, when the PUCCH is configured in the PCell and the PUCCH SCell, if the Sr-ProhibitTimer IE is configured only in the PCell, the SR prohibit timer value determined using the SR periodicity of the Pcell and the Sr-ProhibitTimer IE is applied to both of the PCell and the PUCCH SCell.

Rule 1-2: If the SR is transmitted from the serving cell in which the Sr-ProhibitTimer IE is configured, the rule 1-1 is applied and if the SR is transmitted from the serving cell in which the Sr-ProhibitTimer IE is not configured, the SR prohibit timer is not driven. For example, when the PUCCH is configured in the PCell and the PUCCH SCell, if the Sr-ProhibitTimer IE is configured only in the PCell, the SR prohibit timer value determined using the SR periodicity and the Sr-ProhibitTimer IE of the PCell is applied to the PCell and the SR prohibit timer is not applied to the PUCCH SCell.

Rule 1-3: The SR prohibit timer value is determined by using the sr-ProhibitTimer IE and the SR periodicity of the predetermined serving cell. If the sr-ProhibitTimer IE is not configured in the predetermined serving cell, the SR prohibit timer is not driven. For example, it may be defined that the SR prohibit timer value is determined by using the sr-ProhibitTimer IE and the SR periodicity of the PCell or the PUCCH SCell. When the SR prohibit timer value is determined using the sr-ProhibitTimer IE and the SR periodicity of the PCell, if the sr-ProhibitTimer IE is configured in the PCell, the determined SR prohibit timer value is applied to both of the PCell and the PUCCH Scell and if the sr-ProhibitTimer IE is not configured in the PCell, the SR prohibit timer value is not applied to both of the PCell and the PUCCH Scell.

When the Sr-ProhibitTimer IE is configured in both serving cells, that is, the PCell and the PUCCH SCell, the rule determining the sr-ProhibitTimer IE and the SR periodicity which will be used is as follows.

Rule 2-1: The sr prohibit timer value is determined using the SR periodicity and the sr-prohibitTimer IE of the serving cell in which the SR periodicity of the PCell and the SR periodicity of the PUCCH SCell are short or long. For example, when the SR periodicity of the PCell is shorter than the SR periodicity of the PUCCH SCell, if the SR periodicity of the serving cell having the short SR periodicity and the sr-prohibitTimer IE are used, the SR prohibit timer value is determined using the SR periodicity and the sr-prohibitTimer IE of the PCell to be applied to both of the PCell and the PUCCH SCell and if the SR periodicity of the serving cell having the long SR periodicity and the sr-prohibitTimer IE are used, the SR prohibit timer value is determined using the SR periodicity and the sr-prohibit-Timer IE of the PUCCH SCell to be applied to both of the PCell and the PUCCH SCell.

Rule 2-2: The SR periodicity and the sr-prohibitTimer IE of the serving cell to which the SR is transmitted are applied or the sr-ProhibitTimer IE and the SR periodicity of the serving cell explicitly instructed by the base station are applied to determine the SR prohibit timer value. For example, if the SR is transmitted just before from the PCell, the SR periodicity and the sr-prohibitTimer IE of the PCell are used to determine the SR prohibit timer value to be applied to both of the PCell and the PUCCH SCell or if the base station is instructed to use the sr-ProhibitTimer IE and the SR periodicity of the PCell, the SR prohibit timer value is determined using the SR periodicity and the sr-prohibit-Timer IE of the PCell to be applied to both of the PCell and the PUCCH SCell.

Figure 49:
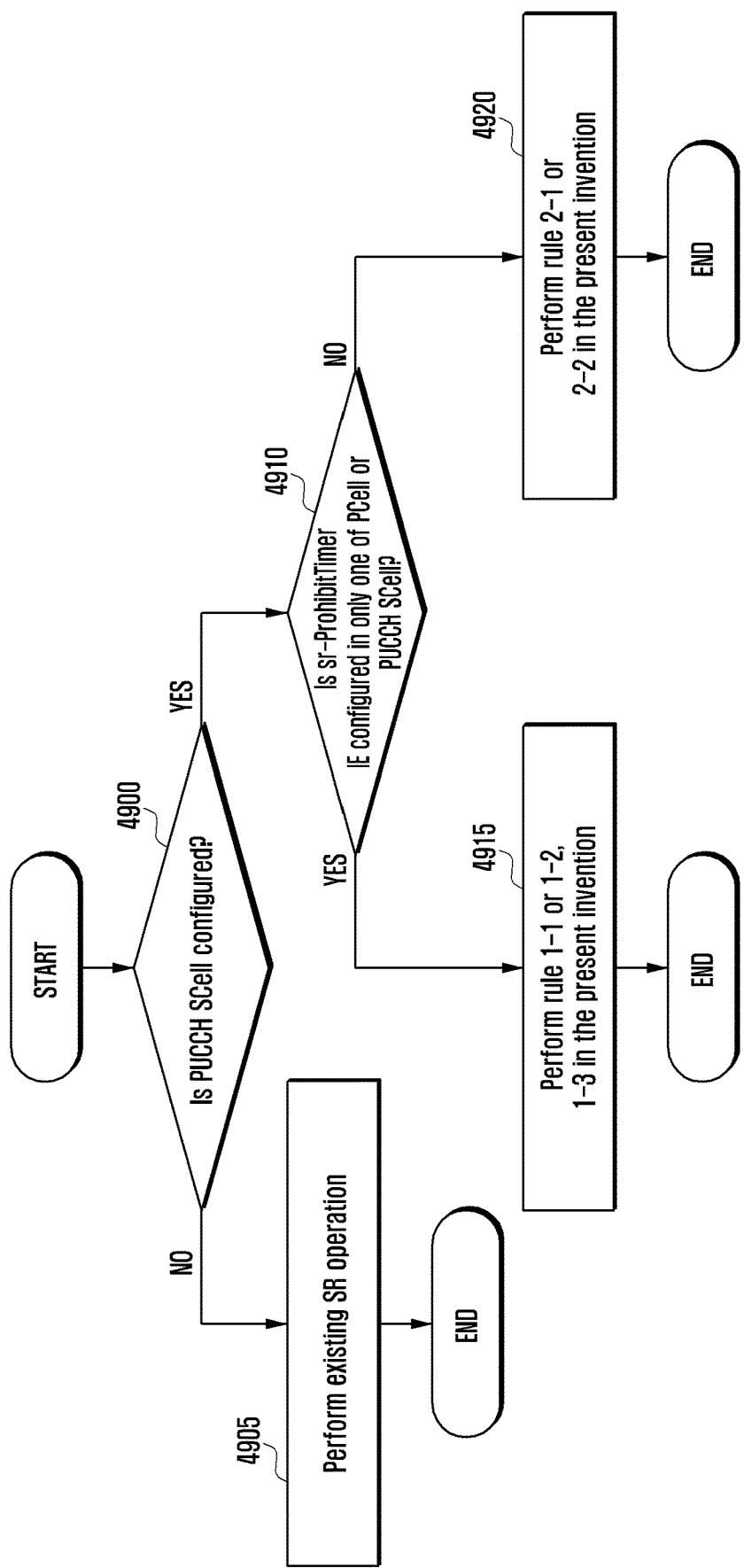
FIG. 49 is a flow chart illustrating the operation of the terminal according to the present embodiment.

FIG. 49 is a flow chart illustrating a terminal operation in the present embodiment.

Referring to FIG. 49, in step 4900, the terminal determines whether the PUCCH SCell is configured. If the PUCCH SCell is not configured, only the PCell is present in the serving cell which may transmit the SR. Therefore, in step 4905, the SR transmission process according to the related art is performed.

If the PUCCH SCell is configured in the terminal, the SR may be transmitted from even the PUCCH SCell. In step 4910, the terminal determiens whether the sr-ProhibitTimer IE is configured only in one of the PCell and the PUCCH SCell. Independent of whether the IE is configured, the terminal may transmit the SR to both of the PCell and the PUCCH SCell. If the IE is configured only in one cells, in step 4915, the terminal selects at least one of the proposed rules 1-1, 1-2, and 1-3 to derive the SR prohibit timer value to be applied. If the IE is configured in all of the two cells, in step 4920, at least one of the proposed rules 2-1 and 2-2 is selected and thus the SR prohibit timer value to be applied is derived.

Figure 50:
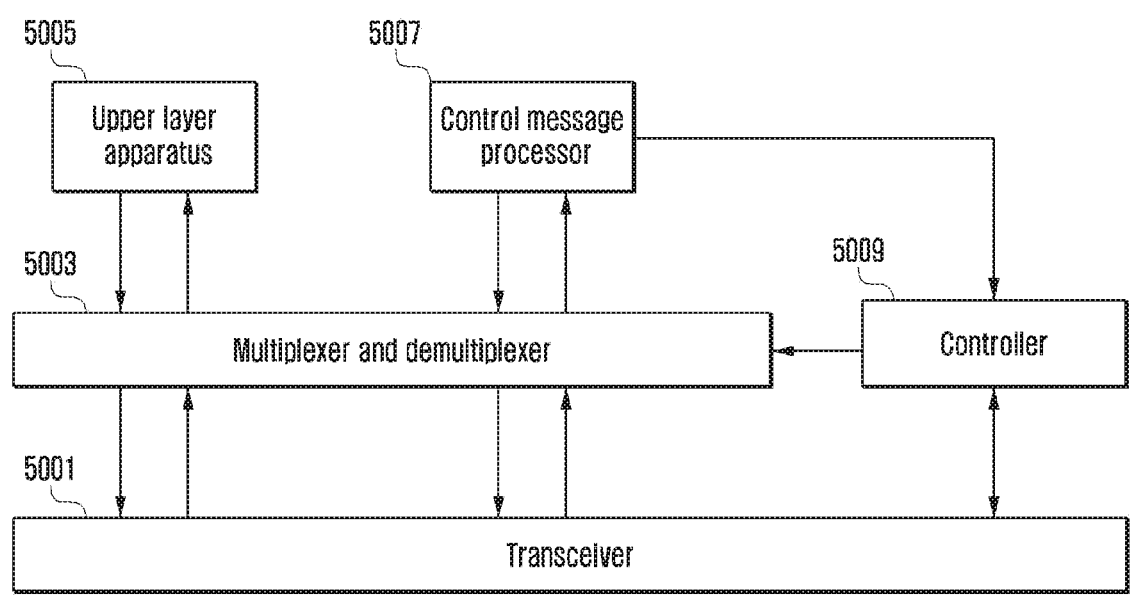
FIG. 50 is a diagram illustrating the terminal apparatus which may perform the present embodiment.

FIG. 50 illustrates the terminal apparatus which may perform the present embodiment.

Referring to FIG. 50, the terminal transmits and receives data, etc., to and from an upper layer 5005, transmits and receives control messages through a control message processor 5007, upon the transmission, multiplexes data using a multiplexer 5009 according to a control of a controller 5003 and then transmits (5001) the data through the transmitter, and upon the reception, receives (5009) a physical signal to the receiver according to the control of the controller 5001, demultiplexes the received signal by a multiplexer and demultiplexer 5003, and then transmits it to the upper layer 5005 or a control message processor 5007 according to the message information.

In particular, the controller 5009 determines whether the PUCCH SCell is configured therein according to the present embodiment, and if so, may control the multiplexer, demultiplexer 5003 and the transceiver 5001, or the like to transmit the SR according to the related art. Further, if the PUCCH SCell is configured, the SR prohibit timer value to be applied is derived depending on one of the proposed rules according whether the sr-ProhibitTimer IE is configured in one cell or both of the two cells and may control the multiplexer, demultiplexer 5003 and the transceiver 5001, or the like to transmit the SR according to the value.

The detailed description of the present invention has been described in connection with the detailed method and apparatus, various modifications and variations can be made without departing from the scope of the present embodiment. Therefore, the scope of the present embodiment should be not construed as being limited to the described content but be defined by the appended claims as well as equivalents thereto.

Sixth Embodiment

The present embodiment relates to a wireless communication system, and more particularly, to a licensed assisted access using an unlicensed frequency band with the help of a licensed band in a long term evolution (LTE) system.

In recent years, wireless communication technologies are rapidly developing and communication system technologies has steadily been developed accordingly. Among those, a system spotlighted as a fourth-generation mobile communication technology is the very LTE system. In the LTE system, various technologies have been introduced to meet the ever-increasing demand for traffic. The introduced technology is a carrier aggregation (CA). Unlike using only one carrier for communication between user equipment (may be used together with UE, terminal, a moving terminal, etc.) and the base station in the existing communication, the CA technology additionally uses a main carrier and one or a plurality of sub-carriers to surprisingly increase a transmission amount as much as the number of sub-carriers. Meanwhile, in the LTE, a cell within the base station using the main carrier is called a primary cell (PCell) and the sub-carrier is called a secondary cell (SCell). The number of PCells is only one and the number of SCells (based on LTE Release 11) may be up to four. However, the number of SCells may be added in the future.

Meanwhile, the LTE system is a system performing communication using a licensed band frequency allocated to common carriers from government, or the like. However, to meet the recently ever-increasing demand for traffic, a technical discussion to apply the LTE technology to the unlicensed band using wireless LAN, Bluetooth, or the like has been conducted, which is called a licensed-assisted access (hereinafter, called LAA) technology. When the LAA technology is applied to the CA technology, a scenario using the unlicensed band frequency by allowing the PCell to use a licensed band frequency and the SCell to use the LAA technology may be considered. As described above, the SCell using the unlicensed band is called an unlicensed SCell (U-SCell).

Meanwhile, when the terminal performsthe uplink transmission using the U-SCell, various problems may occur. For example, the unlicensed band may be used by the existing heterogeneous system like the wireless LAN, or the like or the in-band may be operated by the U-SCell of other carriers. As a result, data transmitted to the U-SCell are delayed due to interference or a transmission error may occur, and as a result the the terminal needs to transmit the uplink data on the U-SCell in consideration of the problem.

The present invention proposes to solve the above problem, and an object of the present invention is to provide an apparatus and a method for transmitting uplink data to an unlicensed band when an LAA technology is used in a wireless mobile communication system.

When the data are transmitted to the uplink using the LAA technology in the wireless communication system, the cell to be transmitted is selected based on the nature to data to be transmitted and it is determined whether to start the SR transmission procedure according to a kind of cells to which the uplink resource is allocated to allow the terminal to perform the uplink transmission for the important message without a delay.

Hereinafter, an operation principle of the present embodiment will be described in detail with reference to the accompanying drawings. Hereinafter, when it is determined that the detailed description of the known art related to the present embodiment may obscure the gist of the present embodiment, the detailed description thereof will be omitted. Further, the following terminologies are defined in consideration of the functions in the present embodiment and may be construed in different ways by the intention of users and operators. Therefore, the definitions thereof should be construed based on the contents throughout the specification.

Hereinafter, the present embodiment will describe a technology for providing a multi-link in a wireless communication system.

Terms identifying an access node, terms indicating network entity, terms indicating messages, terms indicating an interface between network entities, terms indicating various types of identification information, and so on that are used in the following description are exemplified for convenience of explanation. Accordingly, the present invention is not limited to terms to be described below and other terms having the equivalent technical meaning may be used.

Hereafter, for convenience of explanation, the present invention uses terms and names defined in the 3rd generation partnership project long term evolution (3GPP LTE). However, the present invention is not limited to the terms and names but may also be identically applied to the system according to other standards.

Figure 51:
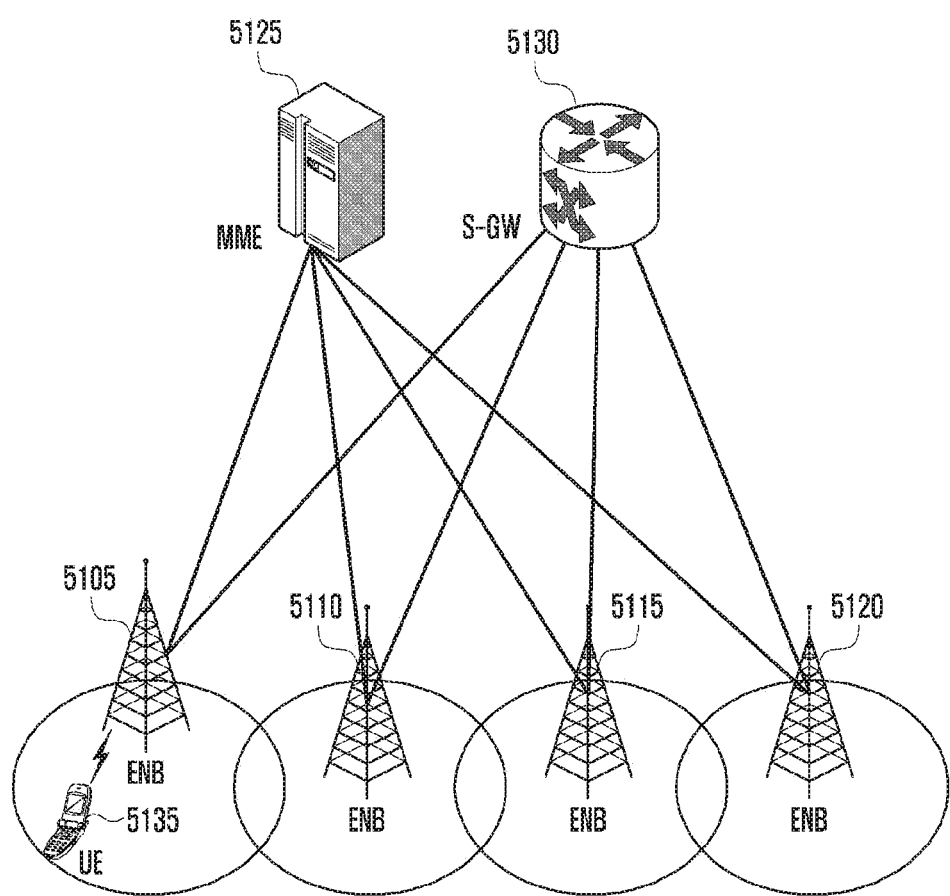
FIG. 51 is a diagram illustrating the structure of the LTE system to which the present invention is applied.

FIG. 51 is a diagram illustrating a structure of the LTE system to which the present invention is applied.

Referring to FIG. 51, a radio access network of the LTE system is configured to include next-generation base stations (evolved node B, hereinafter, ENB, Node B, or base station) 5105, 5110, 5115, and 5120, a mobility management entity (MME) 5125, and a serving-gateway (S-GW) 5130. User equipment (hereinafter, UE or terminal) 135 is connected to an external network through the ENBs 5105, 5110, 5115, and 5120 and the S-GW 5130.

In FIG. 1, the ENBs 5105, 5110, 5115, and 5120 correspond to the existing node B of a UMTS system. The ENB is connected to the UE 5135 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel state of the UEs is required. Here, the ENBs 5105, 5110, 5115, and 5120 take charge of the collecting and scheduling.

One ENB generally controls a plurality of cells. For example, to implement a transmission rate of 100 Mbps, the LTE system uses, as a radio access technology, orthogonal frequency division multiplexing (OFDM) in, for example, a bandwidth of 20 MHz. Further, an adaptive modulation & coding (AMC) determining a modulation scheme and a channel coding rate depending on a channel status of the terminal is applied. The S-GW 5130 is an apparatus for providing a data bearer and generates or removes the data bearer according to the control of the MME 5145. The MME is an apparatus for performing a mobility management function for the terminal and various control functions and is connected to a plurality of base stations.

Figure 52:
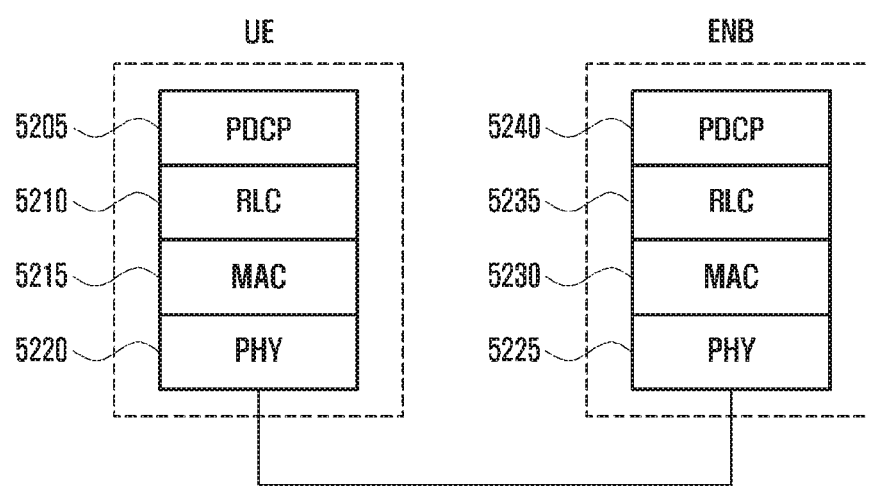
FIG. 52 is a diagram illustrating the radio protocol structure in an LTE system to which the present invention is applied.

FIG. 52 is a diagram illustrating a radio protocol structure in an LTE system to which the present invention is applied.

Referring to FIG. 52, the radio protocol of the LTE system consists of packet data convergence protocols (PDCPs) 5205 and 5240, radio link controls (RLCs) 5210 and 5235, and medium access controls (MMCs) 5215 and 5230 in the terminal and the ENB, respectively.

The PDCPs 5205 and 5240 serve to perform operations such as compression/recovery of an IP header and radio link controls (RLC) 5210 and 5235 reconfigures a PDCP packet data unit (PDU) at an appropriate size. The MACs 5215 and 5230 are connected to several RLC layer apparatuses configured in one terminal and performs an operation of multiplexing RLC PDUs into an MAC PDU and demultiplexing the RLC PDUs from the MAC PDU.

Physical layers 5220 and 5225 perform an operation of channel-coding and modulating upper layer data, making them as an OFDM symbol, and transmitting them to the radio channel or an operation of demodulating the OFDM symbol received through the radio channel, channel-decoding it, and transmitting it to an upper layer. Further, the physical layer uses an HARQ (Hybrid ARQ) for additional error correction and a receiving end transmits whether to receive the packet transmitted from a transmitting end as 1 bit. This is called HARQ ACK/NACK information. The downlink HARQ ACK/NACK information on the uplink transmission may be transmitted through a physical hybrid-ARQ indicator channel (PHICH) physical channel and the uplink HARQ ACK/NACK information on the downlink transmission may be transmitted through a physical uplink control channel (PUCCH) or physical uplink shared channel (PUSCH) physical channel.

The physical layer of the LTE system has a radio frame structure having 10 ms for downlink and uplink data transmission and is provided with two types of radio frames.

Type 1: Applied to FDD (Frequency Division Duplex)
Type 2: Applied to TDD (Time Division Duplex)

In the two types, one radio frame has a length of 10 ms and each type consists of 10 subframes having a length of 1 ms, in which the subframe of 1 ms is called 1 transmission time interval (TTI). That is, one radio frame consists of a total 10 of subframes from subframe No. 0 to subframe No. 9.

In the case of the FFD, the uplink and the downlink are separated using different frequency regions and the uplink and the downlink each consist of 10 subframes.

In the case of the TDD, as each subframe within one radio frame is divided into a downlink subframe, an uplink subframe, and a special subframe according to the configuration and the special frame is again divided into a downlink pilot time slot (DwPTS), a guard period (GP), and an uplink pilot time slot (UpPTS) and serves as a switching point between the downlinks. The lengths of the DwPTS, the GP, and the UpPTS, respectively, may be set but the sum thereof has a length of 1 ms like other subframes.

Figure 53:
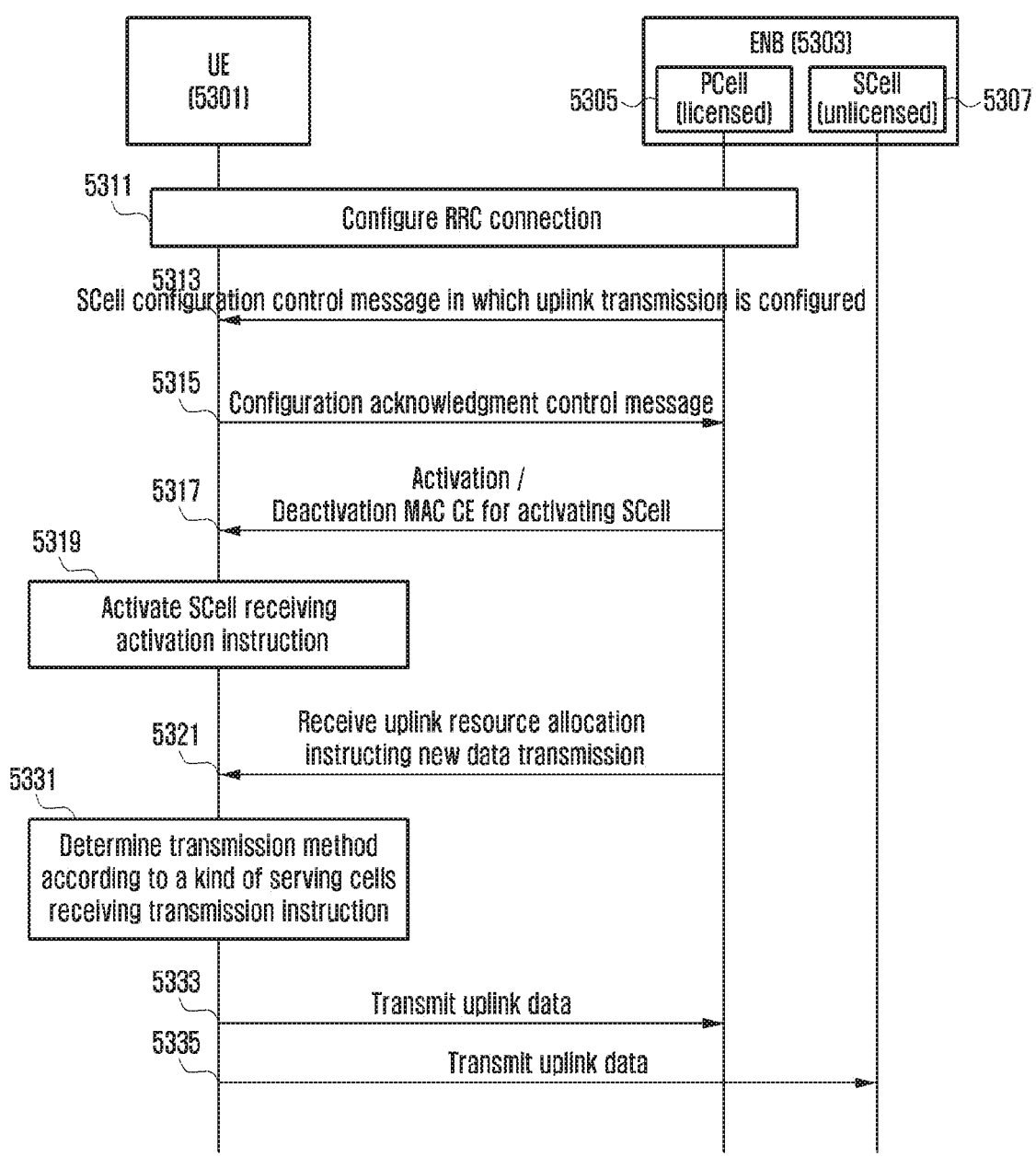
FIG. 53 is a diagram illustrating a message flow between the terminal and the base station when a method for transmitting an uplink signal to an unlicensed band according to the present embodiment is applied.

FIG. 53 is a diagram illustrating a message flow between the terminal and the base station when a method for transmitting an uplink to an unlicensed band according to the present embodiment is applied.

In FIG. 53, if is assumed that the base station is a base station 5303 managing both of the licensed band and the unlicensed band and a scenario to additionally configure the licensed band as the PCell 5305 and the unlicensed band as the SCell 5307 is assumed. The terminal 5301 tries to access the cell 5305 using the licensed band of the base station 5303 to configure the radio resource connection (RRC) to the base station (5311). The connection configuration means that the terminal is connected to the base station to transmit and receive data and to configure the connection, the connection is configured using a message of an RRC layer. In more detail, the terminal transmits an RRCConnectionRequest message to the base station to request the connection to the base station and the base station receiving the request transmits an RRCConnectionSetup message to the terminal to configure the connection. In this case, the terminal enters an RRC connection (RRC_CONNECTED) in an RRC idle (RRC_IDLE) state. The terminal receiving the RRCConnectionSetup message transmits an RRCConnectionSetupComplete message to the base station to acknowledge that the RRCConnectionSetup is received.

Next, the terminal receives the control message configuring the SCell in which at least one uplink transmission is configured from the base station (5313). This means that the base station may configure the terminal to transmit the uplink data to the SCell 5307 using the unlicensed band in addition to the PCell 5305 which is originally communicating. The control message may use an RRCConnectionReconfiguration message of the RRC layer. Next, the terminal transmits a message acknowledging the control message (5315). As the acknowledgement control message, the RRCConnectionReconfigurationComplete message may be used.

Next, the terminal receives an instruction from the base station to activate the corresponding SCell so that it may actually use the SCell 5307 configured to perform up to the uplink transmission (5317). The instruction is transmitted using an activation/deactivation MAC CE among a control element (CE) used by the foregoing MAC layer. As a result, the terminal activates a SCell 5307 newly configured to perform up to the uplink transmission (5319). After the activation, the terminal transmits a preamble specially designed to mach the uplink synchronization onto the corresponding SCell to the base station to the base station to thereby match the base station and the uplink transmission timing.

Next, the terminal receives uplink resource allocation information instructing new data transmission from the base station (5321). The resource may also be allocated to the uplink of the PCell or the uplink of the SCell. Even though the resource is allocated to the uplink of the SCell 5307, the resource may be allocated from the PCell (in the case of FIG. 53) or may be allocated from the SCell (not illustrated in FIG. 53).

The terminal receiving the uplink resource allocation information determines the transmission method according to whether the uplink resource is allocated to the PCell 5305 (or licensed band SCell), whether the uplink resource is allocated to the SCell 5307 using the unlicensed band, and a kind of data to be transmitted by the terminal (5331). The detailed method will be described below. Next, the terminal transmits the PCell 5305 of the licensed band and the SCell 5307 of the non-licensed band (5333 and 5335).

The data to be transmitted by the terminal may be user data or may be control data generated at the foregoing MAC layer. An example of the user data may include a voice packet for phone communication, or the like or an Internet packet for data communication, or the like and the corresponding packet is received from the upper layer of the terminal at the MAC layer, which is called an MAC service data unit (SDU) at the MAC layer. Further, an example of the control data generated at the foregoing MAC layer may include the MAC CE message and the more detailed example of the MAC CE generated by the terminal may include a buffer status report (hereinafter, BSR) MAC CE, a power headroom (hereinafter, PHR) MAC CE, or the like.

The BSR MAC CE is used to report the buffer status storing data to be transmitted to uplink of the terminal and the base station receiving the present information understands the buffer status of the terminal to allocate the uplink resource to the corresponding terminal. The BSR is divided as follows according to the condition in which the transmission is triggered.

First type: Regular BSR

BSR transmitted when the BSR retransmission timer retxBSR-Timer expires, when the terminal includes data that may be transmitted to any logical channel/radio bearer (RB) belonging to a logical channel group (LCG)

BSR transmitted when the data to be transmitted from the upper layer (RLC or PDCP layer) to the logical channel/ radio bearer belonging to the LCG are generated and the data have priority higher than the logical channel/wireless bearer belonging to any LCG SR transmitted when the data to be transmitted from the upper layer (RLC OR PDCP layer) to the logical channel/ radio bearer belonging to the LCG are generated and there are no data even in any LCG other than the data Second type: Periodic BSR BSR transmitted when a periodic BSR-timer (periodicB SR-Timer) set in the terminal expires Third type: Padding BSR BSR transmitted when the uplink resource is allocated and the padding bit filling the space after the data are transmitted is equal to or larger than the sum of the size of the BSR MAC CE and the side of the sub-header of the BSR MAC CE When the packets are present in the buffers of the plurality of LCGs, transmit truncated BSR In addition, there are Silelink BSR, padding Sidelink BSR, or the like which may be used in terminal-to-terminal communication.

Further, the PHR MAC CE is used to allow the terminal to report available power information which may be used for the uplink transmission. The PHR message may include a general PHR, an extended PHR used in the CA system, a DC PHR used in a dual connectivity technology which is a technology of allowing one terminal to simultaneously use the plurality of base stations, or the like.

Like step 5321, the terminal receives the uplink resource allocation from the base station and if the resource allocation is instructed to use the SCell using the unlicensed band, the resource allocation is transmitted in a priority order of the subsequent data.

MAC SDU generated in another radio bearer other than a signaling radio bearer (SRB) or MAC SDU generated in a bearer in which an unlicensed band transmission from the base station is allowedTruncated BSR.

Padding BSR, padding Sidelink BSR

Further, like the step 5321, the terminal receives the uplink
  resource allocation from the base station and if the
  resource allocation is instructed to use the PCell or the
  licensed band SCell using the unlicensed band, the
  resource allocation is transmitted in a priority order of the
  subsequent data.
  MAC SDU generated in SRB
  MAC SDU generated in DRB
  Regular BSR, Periodic BSR, Silelink BSR
  PHR, extended PHR, DC PHR
  Padding BSR, padding Sidelink BSR This is to prevent the important message (for example, control message of the RRC layer) for communication with the base station from being transmitted to the unlicensed band. Therefore, the terminal selects the cell to be transmitted according to a kind of cell to which the uplink resource is allocated and a nature of data to be transmitted to perform the uplink transmission of the important message without a delay.

Figure 54:
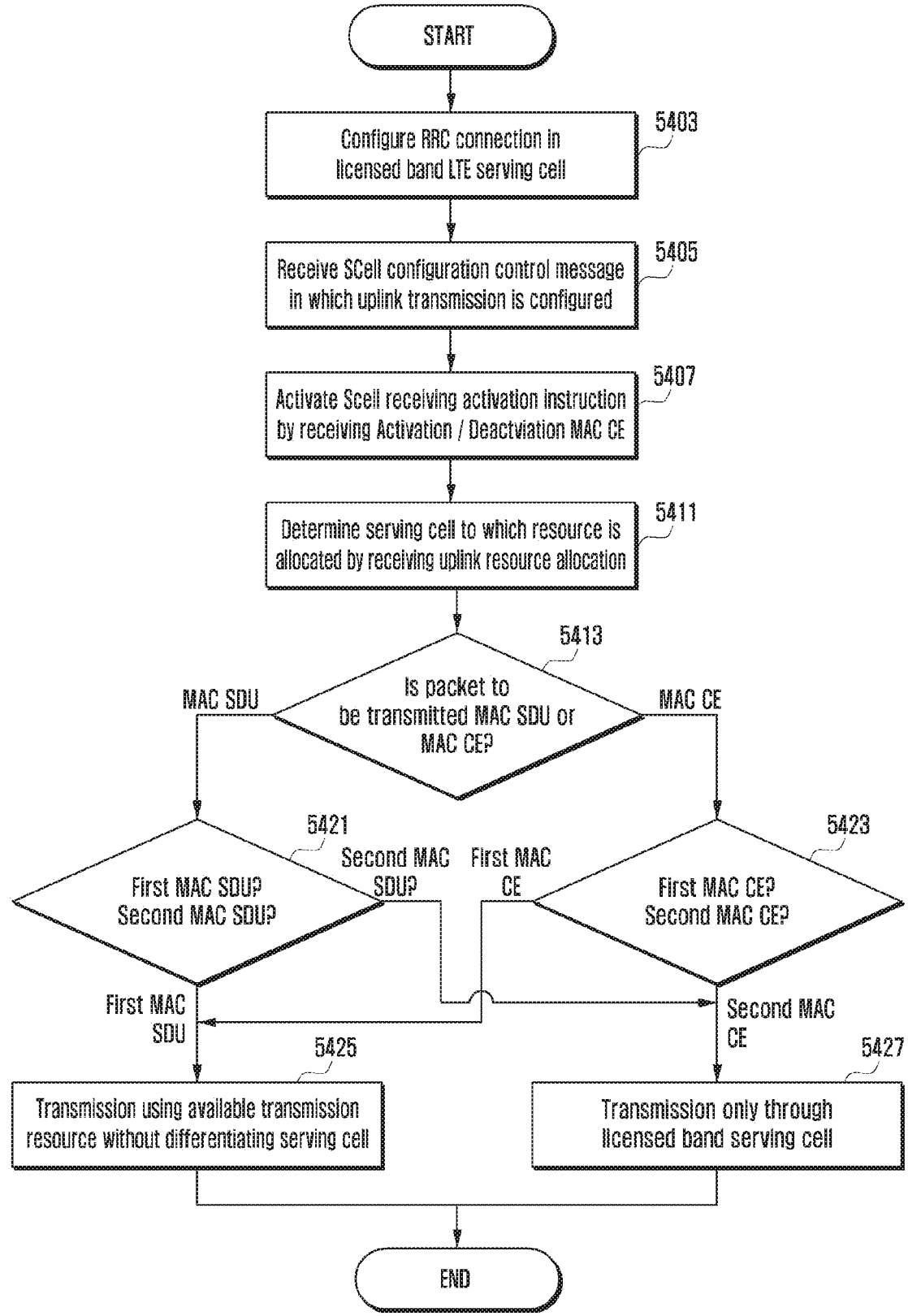
FIG. 54 is a diagram illustrating the operation of the terminal when the method for transmitting an uplink signal to an unlicensed band according to the present invention is applied.

FIG. 54 is a diagram illustrating an operation order of the terminal when the method for transmitting an uplink to an unlicensed band according to the present invention is applied.

Referring to FIG. 54, the terminal configures the RRC connection in the licensed band LTE serving cell (5403). In more detail, the terminal transmits an RRCConnectionRequest message to the base station to request the connection to the base station and the base station receiving the request transmits an RRCConnectionSetup message to the terminal to configure the connection. In this case, the terminal enters an RRC connection (RRC_CONNECTED) in an RRC idle (RRC_IDLE) state. The terminal receiving the RRCConnectionSetup message transmits an RRCConnectionSetupComplete message to the base station to acknowledge that the RRCConnectionSetup is received.

Next, the terminal receives the control message configuring the SCell in which at least one uplink transmission is configured from the base station (5405). This means that the terminal is configured to additionally transmit the uplink data to the SCell using the unlicensed band.

Next, the terminal receive the activation/deactivation MAC CE from the base station to receive an instruction to activate the SCell to actually use the SCell configured to perform up to the uplink transmission and activates the corresponding SCell (5407).

Next, the terminal receives the uplink resource allocation information instructing new data transmission from the base station and determines whether the corresponding resource is allocated to the PCell or the uplink of the licensed band SCell or whether the corresponding resource is allocated to the uplink of the unlicensed band SCell (5411).

Further, the terminal determines whether the packet to be transmitted is the MAC SDU or the MAC CE (5413). In the case of the MAC SDU, the terminal determines whether the MAC SDU is a first MAC SDU or a second MAC SDU (5421).

The first MAC SDU has the following MAC SDU.

MAC SDU generated in another radio bearer other than the signaling radio bearer (SRB) or MAC SDU generated in the bearer in which an unlicensed band transmission from the base station is allowed.

The second MAC SDU has the following MAC SDU.

MAC SDU generated SRB

MAC SDU generated in DRB in which transmission is allowed only to the licensed band.

If the MAC SDU corresponds to the first MAC SDU, the terminal transmits the corresponding MAC SDU using the allowable transmission resource without differentiating the serving cell (5425). On the other hand, if the MAC SDU corresponds to the second MAC SDU, the terminal transmits the corresponding MAC SDU only through the serving cell using the licensed band (5427).

In the case of the MAC CE, the terminal determines whether the MAC CE is a first MAC CE or a second MAC CE (5423).

The first MAC CE has the following MAC CE.

Truncated BSR

Padding BSR, padding Sidelink BSR

The second MAC CE has the following MAC CE.

Regular BSR, Periodic BSR, Silelink BSR

PHR, extended PHR, DC PHR

Padding BSR, padding Sidelink BSR

If the MAC CE corresponds to the first MAC CE, the terminal transmits the corresponding MAC CE using the allowable transmission resource without differentiating the serving cell (5425). On the other hand, if the MAC CE corresponds to the second MAC CE, the terminal transmits the corresponding MAC CE only through the serving cell using the licensed band (5427).

Therefore, the terminal selects the cell to be transmitted according to a kind of cell to which the uplink resource is allocated and a nature of data to be transmitted to perform the uplink transmission of the important message without a delay.

Figure 55:
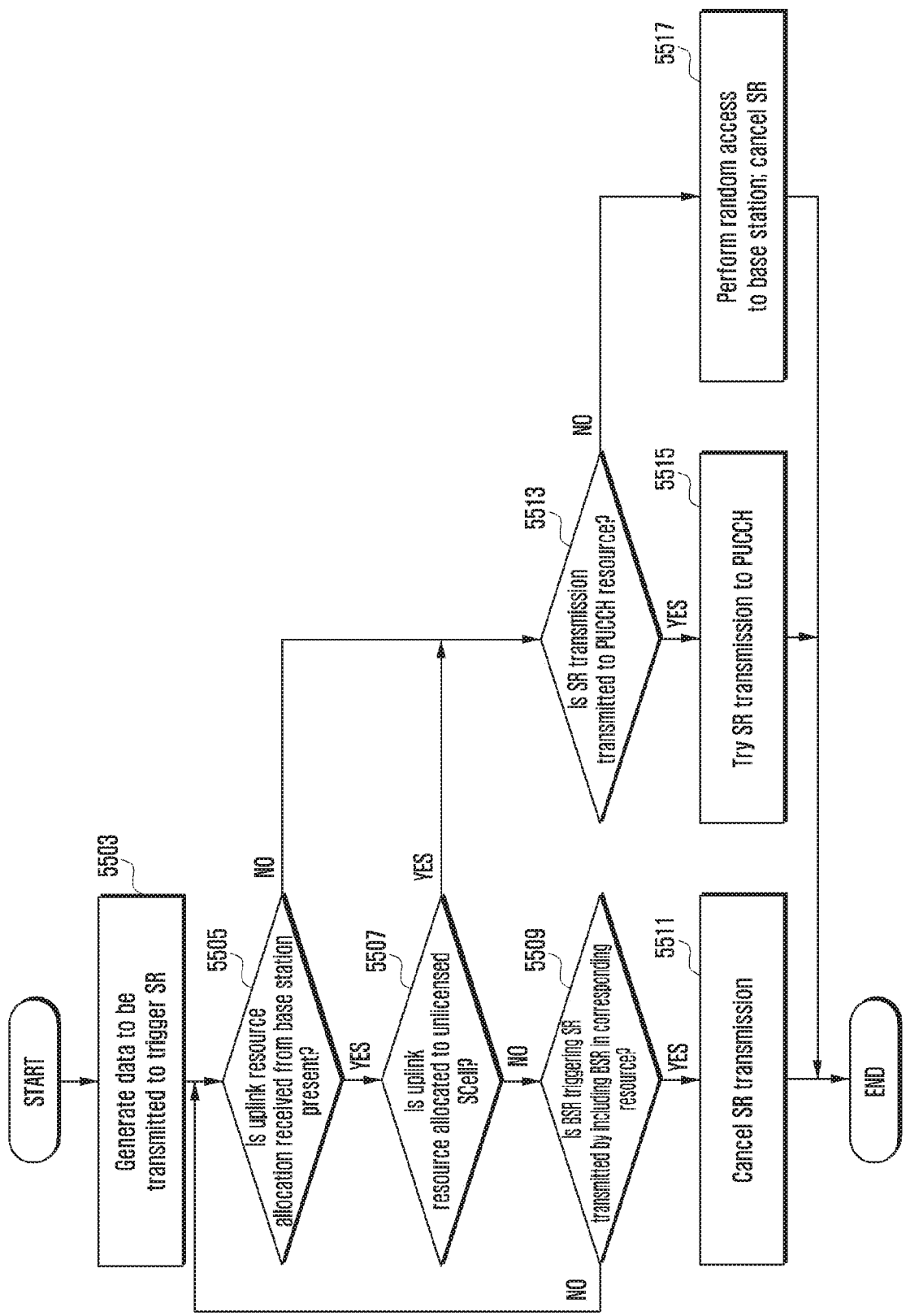
FIG. 55 is a diagram illustrating the operation of the terminal when the method for transmitting a scheduling request according to the present embodiment is applied.

FIG. 55 is a diagram illustrating the operation order of the terminal when the method for transmitting a scheduling request according to the present invention is applied.

Referring to FIG. 55, in the LTE system, the scheduling request (SR) is used when the terminal request the base station to perform new transmission to the uplink. As a result, when the new data to be transmitted from the terminal to the base station is generated, the terminal triggers the SR (5503). If the SR is triggered, the base station determines whether the uplink resource allocated to the corresponding terminal is present for each TTI (5505). If present, it is determined whether the corresponding allocated uplink resource is allocated to the licensed band (that is, PCell or SCell using the licensed band) or allocated to the SCell using the unlicensed band (5507). If the resource allocation is allocated to use the serving cell using the licensed band, it is determined whether the corresponding resource is transmitted including the BSR for data triggering the SR (5509) and if the resource allocation is transmitted including the BSR, the SR transmission is canceled and procedure 5111 ends.

Meanwhile, in step 5505, when the uplink resource allocation received from the base station is not present or in step 5507, even though the allocated resource is present, when the allocated resource is a resource allocated to the unlicensed SCell, the terminal determines whether the resource transmitting the SR is present in the physical uplink control channel (PUCCH) (5513). If the SR resource configured from the base station is present, the terminal performs an attempt to transmit the SR to the PUCCH (5515) and if the SR resource configured from the base station is not present, for the terminal to transmit the BSR, the terminal performs the random access to the base station and cancel the SR (5517) and ends a procedure.

By doing so, even when the uplink resource is allocated, the terminal may start the SR transmission procedure to the PUCCH when the allocated resource is allocated to the serving cell using the unlicensed band.

FIG. 56 is a block diagram illustrating an internal structure of the terminal according to an embodiment of the present invention.

Referring to FIG. 56, the terminal transmits and receives data, or the like to and from an upper layer 5610 and transmits and receives control messages through a control message processor 5615. Further, when the terminal transmits a control signal or data to the base station, the terminal performs multiplexing through a multiplexer and demultiplexer 5605 according to a control of a controller 5620 and then transmits data through a transceiver 5600. On the other hand, when the terminal receives data, a tranceiver 5600 receives a physical signal according to the control of the controller 5620 and then a multiplexer and demultiplexer 5605 demultiplexes the received signal and the terminal transmits the received signal to the upper layer 5610 or the control message processor 5615 according to the message information. For example, the messages of foregoing RRC layer are a control message.

Meanwhile, in FIG. 56, it is described that the terminal is configured of a plurality of blocks and each block performs different functions, which is only embodiment and therefore is not necessarily limited thereto. For example, the controller 5620 itself may also perform the function performed by the multiplexer and demultiplexer 5605.

In the present embodiment, the terminal receives an on control message transmitted from the base station to configure the unlicensed SCeLL and determines whether to transmit data depending on the respective kinds of serving cells according to the received resource allocation information and a kind of generated data.

The methods according to the embodiments described in claims or specification of the present embodiment may be implemented in hardware, software, or a combination of hardware and software.

When the methods are implemented in the software, a computer readable storage medium storing at least one program (software module) may be provided. At least one programs stored in the computer readable storage medium is configured to be executed by at least one processor within a device. At least one program includes instructions that execute the methods according to the embodiments described in the claims or specification of the present invention.

The program (software module, software) may be stored a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other types of optical storage apparatuses, and a magnetic cassette. Alternatively, the programs may be stored in the memory that is configured of a combination of some or all of the memories. Further, each memory may also be included in plural.

Further, the program may be stored in an attachable storage device that may be accesses through communication networks such as Internet, an intranet, a local area network (LAN), a wide LAN (WLAN), and a storage area network (SAN) or a communication network configured in a combination thereof. The storage device may access an apparatus performing the embodiment of the present invention through an external port. Further, a separate storage device on the communication network may also access the apparatus performing the embodiment of the present invention.

In the of the present embodiments, components included in the present invention are represented by a singular number or a plural number according to the detailed embodiment as described above. However, the expressions of the singular number or the plural number are selected to meet the situations proposed for convenience of explanation and the present invention is not limited to the single component or the plural components and even though the components are represented in plural, the component may be configured in a singular number or even though the components are represented in a singular number, the component may be configured in plural.

While the present invention has been described in connection with the exemplary embodiments thereof, various modifications and variations can be made without departing from the scope of the present invention. Therefore, the scope of the present invention should be not construed as being limited to the described exemplary embodiments but be defined by the appended claims as well as equivalents thereto.

The invention claimed is:

1. A non-transitory computer-readable storage medium with an executable program stored thereon, wherein the program instructs a processor of a terminal in a wireless communication system to perform the following operations to communicate with a master base station and a secondary base station:

receiving configuration information for a split bearer from the master base station;

identifying whether a bearer for indicating an amount of data available for transmission is a split bearer;

in case that the bearer for indicating the amount of the data available for transmission is the split bearer, identifying at least one medium access control (MAC) entity of the terminal for indicating the amount of the data available for transmission based on the configuration information; and indicating the amount of the data available for transmission from a packet data convergence protocol (PDCP) layer of the terminal to the at least one identified MAC entity of the terminal, wherein in case that the configuration information includes a threshold value associated with the split bearer and the amount of the data available for transmission is larger than the threshold value, the amount of the data available for transmission is indicated to both a MAC entity, of the terminal, for secondary cell group (SCG) associated with the secondary base station and a MAC entity, of the terminal, for master cell group (MCG) associated with the master base station, wherein in case that the configuration information includes the threshold value and information indicating an exclusive cell group and the amount of the data available for transmission is smaller than the threshold value, the amount of the data available for transmission is indicated to a MAC entity, of the terminal, of the exclusive cell group, wherein in case that the configuration information includes the information indicating the exclusive cell group except for the threshold value, the amount of the data available for transmission is indicated to a MAC entity, of the terminal, of the exclusive cell group, wherein the threshold value in the configuration information is a buffer status index, and wherein the configuration information further includes an indicator indicating whether the buffer status index is associated with a table of a buffer size level or a table of an extended buffer size level.

2. The non-transitory computer-readable storage medium of claim 1, wherein the exclusive cell group is associated with one of the SCG or the MCG.

3. The non-transitory computer-readable storage medium of claim 1, further comprising:

delivering data from the PDCP layer of the terminal to at least one of a radio link control (RLC) entity of the terminal for the SCG or the RLC entity of the terminal for the MCG, wherein in case that the configuration information includes the threshold value and the amount of the data available for transmission is larger than the threshold value, the data is delivered to one of RLC entities, of the terminal, which requested the data.

4. The non-transitory computer-readable storage medium of claim 3, wherein in case that the configuration information includes the information indicating the exclusive cell group except for the threshold value, the data is delivered to an RLC entity, of the terminal, for the exclusive cell group.

5. The non-transitory computer-readable storage medium of claim 3, wherein in case that the configuration information includes the threshold value and the information indicating the exclusive cell group and the amount of the data available for transmission is smaller than the threshold value, the data is delivered to an RLC entity, of the terminal, for the exclusive cell group.

6. The non-transitory computer-readable storage medium of claim 1, wherein in case that the configuration information includes information indicating a buffer size table, the amount of the data available for transmission is determined to be one of larger than the threshold value or smaller than the threshold value using the indicated buffer size table among a plurality of buffer size tables available to the terminal.

7. A terminal in a wireless communication system where the terminal communicates with a master base station and a secondary base station, the terminal comprising:

a transceiver; and a controller coupled with the transceiver and configured to:

receive, via the transceiver, configuration information for a split bearer from the master base station, identify whether a bearer for indicating an amount of data available for transmission is a split bearer, in case that the bearer for indicating the amount of the data available for transmission is the split bearer, identify at least one medium access control (MAC) entity of the terminal for indicating the amount of the data available for transmission based on the configuration information, and indicate the amount of the data available for transmission from a packet data convergence protocol (PDCP) layer of the terminal to the at least one identified MAC entity of the terminal, wherein in case that the configuration information includes a threshold value associated with the split bearer and the amount of the data available for transmission is larger than the threshold value, the amount of the data available for transmission is indicated to both a MAC entity, of the terminal, for secondary cell group (SCG) associated with the secondary base station and a MAC entity, of the terminal, for master cell group (MCG) associated with the master base station, wherein in case that the configuration information includes the threshold value and information indicating an exclusive cell group and the amount of the data available for transmission is smaller than the threshold value, the amount of the data available for transmission is indicated to a MAC entity, of the terminal, of the exclusive cell group, wherein in case that the configuration information includes the information indicating the exclusive cell group except for the threshold value, the amount of the data available for transmission is indicated to a MAC entity, of the terminal, of the exclusive cell group, wherein the threshold value in the configuration information is a buffer status index, and wherein the configuration information further includes an indicator indicating whether the buffer status index is associated with a table of a buffer size level or a table of an extended buffer size level.

8. The terminal of claim 7, wherein the exclusive cell group is associated with one of the SCG or the MCG.

9. The terminal of claim 7, wherein the controller is further configured to deliver data from the PDCP layer of the terminal to at least one of a radio link control (RLC) entity of the terminal for the SCG or the RLC entity of the terminal for the MCG, and wherein in case that the configuration information includes the threshold value and the amount of the data available for transmission is larger than the threshold value, the data is delivered to one of RLC entities, of the terminal, which requested the data.

10. The terminal of claim 9, wherein in case that the configuration information includes the information indicating the exclusive cell group except for the threshold value, the data is delivered to an RLC entity, of the terminal, for the exclusive cell group.

11. The terminal of claim 9, wherein in case that the configuration information includes the threshold value and the information indicating the exclusive cell group and the amount of the data available for transmission is smaller than the threshold value, the data is delivered to an RLC entity, of the terminal, for the exclusive cell group.

12. The terminal of claim 7, wherein in case that the configuration information includes information indicating a buffer size table, the amount of the data available for transmission is determined to be one of larger than the threshold value or smaller than the threshold value using the indicated buffer size table among a plurality of buffer size tables available to the terminal.

* * * * *